United States Patent [19]

Nakayama et al.

[11] Patent Number: 5,778,001
[45] Date of Patent: Jul. 7, 1998

[54] INTERFACE DEVICE

[75] Inventors: Mikio Nakayama; Tetsuo Tachibana; Youzou Iketani; Yuzo Okuyama; Satoshi Makuma, all of Kawasaki, Japan

[73] Assignee: Fujitsu Limited, Kanagawa, Japan

[21] Appl. No.: 696,355

[22] Filed: Aug. 13, 1996

Related U.S. Application Data

[62] Division of Ser. No. 503,559, Jul. 18, 1995, abandoned, which is a division of Ser. No. 339,541, Nov. 15, 1994, Pat. No. 5,555,261.

[30] Foreign Application Priority Data

Feb. 11, 1994 [JP] Japan .................. 6-269298
Jul. 2, 1994 [JP] Japan .................. 6-013776

[51] Int. Cl.⁶ .................. H04J 3/06; H04L 12/56
[52] U.S. Cl. .................. 370/516; 370/395
[58] Field of Search .................. 370/389, 395, 370/401, 503, 509, 516; 375/354, 371

[56] References Cited

U.S. PATENT DOCUMENTS

| | | | |
|---|---|---|---|
| 4,890,303 | 12/1989 | Bader | 375/356 |
| 4,961,188 | 10/1990 | Lau | 370/517 |
| 5,204,882 | 4/1993 | Chao et al. | 375/354 |
| 5,255,291 | 10/1993 | Holden et al. | 375/362 |
| 5,260,978 | 11/1993 | Fleischer et al. | 375/354 |
| 5,506,835 | 4/1996 | McTiffin | 370/17 |

FOREIGN PATENT DOCUMENTS 0 577 329  1/1994  European Pat. Off.

OTHER PUBLICATIONS

R.C. Lau, et al., "Synchronous Techniques for Timing Recovery in BISDN", Globecom '92 Communication for Global Users, IEEE Global Telecommunications Conference, Dec. 1992, pp. 814–820.

B-ISDN ATM Adaption Layer (AAL) Specification, ITU-T, Recommendation 1.363, Mar. 1993.

*Primary Examiner*—Hassan Kizou
*Attorney, Agent, or Firm*—Helfgott & Karas, P.C.

[57] ABSTRACT

An internal timing information producing portion produces internal timing information IRTS1 to IRTS4 which is the timing information on a data reception clock by using a network clock $C_N$ and the data reception clock $C_{RU}$. A calculator calculates the difference between the internal timing information IRTS1 to IRTS4 and the transmission timing information RRTS1 to RRTS4 contained in a received cell, and a data reception clock producing portion adjusts the timing of the data reception clock $C_{RU}$ so that the difference is zero and outputs the adjusted timing. An ATM cell decomposing portion outputs the user data $D_{RU}$ in synchronism with the data reception clock $C_{RU}$ which is input from the data reception clock producing portion.

6 Claims, 51 Drawing Sheets

FIG. 14

DATA RECEPTION CLOCK $C_{RU}$    $T_{RU} = 1/f_{RU}$

INTERNAL RTS SAMPLING CLOCK $C_{IS}$    $T_{IS} = T_{RU} \times 3008$

PULSE SIGNAL $P_D$

RTS DIFFERENCE INFORMATION DRTS4 : DRTS1    $W_H = 5_H$    (ex. IN THE CASE OF $5_H$)

S5

INCREASE COMMAND $P_{INC}$

REDUCTION COMMAND $P_{DIC}$

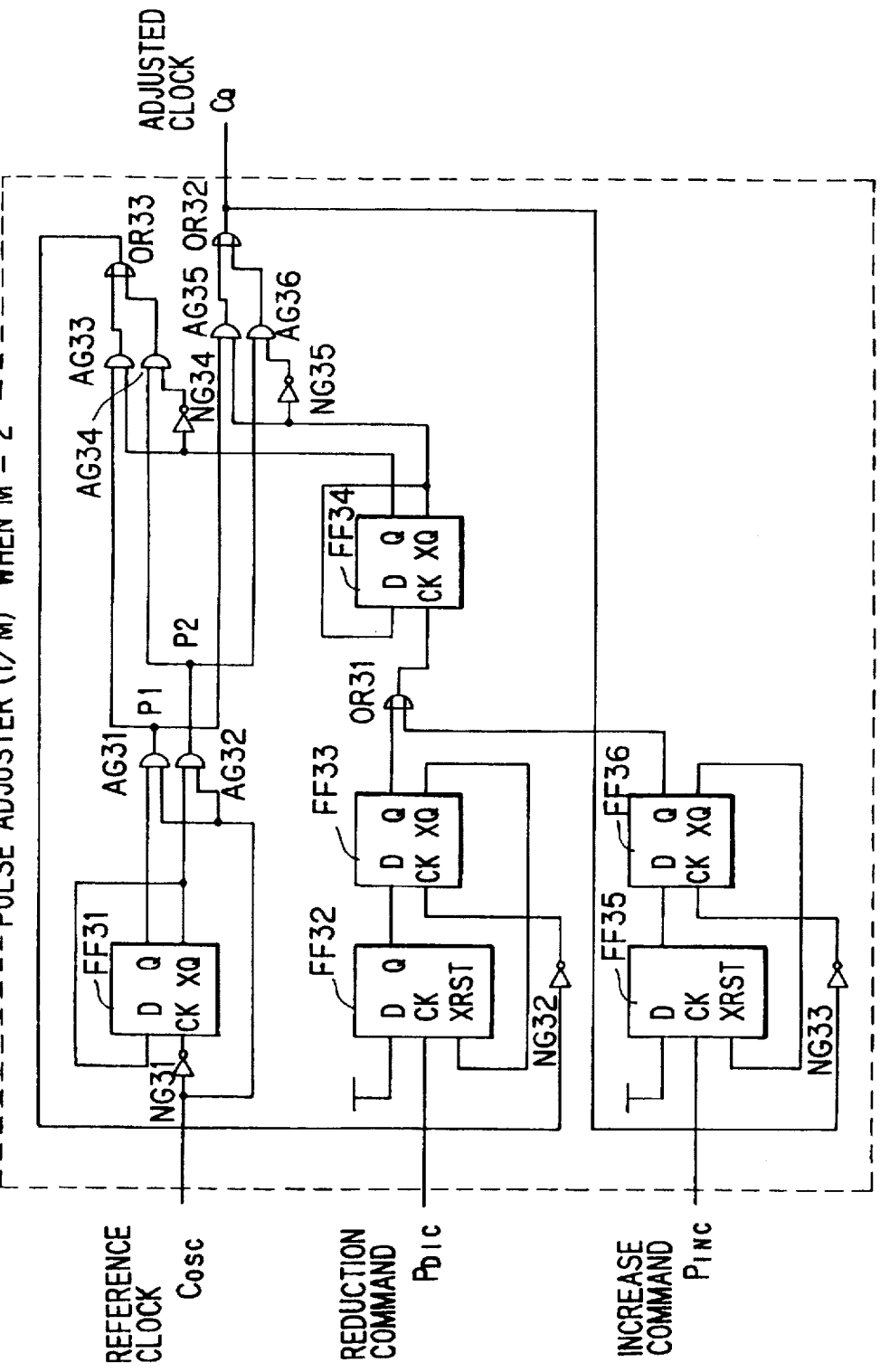
FIG. 15 PULSE ADJUSTER (1/M) WHEN M = 2

NEITHER INCREASE COMMAND NOR REDUCTION COMMAND IS ISSUED

WHEN REDUCTION COMMAND IS ISSUED

FIG. 17A

NEITHER INCREASE COMMAND NOR REDUCTION COMMAND IS ISSUED

FIG. 17B

WHEN INCREASE COMMAND IS ISSUED $\Delta T = 1/\beta$ $C_{OSC}$ $C_Q$ (ex. M=2)

$T1 = \Delta T \times M$ $C_{REF}$ (ex. $f_{REF}$ =8kHz)

$T2 = T1 \times L$ (ex. 125 μs)

$T2 - \Delta T$ $P_{INC}$ INCREASE $P_{DIC}$ REDUCTION

RTS DIFFERENCE INFORMATION DRTS7 : DRTS0

$W_H = 9_H \sim F_H$

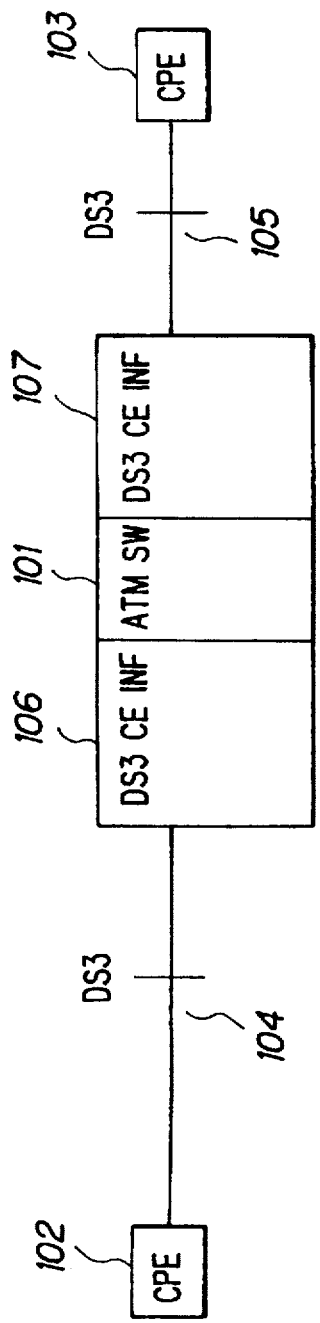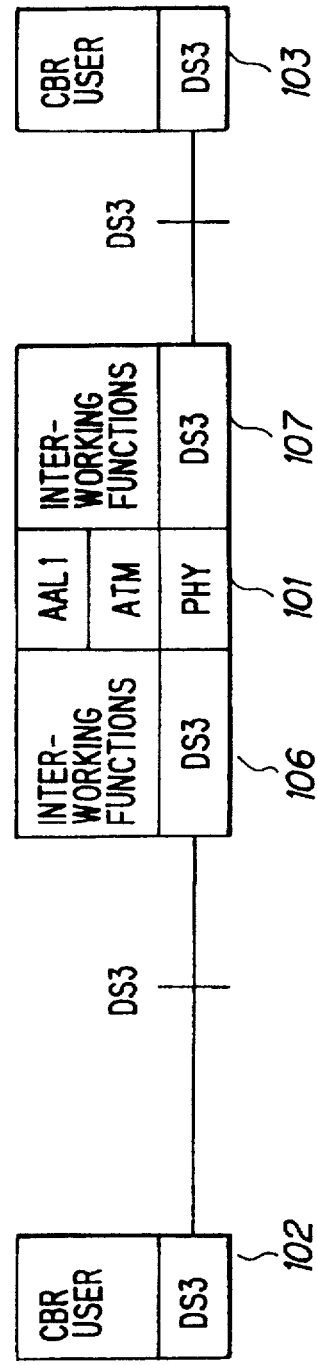
FIG. 39A
FIG. 39B

FIG. 40A

| | 680-bit | | | | | | | | |
|---|---|---|---|---|---|---|---|---|---|
| SUBFRAME 1 | X | PYLD | F1 | PYLD | C | PYLD | F0 | PYLD | C | PYLD | F1 | PYLD |
| SUBFRAME 2 | X | PYLD | F1 | PYLD | C | PYLD | F0 | PYLD | C | PYLD | F1 | PYLD |
| SUBFRAME 3 | P | PYLD | F1 | PYLD | C | PYLD | F0 | PYLD | C | PYLD | F1 | PYLD |
| SUBFRAME 4 | P | PYLD | F1 | PYLD | C | PYLD | F0 | PYLD | C | PYLD | F1 | PYLD |
| SUBFRAME 5 | M0 | PYLD | F1 | PYLD | C | PYLD | F0 | PYLD | C | PYLD | F1 | PYLD |
| SUBFRAME 6 | M1 | PYLD | F1 | PYLD | C | PYLD | F0 | PYLD | C | PYLD | F1 | PYLD |
| SUBFRAME 7 | M0 | PYLD | F1 | PYLD | C | PYLD | F0 | PYLD | C | PYLD | F1 | PYLD |

F I G. 42
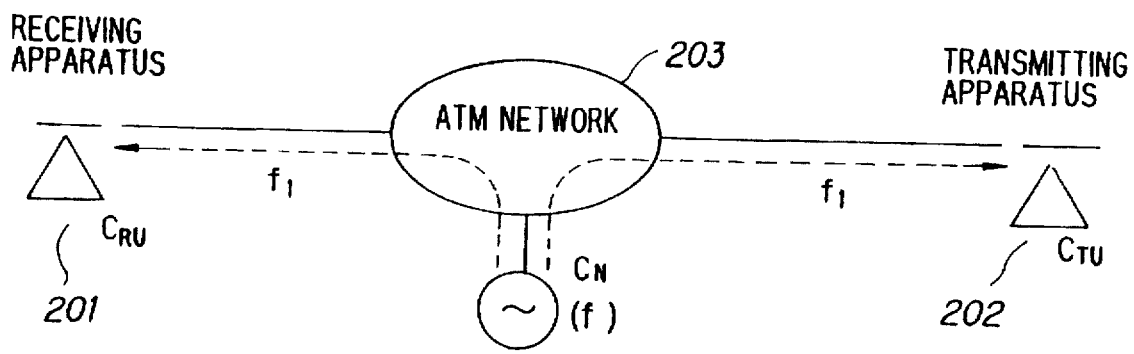
F I G. 43
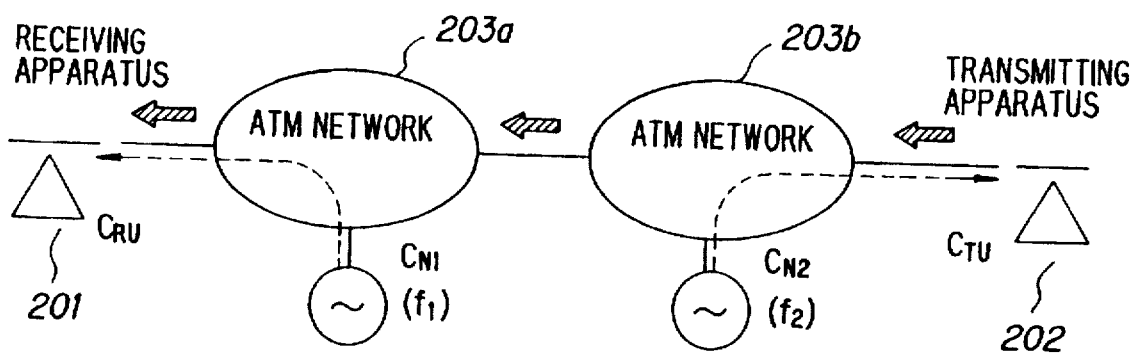
F I G. 44
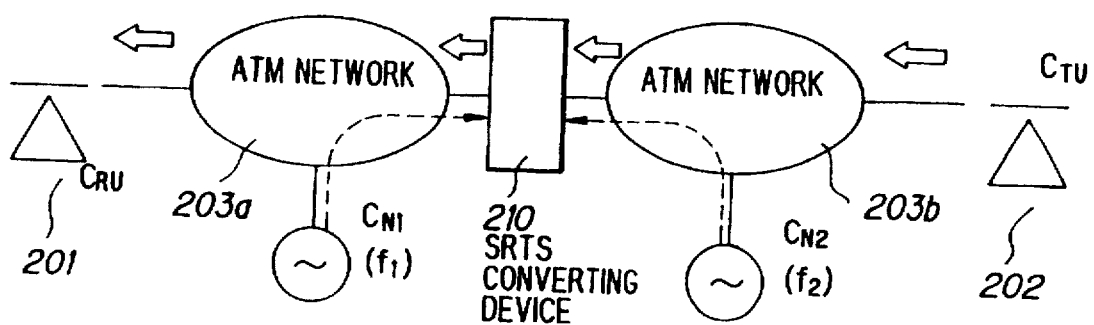

PDU : PROTOCOL DATA UNIT

INTERFACE DEVICE

CROSS REFERENCE TO RELATED APPLICATIONS

This application is Rule 1.60 division of application Ser. No. 08/503,559 now abandoned, filed Jul. 18, 1995, which is, in turn, Rule 1.60 division of application Ser. No. 08/339,541 filed Nov. 15, 1994 now issued as U.S. Pat. No. 5,555,261.

BACKGROUND OF THE INVENTION

The present invention relates to an interface device between a network and an exchange and, more particularly, to an interface device for producing transmission clock timing information on user data (Transmission RTS information) in a broadband-ISDN (B-ISDN) by an SRTS (Synchronous Residual Time Stamp) method, transmitting the transmission RTS information together with the user data in the form of a cell, and conforming the timing of a reception clock with that of the transmission clock so as to output the user data in synchronism with the reception clock.

There is increasing demand not only for audio communication and data communication but also for multimedia communication in which moving pictures are transmitted as well as audio and data. B-ISDN (broadband-ISDN) switching technology, which is based upon an asynchronous transfer mode (ATM), has been agreed upon by the ITU-T as a means of realizing broadband communication for multimedia communication. Such technology is being put into practical use.

In an ATM system, logical links are multiplexed on a physical line so that a line may be allocated to a plurality of calls. Moving-picture data or audio data from a terminal corresponding to each call is broken down into fixed-length information units (referred to as "cells"), and the cells are transmitted over a line sequentially to realize multiplexing. As shown in FIG. 48, a cell is composed of a fixed-length block of 53 bytes of which five bytes constitute a header HD and 48 bytes an information field DT. In order that the destination will be understood even after data is broken down into blocks, the header HD includes a virtual channel identifier (VCI) for call identifying purposes. The header HD further includes a virtual path identifier (VPI) that identifies paths, a generic flow control (GFC) used in flow control between links, payload type (PT) and a head error control (HEC), which is a code for correcting errors in the header.

FIG. 49 is a diagram showing the configuration of an ATM network useful in describing an ATM system. Shown in FIG. 49 are terminals 1a, 1b and an ATM network 3. The ATM network 3 has an information network 3a that transmits data cells and a signal network 3b that transmits control signals. Call processing processors (CPU) 3d-1~3d-n of ATM exchanges 3c-1~3c-n in the information network 3a are connected to the signal network 3b.

When a call operation is performed so that the terminal 1a, which is on the originating side, may call the terminal 1b, which is on the terminating side, a cell assembler within the originating terminal 1a partitions data, which includes calling party number, called party number and the kind of the original terminal, as well as attributes, into cell units, attaches a signal VCI (determined in advance for each terminal) to each item of partitioned data to form a signal cell and sends the signal cells to the ATM network 3.

If a signaling device (not shown) of the ATM exchange (on the originating side) 3c-1 receives a signal cell, the signaling device assembles information contained in the signal cells and notifies the CPU 3d-1 of the information. The CPU executes such call processing as processing for analyzing the service registered to the calling-party, charging processing and processing for interpreting digits consisting of the called party number, decides a virtual path (VPI) and call identifying information (VCI) and, in accordance with a No. 7 protocol, sends to the next relay exchange 3c-2 connection information, such as the calling party number, called party number, VPI, VCI and other data, via the signal network 3b. The relay exchange 3c-2 executes processing similar to that of the originating exchange 3c-1. Thereafter, processing similar to that described is performed from exchange to exchange until finally a path from the originating exchange 3c-1 to the ATM exchange (the exchange on the terminating side) 3c-n, to which the terminating terminal is connected, is decided as well as the relay ATM exchanges 3c-2, 3c-3 . . . If the terminating exchange 3c-n receives connection information containing the calling party number, the called party number and the VCI of the higher-order ATM exchange 3c-3, then the exchange 3c-n assigns a prescribed VCI to the terminating terminal 1b and it is determined whether the terminating terminal 1b is capable of communicating. If communication is possible, then the signal network 3b notifies the originating exchage 3c-1 of the fact that communication is possible and the originating exchange assigns a prescribed VCI to the originating terminal 1a.

Each of the ATM exchanges 3c-1~3c-n on the paths registers the following, for each path, in an internal routing table in a form correlated with the VCI of the higher-order ATM exchange: (1) connection information (referred to as routing information or tag information for specifying the output path (outgoing highway) of the cell having the particular VCI, and (2) a new VCI and new VPI, which are added to the output cell.

Thus, when a path is formed between the originating terminal 1a and the terminating terminal 1b, the two terminals send and receive call and answer cells and verify the communication procedure in mutual fashion. Thereafter, the originating terminal 1a breaks down data to be transmitted into prescribed byte lengths, adds on a header containing the allocated VCI to produce a cell and sends the cell to the ATM network 3. When each of the ATM exchanges 3c-1~3c-n is supplied with an input cell from the higher-order exchange via the prescribed incoming highway, the ATM exchange refers to its own routing table to replace the VPI/VCI of the input cell and sends the cell out on the prescribed outgoing highway based upon the tag information. As a result, the cell outputted by the originating terminal 1a arrives at the terminating exchange 3c-n via the path that has been decided by call control. The terminating terminal 3c-n refers to its routing table, changes the VCI attached to the inputted cell to the VCI allocated to the terminating terminal and then sends the cell to the line to which the terminating terminal 11b is connected.

Thereafter, the originating terminal 1a sends cells to the terminating terminal 1b in successive fashion and the terminating terminal 1b assembles the information field DT contained in the received cells, thereby restoring the original data.

The foregoing relates to a case for dealing with one call. However, by changing the mutually held VCI values at both ends of each line between the terminal and ATM exchange and between the mutually adjacent ATM exchanges, logical links conforming to a number of calls can be established on one line. As a result, high-speed multiplexed communication may be realized. In accordance with an ATM system, information from information sources such as moving pictures, data and audio having different transmission rates can be multiplexed. As a consequence, a single transmission line can be used in a very effective manner. Moreover, re-transmission control and complicated communication procedures such as those implemented by software through packet switching are no longer necessary and it is possible to achieve ultra-high-speed data transmission on the order of 150 Mbps.

FIGS. 50A to 50D show the structure of a broadband ISDN system. The ATM cells in these drawings are transmitted only from the right-hand side to the left-hand side, but actually ATM cells are transmitted in both directions. In FIG. 50A, ATM terminals 12, 13 are connected to an ATM exchange 11 and the communication between the ATM terminals 12 and 13 is conducted by the ATM cells through the ATM exchange 11. The symbol UNI represents a user network interface. In FIG. 50B, various user terminals 14, 15 are connected to the ATM terminals 12, 13. Each of the ATM terminals 12, 13 has a function of converting the data of a user terminal into an ATM cell and transmit it to the ATM exchange 11, and converting the ATM cell received from the ATM exchange 11 into the data for a user terminal and transmit it to the user terminal. In FIG. 50C, interworking function units (IWFU) 18, 19 are provided which have an interworking function with other networks (e.g., frame relay networks) 16, 17, and in FIG. 50D, an interface converting unit 11a is accommodated in the ATM exchange 11 so as to convert the data of another network to the ATM cell and vice versa in the ATM exchange 11.

In such a broadband ISDN system, there is a service of transmitting user data at a constant speed, i.e., a CBR (Constant Bit Rate) service. In this CBR service, it is necessary for the receiving apparatus to separate the user data from the received ATM cell and output the user data with the same timing (same frequency, same phase) as that of the transmission clock. For example, in the CBR service for transmitting sound at 64 kbps, it is necessary for the receiving apparatus to take out and output the received data at 64 kbps. If the frequency of the receiving apparatus is not more than 64 kbps, the output sound becomes slow and the buffer is full of the received data, so that some of the transmitted data are missed, which leads to a miss in sound. On the other hand, if the frequency of the receiving apparatus is not less than 64 kbps, the output sounds become rapid and the buffer assumes a vacant state, so that sound is output intermittently. Therefore, in the CBR service, it is necessary to conform the timing of the clock for receiving user data (hereinafter referred to as "data reception clock") with that of the clock for transmitting user data (hereinafter referred to as "data transmission clock", and both data reception clock and data transmission clock will be collectively referred to as "user clock").

If the data transmission clock is synchronous with the clock of the network, it is possible to conform the data transmission clock with the data reception clock by producing the data reception clock from the clock of the network by the receiving apparatus.

However, some data transmission clocks (e.g., 64 kbps of sound, 1.544 Mbps of DS1, 44.736 Mbps of DS3, etc. standardized by the ITU-DS (CCITT) Recommendation G700 series and the like), are not synchronous with the timing of the network clock. For example, in the structure shown in FIG. 50B, when the user terminals 14, 15 transmit user data by using their own clocks, or in the structure shown in FIGS. 50C and D, when the network clock of each network is different from the network clock of the ATM network, the data transmission clocks are not synchronous with the timing of the network clock. In such a case, even if the nominal value of the frequency of the data transmission clock is known and the receiving apparatus produces the data reception clock having the same nominal value by dividing the clock (e.g., 155.52 MHz) of the network, there is a difference in timing between the data reception clock and the data transmission clock, so that faithful CBR service is impossible.

As a method of synchronizing a data reception clock with a data transmission clock, an SRTS (Synchronous Residual Time Stamp) method is proposed. In the SRTS method, the timing information on the data transmission clock is added to the ATM cell on the transmission side and the receiving side extracts the timing information on the data transmission clock and synchronizes the data reception clock with the data transmission clock on the basis of the timing information. In order to transmit the timing information on the data transmission clock, AAL-1 (ATM Adaptation Layer-1) standardized by ITU-DS Recommendation 1363 and the like is used as an ATM cell.

In this manner, the transmitted PCM data in DS1 and DS3 is converted into the ATM cell format of the AAL-1 (ATM Adaptation Layer-1) type and transmitted through an ATM switch.

FIG. 51 is an explanatory view of a format of an ATM cell of the AAL type (AAL-1), and FIG. 52 is an explanatory view of a format of an SAR-PDU header of 1 byte. The ATM cell of the AAL-1 (ATM Adaptation Layer-1) type has two sub-layers SAR (Segmentation AND Reassembly) and CS (Convergence). The SAR sub-layer has a function of indicating the order of data transmitting, and detecting and correcting an error, and the CS sub-layer has a function of transmitting and reproducing timing information.

In the AAL-1, an information field is composed of an SAR-PDU payload having a length of 47 bytes, and an SAR-PDU (Protocol Data Unit) header having a length of 1 byte. The SAR-PDU payload of 47 bytes is used for transferring user data, and the SAR-PDU header of 1 byte is composed of an SN (Sequence Number) field of 4 bits and an SNP (Sequence Number Protection) field of 4 bits.

The SN field is divided into two sub-fields (CSI (Convergence Sublayer Identifier) and SC (Sequence Count), and the SNP field is also divided into two sub-fields CRC (Cyclic Redundancy Check) and EPB (Even Parity Bit).

The SC sub-field is used for counting cells by recurring numbers 1 to 8 (1,2, . . . ,8, 1,2, . . . ,8, 1, . . . ), and it is possible to monitor the order of cells by the SC. The CRC and EPB are used for detecting and correcting and error of the SN. The CRC is a value obtained from the polynomial $(G(X)=X^3+X+1)$ with respect to the SN, and the EPB is an even parity bit of the SAR-PDU header. The CSI bit has a function of the CS of the AAL-1 and is used for transmission and reproduction of the timing information on a user clock, as will be described later.

In the SRTS method, the timing information on a user clock is composed of information on 4 bits (RTS4, RTS3, RTS2, RTS1) which is called RTS (Residual Time Stamp) information. The RTS information is transferred by the CSI bit, which has a function of the CS of the AAL-1. FIG. 53 is an explanatory view of the structure of the RTS information format. The RTS information format has a multi-frame structure corresponding to 8 ATM cells. Since user data is transferred in the SAR-PDU payload, the number of bits of the user data in the 8 ATM cells is 3008 bits (8 cells×47 bytes×8 bits).

The CSI bits are composed of 8 bits in correspondence with the values 0 to 7 of the SC (Sequence Count). The CSI bits ($CS_1$, $CS_3$, $CS_5$, $CS_7$) having SC values of 1, 3, 5 and 7 transfer the RTS information on 4 bits. That is, the information RTS4 is transferred by the ATM cell of the SC1, the RTS3 by the ATM cell of the SC3, the RTS2 by the ATM cell of the SC 5, and the RTS1 is transferred by the ATM cell of SC 7.

FIG. 54 is an explanatory view of the period of producing RTS information. In the CBR service, transmitted user data $D_{TU}$ is data transmitted at a constant speed, and the clock which is synchronous with the data is shown as the data transmission clock $C_{TU}$ in FIG. 54. In the ATM cell, the information on the transmitted user data $D_{TU}$ is transmitted in the SAR-PDU payload, and the RTS information, which is the timing information on the data transmission clock $C_{TU}$ is transmitted by the CSI bit. For this reason, if it is assumed that the frequency of the data transmission clock is $f_{TU}$, and the time $T_{TU}$ for 1 bit of the user data is $1/f_{TU}$, the period $T_{TS}$ of producing RTS information is $T_{TU} \times 3008$. If it is assumed that the clock for producing the RTS data is the RTS transmission sampling timing clock $C_{TS}$, the RTS information is produced at the rise of the clock $C_{TS}$. The RTS transmission sampling timing clock $C_{TS}$ corresponds to 1/3008 of the data transmission clock $C_{TU}$.

In the SRTS method, the network clock frequency $f_N$ (e.g., 155.52 MHz) which is synchronous with the network timing is divided by X (X is an integer) so as to produce a frequency-divided network clock $C_{NX}$ (frequency $f_{NX}=f_N/X$). The value X is determined so that the ratio of the frequency-divided network clock $f_{NX}$ and the nominal value $f_{NOM}$ of the user clock frequency is in the range of $1 \leq f_{NX}/f_{NOM} < 2$ (N is an integer). X may be set at 2. In the following explanation, X is assumed to be 2.

The frequency-divided network clock is then divided by a 4-bit binary counter to produce network timing information $Q_1$, $Q_2$, $Q_3$, $Q_4$ having frequencies of $f_{NX}/2^1$, $f_{NX}/2^2$, $f_{NX}/2^3$, and $f_{NX}/2^4$, respectively. The values obtained by sampling the network timing information $Q_1$, $Q_2$, $Q_3$, $Q_4$ at the rise of the RTS transmission sampling timing clock $C_{TS}$ are the RTS information RTS4, RTS3, RTS2 and RTS1, respectively.

The production of the RTS information and the format for transmitting the same are regulated by the international recommendation as described above.

FIG. 55 shows the structure of RTS producing and transmitting portion for producing and transmitting RTS information in accordance with the international recommendation, and FIG. 56 shows the wave forms explaining the operation of the RTS producing and transmitting portion shown in FIG. 55.

An ATM cell decomposing portion 20 extracts the network clock $C_N$ (frequency $f_N$; e.g., 155.52 MHz) contained in the ATM cell RATM received from the ATM network by a PLL (Phase Lock Loop) and outputs the extracted network clock $C_N$. A network clock frequency dividing portion 21 divides the network clock $C_N$ which is synchronous with the network timing and outputs the frequency-divided network clock $C_{NX}$. In this case, the network clock frequency dividing portion divides the network clock $C_N$ so that the ratio of the frequency $f_{NX}$ of the frequency-divided network clock and the nominal value $f_{NOM}$ of the frequency of the user clock is in the range of $1 \leq f_{NX}/f_{NOM} < 2$ (N is an integer). X may be set at 2. For example, since the nominal value of the frequency of the data reception clock is 1.544 MHz in DS1, if the frequency $f_N$ of the network clock is 155.52 MHz, N=6, and the frequency of the frequency-divided network clock is $f_{NX}=155.52$ MHz/$2^6=2.43$ MHz.

A 4-bit binary counter portion 22 then counts the frequency-divided network clock $C_{NX}$, and outputs the network timing information $Q_1$, $Q_2$, $Q_3$, $Q_4$ having frequencies of $f_{NX}/2^1$, $f_{NX}/2^2$, $f_{NX}/2^3$, $f_{NX}/2^4$, respectively, from each of four stages.

A transmission frequency division counter portion 23 divides the data transmission clock $C_{TU}$ (frequency $f_{TU}$) which is synchronous with the transmitted user data $D_{TU}$ into 1/3008 so as to output the RTS transmission sampling timing clock $C_{TS}$ (frequency $f_{TS}=f_{TU}/3008$).

A transmission RTS information producing portion 24 samples the network timing information $Q_1$, $Q_2$, $Q_3$, $Q_4$ at the rise of the RTS transmission sampling timing clock $C_{TS}$ and outputs the transmission RTS information TRTS1, TRTS2, TRTS3 and TRTS4. In the example shown in FIG. 56, since all of the $Q_1$, $Q_2$, $Q_3$, $Q_4$ are 0 at a first rise of the RTS transmission sampling timing clock $C_{TS}$, the value $X_H$ (H means hexa) of the transmission RTS information is 0. At a second rise of the RTS transmission sampling timing clock $C_{TS}$, since the $Q_1$, $Q_2$, $Q_3$, are 1 and $Q_4$ is 0, the value $X_H$ of the transmission RTS information is 7. When the frequency $f_{TU}$ of the data transmission clock $C_{TU}$ changes, the rising time of the RTS transmission sampling timing clock $C_{TS}$ changes, so that the values $X_H$ of the transmission RTS information TRTS1 to TRTS4 also change. In other words, the transmission RTS information contains the timing information on the data transmission clock $C_{TU}$.

An ATM cell assembling portion 25 assembles a multi-frame composed of eight ATM cells every $3008 \times T_{TU}$ (see FIG. 56) by using the transmitted user data $D_{TU}$, the data transmission clock $C_{TU}$ which is synchronous therewith and the transmission RTS information which is input from the transmission RTS information producing portion 24, and transmits the assembled ATM cells to the ATM network in synchronism with the network clock $C_N$.

The value attached to each transmission ATM cell of the multiframe TATM shown in FIG. 56 is SC (Sequence Count), and the transmission RTS information TRTS1, TRTS2, TRTS3 and TRTS4 is added to the respective hatched cells.

In the international recommendation, only the production of RTS information and the format for transmitting the RTS information are regulated, and any technique of conforming the data reception clock with the data transmission clock is not recommended.

As a result, the following ATM interface devices are demanded:

(1) an ATM interface device for producing a data reception clock having the same timing (same frequency, same phase) with that of a data transmission clock by a receiving apparatus by using the RTS information transmitted from a transmitting apparatus;

(2) an ATM interface device which is capable of reproducing a data reception clock up to ½ of a network clock frequency because the nominal value of a user clock has a wide range;

(3) an ATM interface device which allows a receiving apparatus a wide frequency deviation because there is actually a deviation from the nominal value in a data transmission clock, and an ATM interface device in which there are few clock jitters because the reproduced clock is used as a data reception clock;

(4) an ATM interface device which can reduce the power consumption and does not need a clock having a very high frequency because it does not require a high-speed element;

(5) an ATM interface device which can shorten the time required for establishing the synchronization between a data transmission clock and a data reception clock and which has an improved synchronization stability;

(6) an ATM interface device which can be subjected to an operation confirmation test and a confirmation test of the normality of an ATM switch; and (7) an ATM interface device which can establish synchronization between a data transmission clock and a data reception clock even if communication is exchanged through ATM networks having different network clocks.

SUMMARY OF THE INVENTION

Accordingly, it is a first object of the present invention to eliminate the above-described problems in the related art and to provide an interface device which can produce a data reception clock having the same timing with that of a data transmission clock by a receiving apparatus by using the RTS information transmitted from a transmitting apparatus.

It is a second object of the present invention to provide an interface device which is capable of reproducing a data reception clock up to ½ of a network clock frequency.

It is a third object of the present invention to provide an interface device which allows a receiving apparatus a wide frequency deviation at the time of producing a data reception clock having the same timing with that of a data transmission clock by a receiving apparatus by using RTS information.

It is a fourth object of the present invention to provide an interface device which produces few jitters in a data reception clock at the time of producing the data reception clock having the same timing with that of a data transmission clock by a receiving apparatus by using RTS information and which does not need a clock having a very high frequency.

It is a fifth object of the present invention to provide an interface device which can shorten the time required for establishing the synchronization between a data transmission clock and a data reception clock and which has an improved synchronization stability.

It is a sixth object of the present invention to provide an ATM interface device which can be subjected to an operation confirmation test and a confirmation test of the normality of an ATM switch.

It is a seventh object of the present invention to provide an ATM interface device which can establish synchronization between a data transmission clock and a data reception clock even if communication is exchanged through ATM networks having different network clocks.

To achieve the first to fifth objects, in a first aspect of the present invention there is provided an interface device comprising: a transmission timing information producing means for producing transmission timing information which is the timing information on a data transmission clock and a timing transmission clock which is synchronous with the transmission timing information by using a network clock and the data transmission clock; a cell assembling means for assembling an cell from transmitted user data input thereto together with the data transmission clock which is synchronous with the transmitted user data and the transmission timing information input thereto together with the timing transmission clock which is synchronous with the transmission timing information, and supplying the cell to a network in synchronism with the network clock; a clock adjusting means for producing internal timing information which is the timing information on a data reception clock and a timing reception clock which is synchronous with the internal timing information by using the network clock and the data reception clock, adjusting the timing of the data reception clock so that the difference between the internal timing information and the received timing information contained in the cell which is received from the network is zero, and outputting the timing reception clock and the data reception clock; and a cell decomposing portion for decomposing the cell received from the network into the user data and the received timing information, outputting the user data in synchronism with the data reception clock which is input from the clock adjusting means, and outputting the received timing information in synchronism with the timing reception clock.

To achieve the sixth object, in a second aspect of the present invention, there is provided an ATM interface device comprising: a test data producing portion provided in an up path which leads to an ATM switch so as to produce test data; and a test data receiving and checking portion provided in a down path from the ATM switch so as to receive the test data from the test data producing portion through the ATM switch and check the normality of the path between the test data producing portion and the test data receiving and checking portion on the basis of the contents of the received test data.

To achieve the seventh object, in a third aspect of the present invention, there is provided a transmission timing information converting device comprising: a counting means provided between ATM networks having different network clocks so as to count each of the network clocks; a calculating means for calculating the difference in the count value; and a timing information correcting portion for correcting the transmission timing information contained in the ATM cell transmitted from the ATM network of a transmitting apparatus on the basis of the difference and transmitting the corrected timing information to the ATM network of a receiving apparatus.

Other features and advantages of the present invention will be apparent from the following description taken in conjunction with the accompanying drawings.

BRIEF DESCRIPTION OF THE DRAWINGS

FIG. 14 shows the wave forms explaining the operation of the pulse controller shown in FIG. 13;

FIG. 15 shows the structure of the pulse adjuster in the first embodiment;

FIGS. 17A and 17B show the wave forms explaining the operation of the pulse adjuster shown in FIG. 15 when an increase command is issued thereto;

FIGS. 39A and 39B show the structure of a communication system;

FIG. 40A explains the DS3 frame format;

FIG. 42 shows a communication system to which the SRTS method is applicable;

FIG. 43 shows a communication system to which the SRTS method is not applicable;

FIG. 44 shows the structure of a seventh embodiment of the present invention;

DESCRIPTION OF THE PREFERRED EMBODIMENTS (a1) Schematic Explanation of the Present Invention FIG. 1 is a schematic explanatory view of the principle of the present invention.

Figure 1:
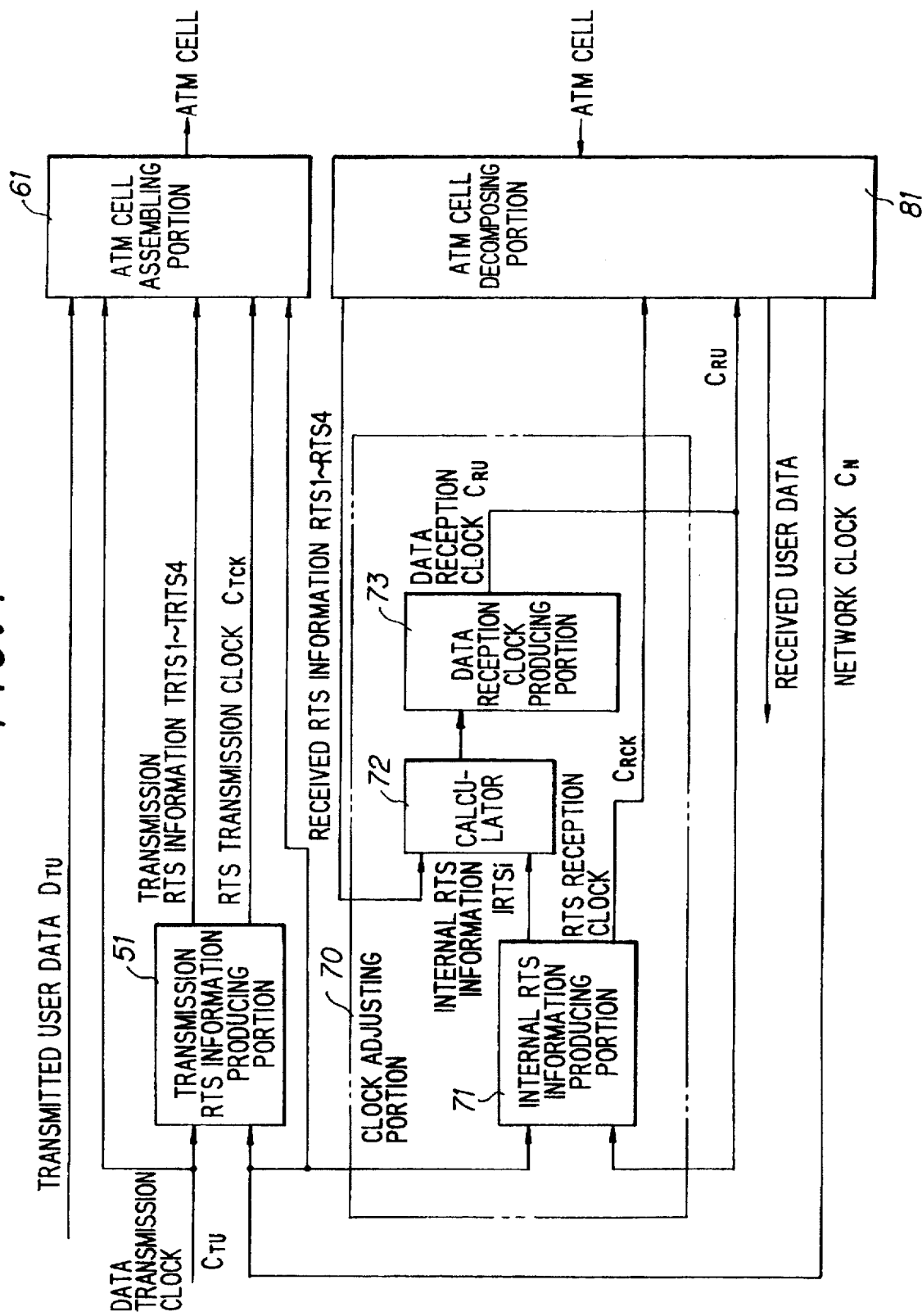
FIG. 1 schematically explains the principle of the present invention.

The reference numeral 51 represents a transmission RTS information producing portion for producing transmission RTS information TRTS1 to TRTS4 which is the timing information on a data transmission clock $C_{TU}$ and a RTS transmission clock $C_{TCK}$ which is synchronous with the transmission RTS information by using the frequency ($f_N$) of a network clock $C_N$ and the frequency ($f_{TU}$) of the data transmission clock $C_{TU}$ by an SRST method.

The reference numeral 61 represents an ATM cell assembling portion for assembling an ATM cell from transmitted user data $D_{TU}$ and the transmission RTS information TRTS1 to TRTS4 and supplying the ATM cell to an ATM network.

The reference numeral 70 represents a clock adjusting portion, and 71 an internal RTS information producing portion for producing internal RTS information IRTS1 to IRTS4 which is the timing information on a data reception clock $C_{RU}$ and, a RTS reception clock $C_{RCK}$ which is synchronous with the internal RTS information. The reference numeral 72 represents a calculator for calculating the difference between the received RTS information RRTS1 to RRTS4 which is the transmission RTS information sent from a transmission side and contained in the ATM cell and the internal RTS information IRTS1 to IRTS4 in the count value, and 73 a data reception clock producing portion for adjusting the timing of the data reception clock $C_{RU}$ so that the difference is zero and outputting the data reception clock $C_{RU}$.

The reference numeral 81 represents an ATM cell decomposing portion for extracting the network clock $C_N$ from the ATM cell received from the ATM network, inputting the network clock $C_N$ to the transmission RTS information producing portion 51, the ATM cell assembling portion 61 and the internal RTS information producing portion 71, decomposing the ATM cell received into user data and the received RTS information RRTS1 to RRTS4 and outputting the user data and the received RTS information.

The transmission RTS information producing portion 51 produces the transmission RTS information TRTS1 to TRTS4 which is the timing information on the data transmission clock $C_{TU}$ and the RTS transmission clock $C_{TCK}$ which is synchronous with the transmission RTS information by using the frequency ($f_N$) of the network clock $C_N$ and the frequency ($f_{TU}$) of the data transmission clock $C_{TU}$ by the SRST method. The transmitted user data $D_{TU}$, the data transmission clock $C_{TU}$ which is synchronous with the transmitted user data, the transmission RTS information TRTS1 to TRTS4, the RTS transmission clock $C_{TCK}$ which is synchronous with the transmission RTS information, and the network clock $C_N$ are input to the ATM cell assembling portion 61. The ATM cell assembling portion 61 assembles an ATM cell from the transmitted user data and the transmission RTS information, and supplies the ATM cell to the ATM network in synchronism with the network clock $C_N$.

Transmission Processing

The internal RTS information producing portion 71 produces the internal RTS information IRTS1 to IRTS4 which is the timing information on the data reception clock and the RTS reception clock $C_{RCK}$ which is synchronous with the internal RTS information by using the frequency of the network clock $C_N$ and the frequency of the data reception clock $C_{RU}$ by the SRST method. The calculator 72 calculates the difference between the internal RTS information IRTS1 to IRTS4 and the received RTS information RRTS1 to RRTS4 which is the transmission RTS information sent from the transmission side and contained in the received ATM cell, and the data reception clock producing portion 73 adjusts the timing of the data reception clock $C_{RU}$ so that the difference is zero and outputs the data reception clock $C_{RU}$. The ATM cell decomposing portion 81 outputs the user data $D_{RU}$ in synchronism with the data reception clock $C_{RU}$ which is input from the data reception clock producing portion 73 and outputs the received RTS information RRTS1 to RRTS4 in synchronism with the RTS reception clock $C_{RCK}$.

Reception Processing

As described above, the ATM interface device of the present invention internally produces the internal RTS information IRTS1 to IRTS4 which is the timing information on the data reception clock by the SRTS method by using the frequency of the network clock $C_N$ and the frequency of the data reception clock $C_{RU}$. In addition, the ATM interface device compares the internal RTS information with the received RTS information RRTS1 to RRTS4 which is the timing information on the data transmission clock $D_{TU}$ and adjusts the timing of the data reception clock $C_{RU}$ so that the difference between the internal RTS information and the received RTS information is zero. As a result, it is possible to conform the timing (frequency, phase) of the data reception clock with the timing of the data transmission clock.

Since the ATM interface device outputs the user data in synchronism with the data reception clock $C_{RU}$ and outputs the received RTS information RRTS1 to RRTS4 in synchronism with the RTS reception clock $C_{RCK}$, it is possible to reduce the jitters in the data reception clock and to produce the RTS reception clock with good follow-up performance. That is, both the demand for a reduction in jitters and the demand for an improvement of the follow-up performance are satisfied.

The data reception clock producing portion 73 is composed of (1) a reference oscillator, (2) a pulse adjuster for dividing the frequency of the reference clock signal which is output from the reference oscillator and outputting an adjusted clock signal which is obtained by adjusting the divided frequency in accordance with the instruction for the increase or reduction of the number of pulses, (3) a frequency divider for dividing the frequency of the adjusted clock signal which is output from the pulse adjuster and producing a phase comparison clock signal, (4) an analog PLL circuit for producing the data reception clock $C_{RU}$ which is synchronous with the phase comparison clock, and (5) a pulse controller for instructing an increase or reduction of the number of pulses on the basis of the difference between the internal RTS information and the received RTS information.

According to this structure, when the nominal value of the frequency of the user clock is comparatively low, it is possible to adjust the frequency $f_{OSC}$ of the reference clock approximately to the frequency of the user clock, thereby saving the power consumption and reducing the jitters in the data reception clock. In addition, it is possible to enlarge the range of the allowable deviation of the user clock from the nominal value.

It is also possible to feed back the adjusted clock signal which is output from the pulse adjuster to the internal RTS information producing portion in place of the data reception clock. In this manner, it is possible to adjust the frequency $f_{OSC}$ of the reference clock output from the reference oscillator approximately to the frequency of the user clock even if the nominal value of the frequency of the user clock is high, thereby saving the power consumption. In addition, it is possible to enlarge the range of the allowable deviation of the user clock from the nominal value. Furthermore, since the feedback delay time is reduced, the follow-up performance in a high-speed user clock is improved.

The number of pulses may be increased or reduced at the number of adjusting timing positions corresponding to the difference between the internal RTS information and the received RTS information which are arranged approximately uniformly in the correction period, thereby controlling the frequency of the data reception clock. In this manner, since the correction of the frequency which corresponds to the difference is possible in the correction period, the follow-up performance is greatly improved. In addition, since the amount of correction is large with respect to the correction period, it is possible to enlarge the range of the allowable deviation of the user clock from the nominal value.

The ATM interface device is further provided with a test data producing portion in an up path which leads to the ATM switch so as to produce test data, and a test data receiving and checking portion for receiving the test data and checking the normality of the path in a down path from the ATM switch. The test data producing portion in a first ATM interface device produces test data and the test data receiving and checking portion in a second ATM interface device receives the test data through the ATM switch and checks the normality of the path between the test data producing portion and the test data receiving and checking portion on the basis of the contents of the received test data. In this manner, an operation confirmation test of the ATM interface device and a confirmation test of the normality of an ATM switch are easily conducted.

When communication is exchanged through ATM networks having different network clocks, an SRTS converting device is provided between the ATM networks. The SRTS converting device counts each of the network clocks, corrects the transmission RTS information contained in the ATM cell transmitted from the ATM network on the basis of the difference in the count value and transmits the corrected transmission RTS information to the ATM network of a receiving apparatus. In this way, it is possible to establish synchronization between a data transmission clock and a data reception clock even if communication is exchanged through ATM networks having different network clocks.

(a2) Schematic Explanation of ATM Interface Device Structure

Figure 2:
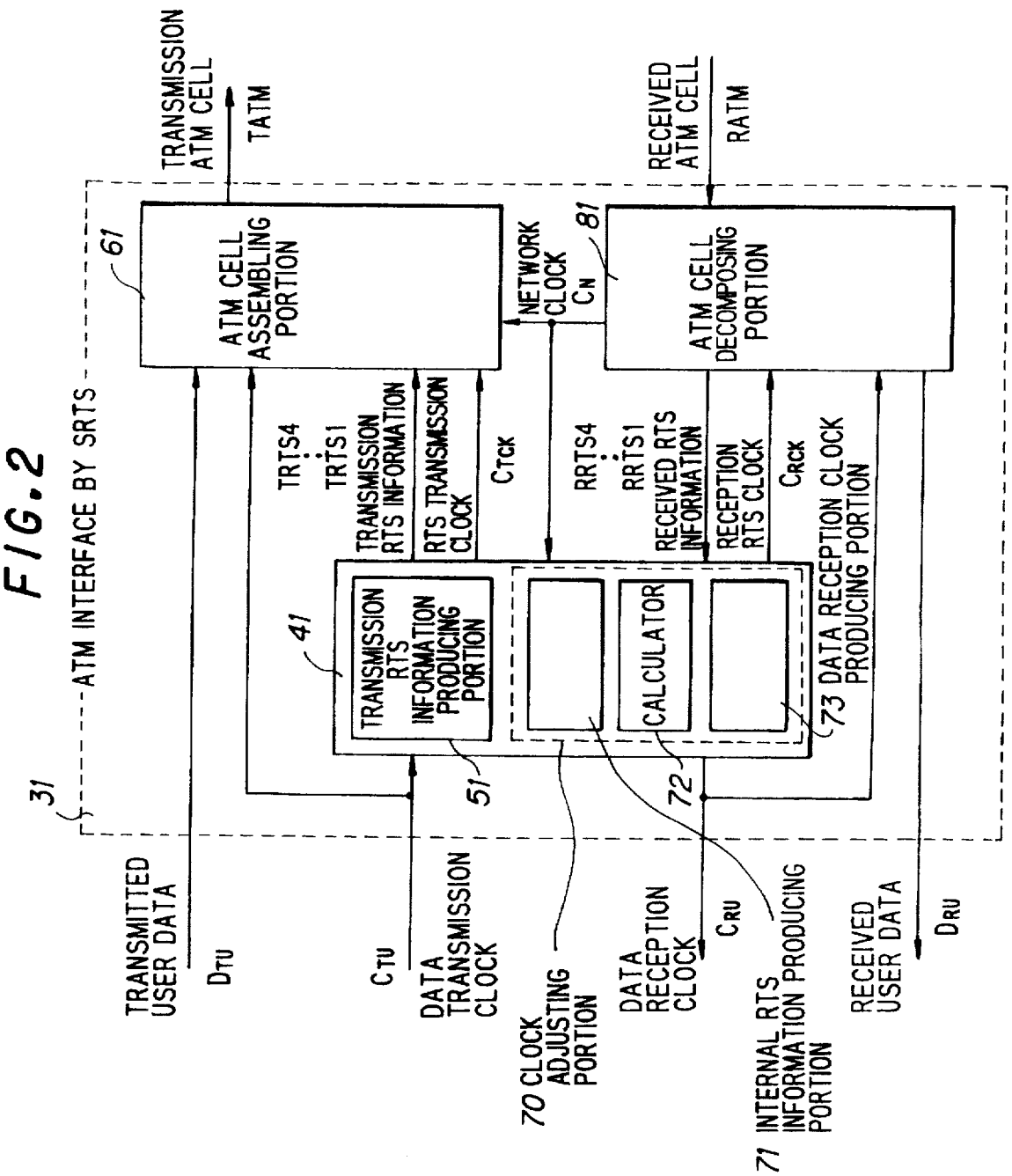
FIG. 2 shows the entire structure of an ATM interface device according to the present invention.

FIG. 2 shows the entire structure of an ATM interface device according to the present invention. The reference numeral 31 represents an ATM interface device, 41 an SRTS information transmitting and reproducing portion for producing transmission RTS information TRTS1 to TRTS4 by the SRTS method and controlling the timing of a data reception clock $C_{RU}$ so that it agrees with the timing of the a $C_{TU}$ on the basis of the received RTS information RRTS1 to RRTS4, 51 a transmission RTS information producing portion for producing the transmission RTS information by the SRST method, and 70 a clock adjusting portion for producing the data reception clock $C_{RU}$ on the basis of the received RTS information.

In the clock adjusting portion 70, the reference numeral 71 represents an internal RTS information producing portion for producing internal RTS information IRTS1 to IRTS4 which is the timing information on the data reception clock $C_{RU}$, 72 a calculator for calculating the difference between the internal RTS information IRTS1 to IRTS4 and the received RTS information RRTS1 to RRTS4 contained in the received ATM cell, 73 a data reception clock producing portion for adjusting the timing of the data reception clock $C_{RU}$ so that the difference is zero. The reference numeral 61 represents an ATM cell assembling portion for assembling the ATM cell and supplying it to the ATM network, and 81 an ATM cell decomposing portion for decomposing the received user data and the received RTS information from the ATM cell received from the ATM network and outputting them. The received RTS information is the transmission RTS information sent from the transmission side.

Transmitting Operation

Figure 3:
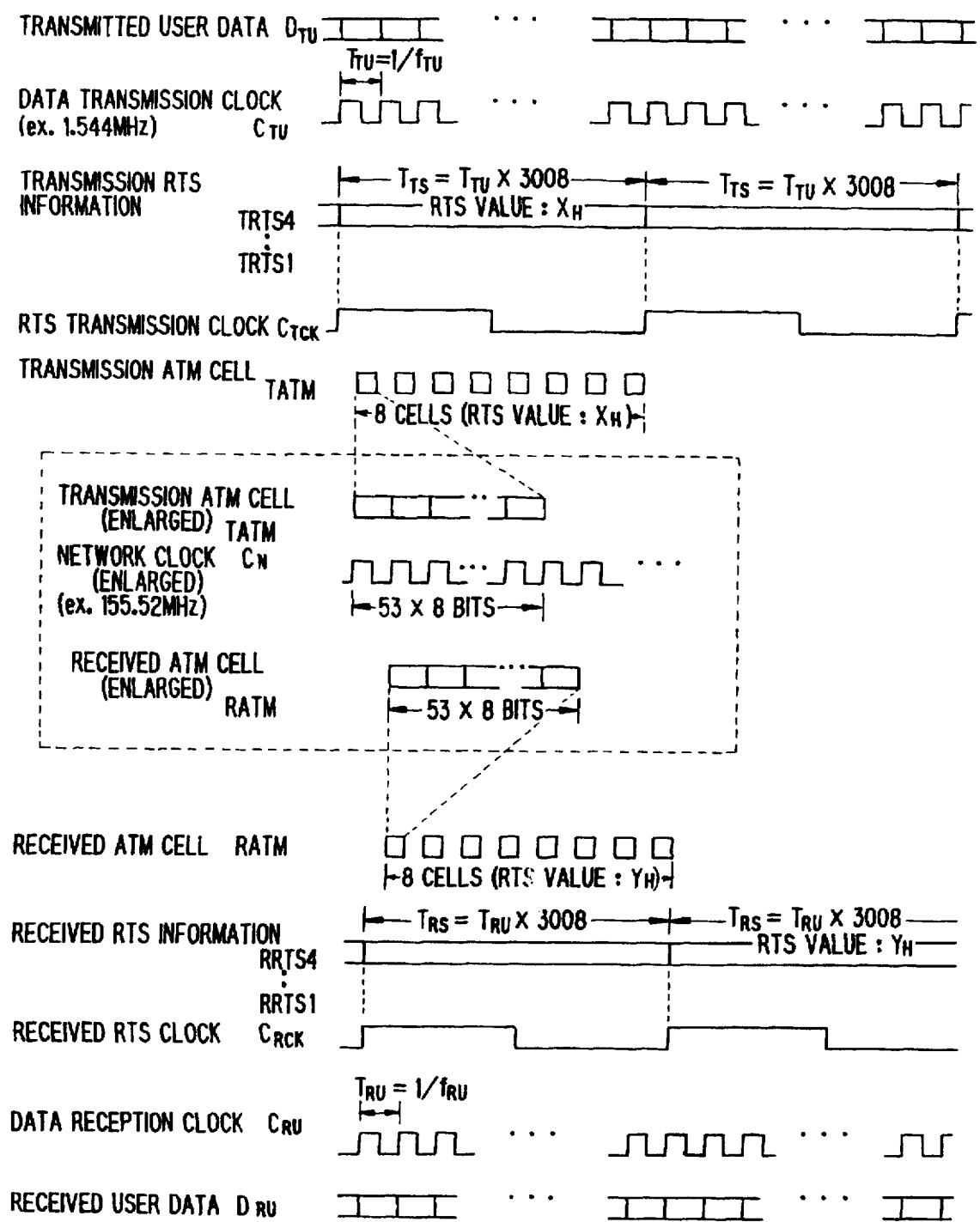
FIG. 3 shows the wave forms explaining the entire operation of the ATM interface device of the present invention.

FIG. 3 shows the wave forms explaining the entire operation of the ATM interface device of the present invention.

Figure 55:
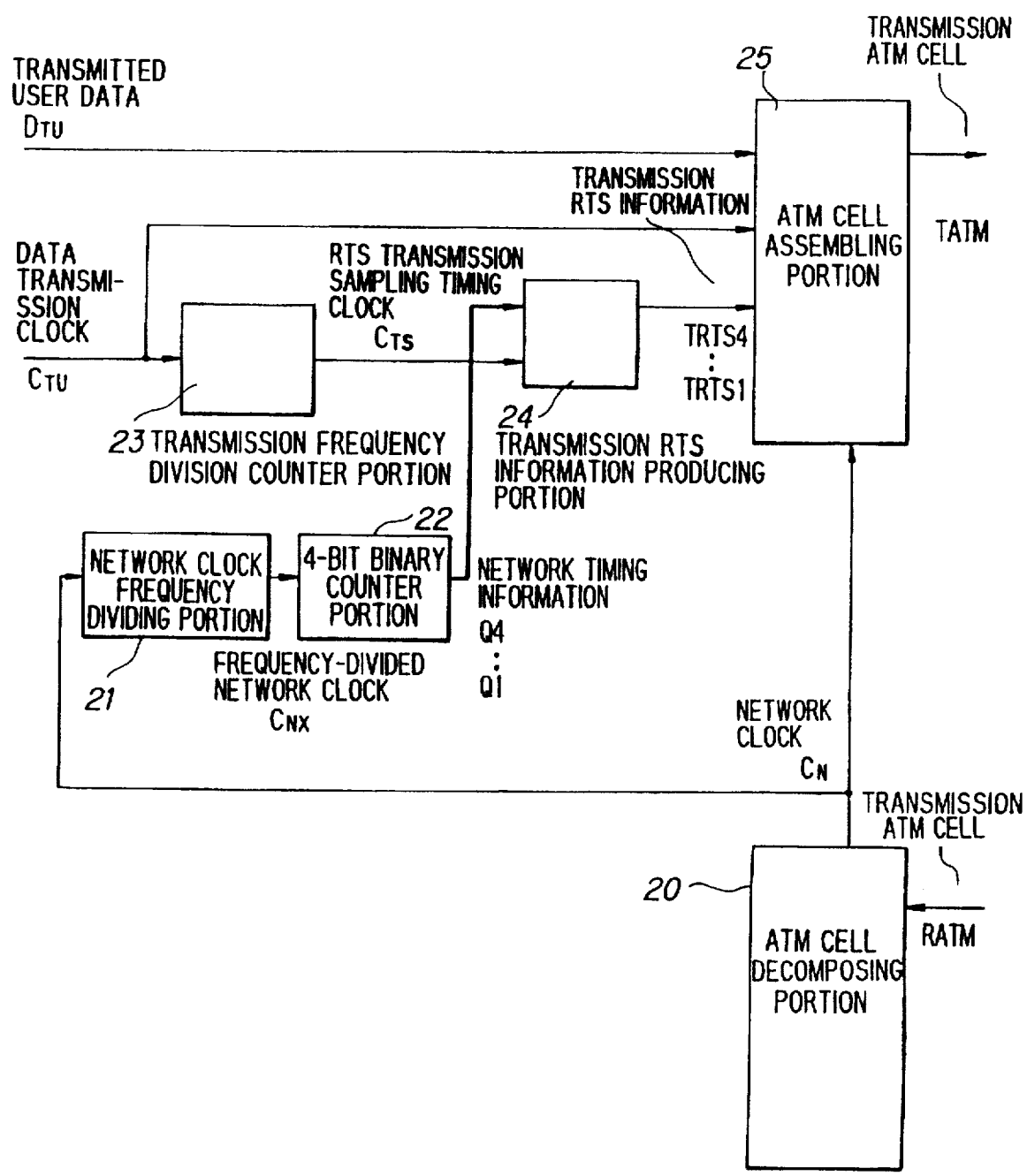
FIG. 55 shows the structure of a conventional RTS producing and transmitting portion.
Figure 56:
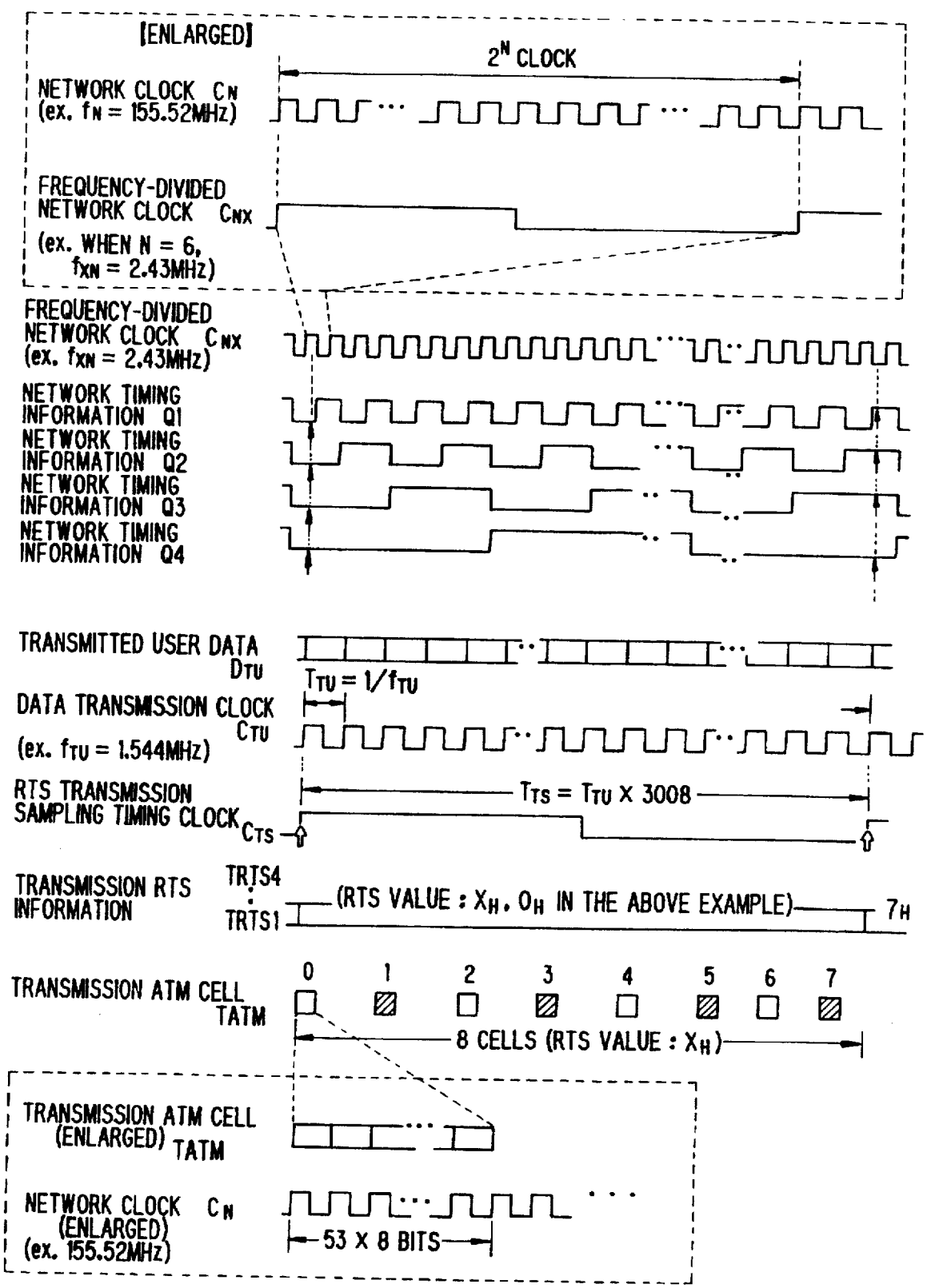
FIG. 56 shows the wave forms explaining the operation of the conventional RTS producing and transmitting portion shown in FIG. 55.

At the time of transmission, the transmission RTS information producing portion 51 produces the transmission RTS information TRTS1 to TRTS4 in a similar way to that explained with reference to FIG. 55. The transmission RTS information producing portion 51 produces the transmission RTS information TRTS1 to TRTS4 which is the timing information on the data transmission clock $C_{TU}$ by using the frequency of the network clock $C_N$ and the frequency of the data transmission clock $C_{TU}$ by the SRTS method and inputs the transmission RTS information and the RTS transmission clock $C_{TCK}$ which is synchronous with the transmission RTS information to the ATM cell assembling portion 61.

When the transmitted user data $D_{TU}$ and the data transmission clock $C_{TU}$ which is synchronous therewith and the transmission RTS information TRTS1 to TRTS4 and the RTS transmission clock $C_{TCK}$ which is synchronous therewith are input to the ATM cell assembling portion 61, the ATM cell assembling portion 61 assembles an ATM cell from the transmitted user data $D_{TU}$ and the transmission RTS information and supplying the ATM cell (transmission ATM cell TATM) to an ATM network in synchronism with the network clock $C_N$.

Receiving Operation

At the time of reception, the ATM cell decomposing portion 81 extracts the network clock $C_N$ from the ATM cell received from the ATM network, inputs the network clock $C_N$ to each element, decomposes the received ATM cell into the user data $D_{RU}$ and the received RTS information RRTS1 to RRTS4, and outputs the user data $D_{RU}$ in synchronism with the data reception clock $C_{RU}$ which is input from the data reception clock producing portion 73, and the received RTS information in synchronism with the RTS reception clock $C_{RCK}$ which is output from the internal RTS information producing portion 71.

The data reception clock $C_{RU}$ and the RTS reception clock $C_{RCK}$ are produced by the clock adjusting portion 70 in the following manner. The internal RTS information producing portion 71 produces the internal RTS information IRTS1 to IRTS4 which is the timing information on the data reception clock $C_{RU}$ by using the frequency of the network clock $C_N$ and the frequency of the data reception clock $C_{RU}$ by the SRST method, and the RTS reception clock $C_{RCK}$ which is synchronous with the internal RTS information. The calculator 72 calculates the difference between the internal RTS information IRTS1 to IRTS4 and the received RTS information RRTS1 to RRTS4 contained in the received ATM cell, and the data reception clock producing portion 73 adjusts the timing of the data reception clock $C_{RU}$ so that the difference is zero and outputs the data reception clock $C_{RU}$. Since the value of the received RTS information RRTS1 to RRTS4 contains the timing information on the data transmission clock $C_{TU}$ of the transmitting apparatus, and the internal RTS information IRTS1 to IRTS4 contains the timing information on the data reception clock $C_{RU}$, if the timing of the data reception clock is controlled so that both values agree with each other, it is possible to conform the timing of the data reception clock with the timing of the data transmission clock.

(b) First Embodiment

Figure 4:
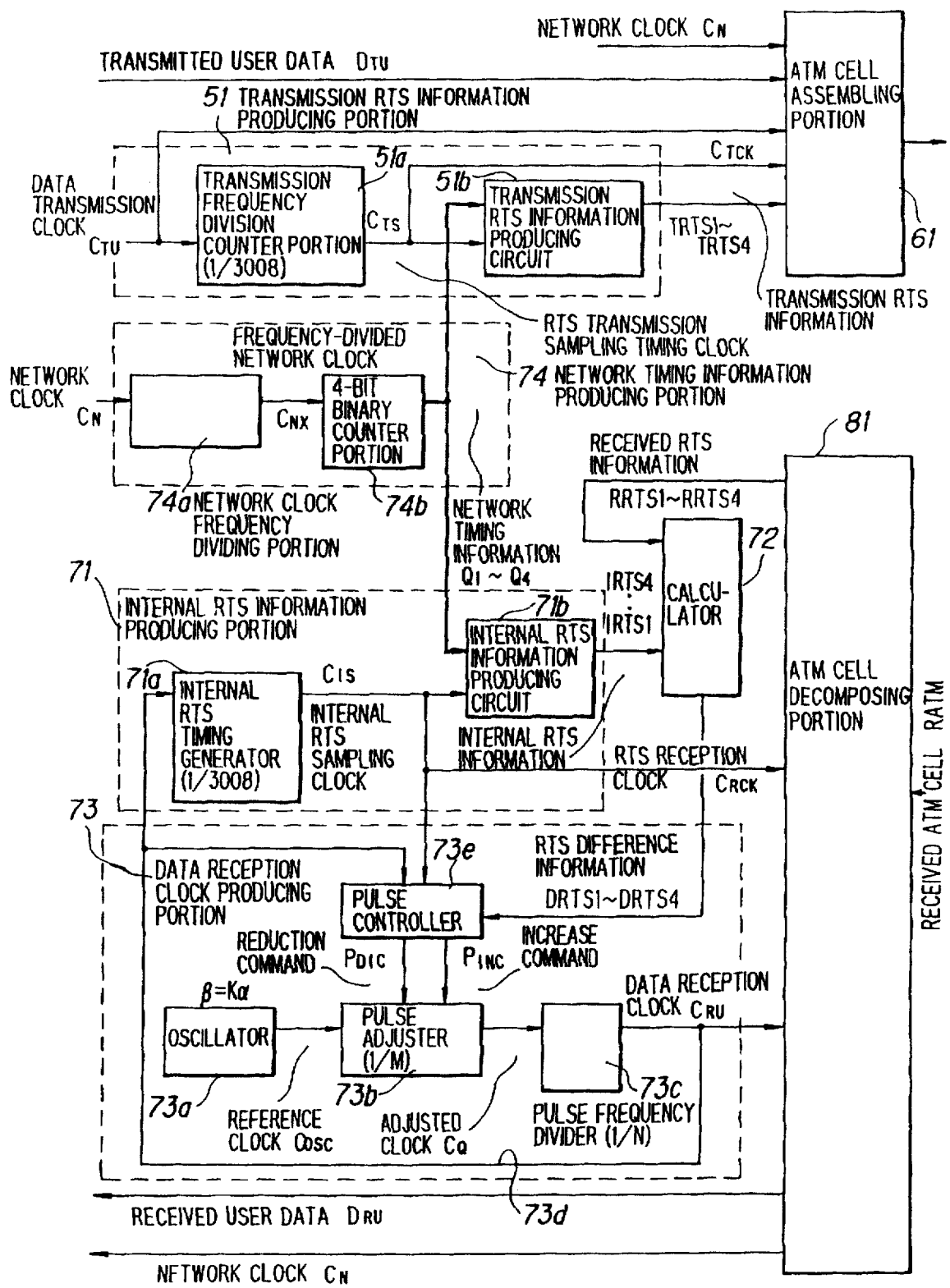
FIG. 4 shows the structure of a first embodiment of an ATM interface device according to the present invention.

FIG. 4 shows the structure of a first embodiment of an ATM interface device according to the present invention. The same numerals are provided for the elements which are the same as those shown in FIG. 2. In the first embodiment, the timing of the data reception clock is conformed with the timing of the data transmission clock only by a DPLL (Digital Phase Lock Loop).

The reference numeral 51 denotes the transmission RTS information producing portion, 61 the ATM cell assembling portion, 71 the internal RTS information producing portion, 72 the calculator, 73 the data reception clock producing portion, 74 a network timing information producing portion and 81 the ATM cell decomposing portion.

(b-1) Network Timing Information Producing Portion

Figure 5:
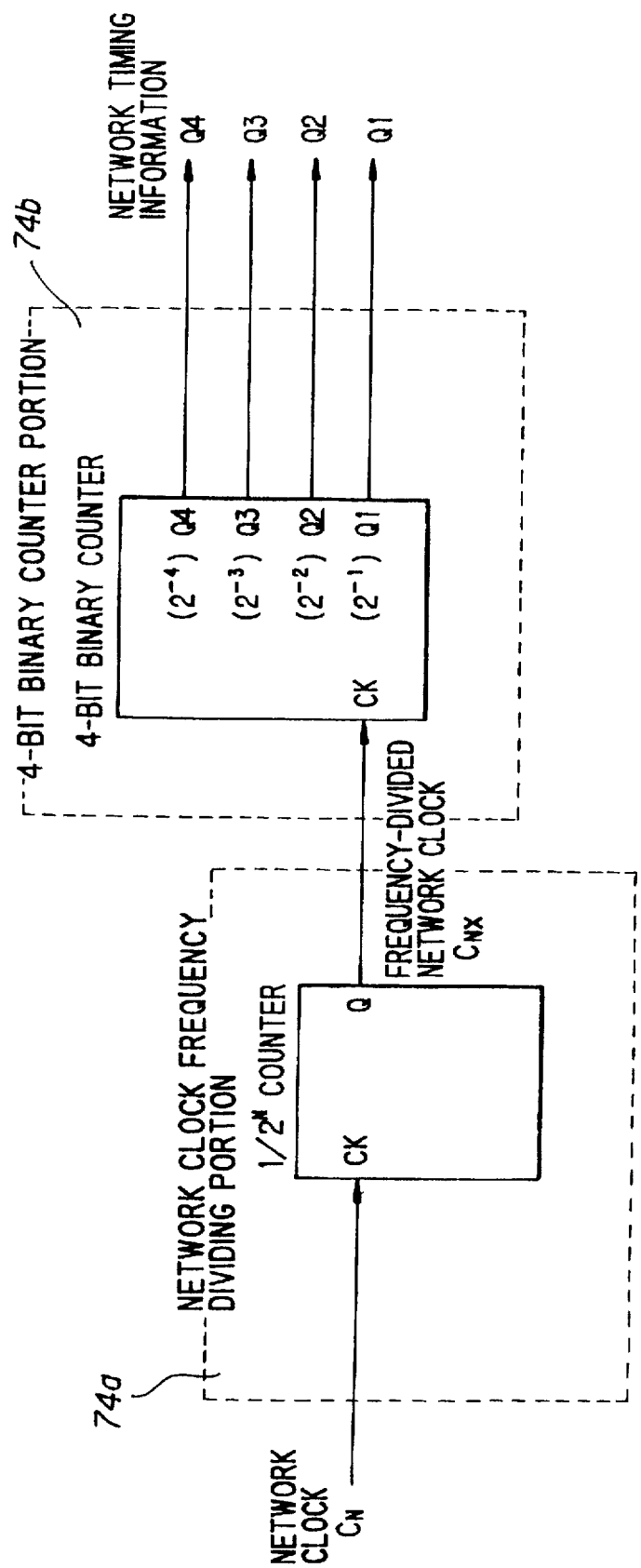
FIG. 5 shows the structure of the network timing information producing portion in the first embodiment.
Figure 6:
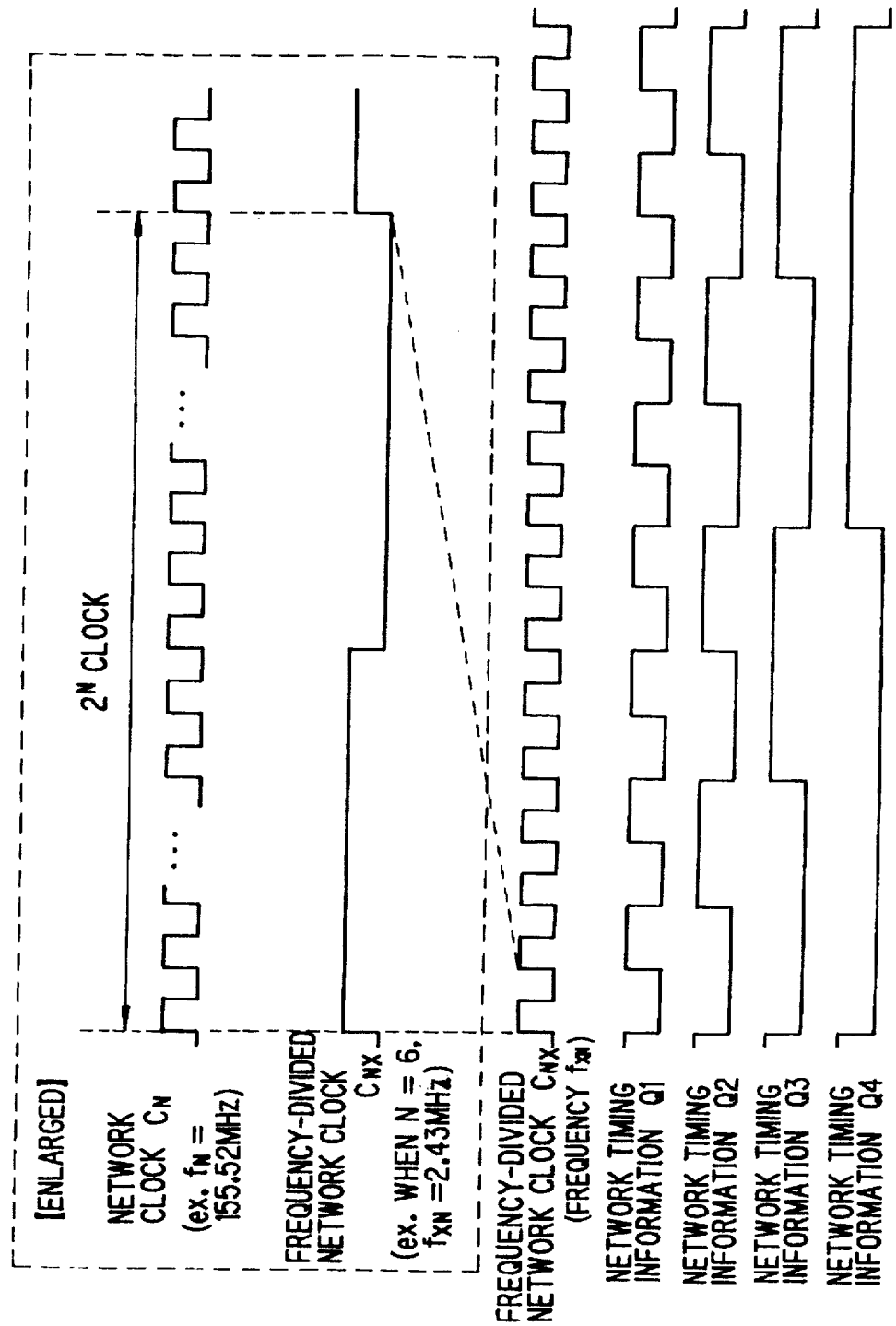
FIG. 6 shows the wave forms explaining the operation of the network timing information producing shown in FIG. 5.

FIG. 5 shows the structure of the network timing information producing portion 74, and FIG. 6 shows the wave forms explaining the operation thereof.

The network timing information producing portion 74 produces network timing information $Q_1$ to $Q_4$ of 4 bits which is necessary for the production of the transmission RTS information and the internal RTS information. It is provided with a network clock frequency dividing portion 74a and a 4-bit binary counter portion 74b.

The network clock frequency dividing portion 74a divides frequency of the network clock $C_N$ which is output from the ATM cell decomposing portion 81 into $\frac{1}{2}^N$ and produces the frequency-divided network clock $C_{NX}$. The value N is the same as the network clock frequency dividor N used when the transmission RTS information is produced by the transmitting apparatus. The network clock frequency dividing portion 74a divides the frequency of the network clock $C_N$ so that the ratio of the frequency $f_{NX}$ of the frequency-divided network clock and the nominal value $f_{NOM}$ of the user clock frequency is in the range of $1 \leq f_{NX}/f_{NOM} < 2$. For example, since the nominal value of the frequency of the data reception clock is 1.544 MHz in DS1, if the frequency $f_N$ of the network clock is 155.52 MHz, N=6, and the frequency of the frequency-divided network clock is $f_{NX}=$ 155.52 MHz/$2^6$=2.43 MHz.

The 4-bit binary counter portion 74b then counts the frequency-divided network clock $C_{NX}$, and outputs the network timing information $Q_1$, $Q_2$, $Q_3$, $Q_4$ having frequencies of $f_{NX}/2^1$, $f_{NX}/2^2$, $f_{NX}/2^3$, and $f_{NX}/2^4$, respectively, from each of four stages.

(b-2) Transmission RTS Information Producing Portion

Figure 7:
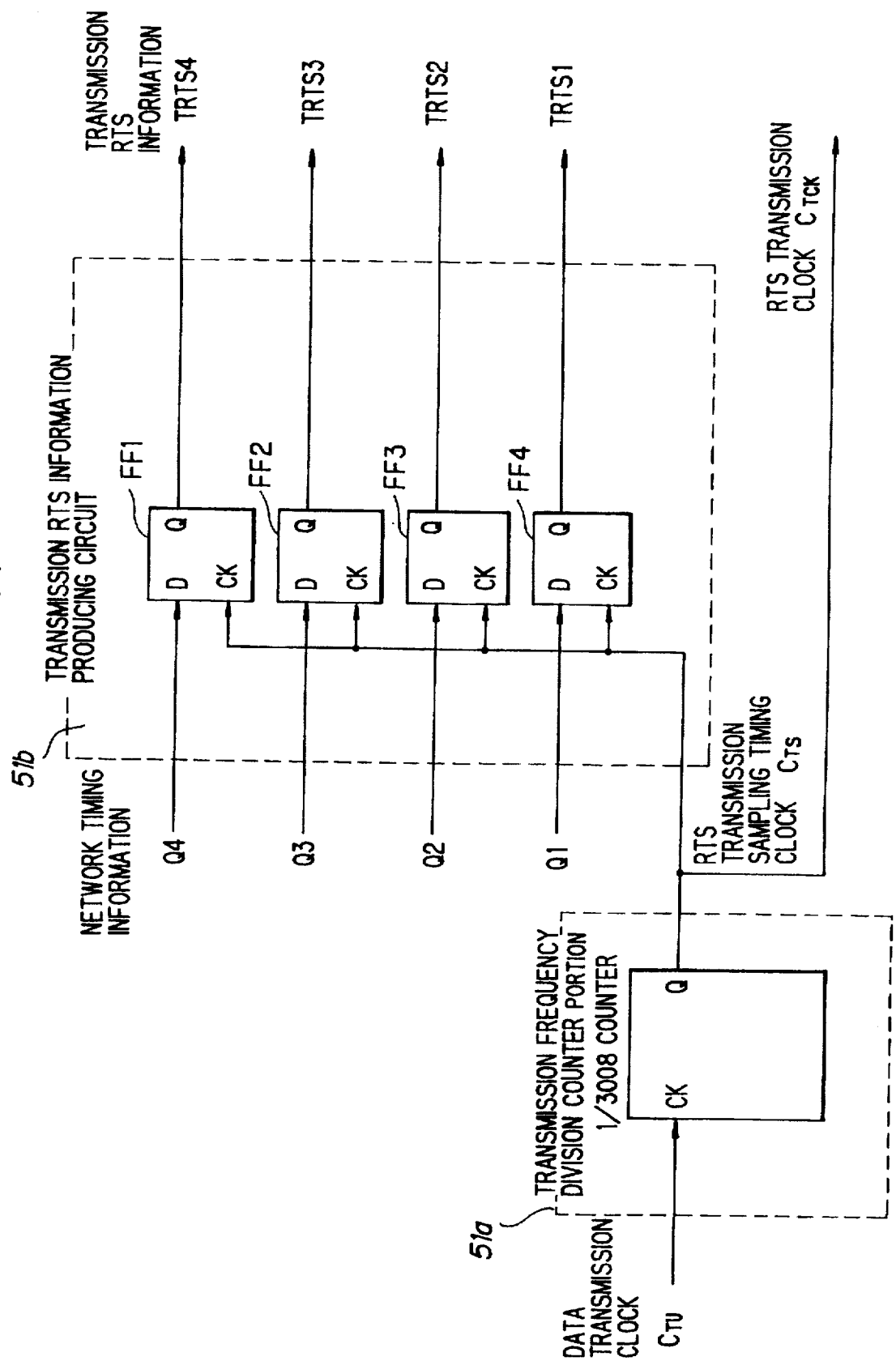
FIG. 7 shows the structure of the transmission RTS information producing portion in the first embodiment.
Figure 8:
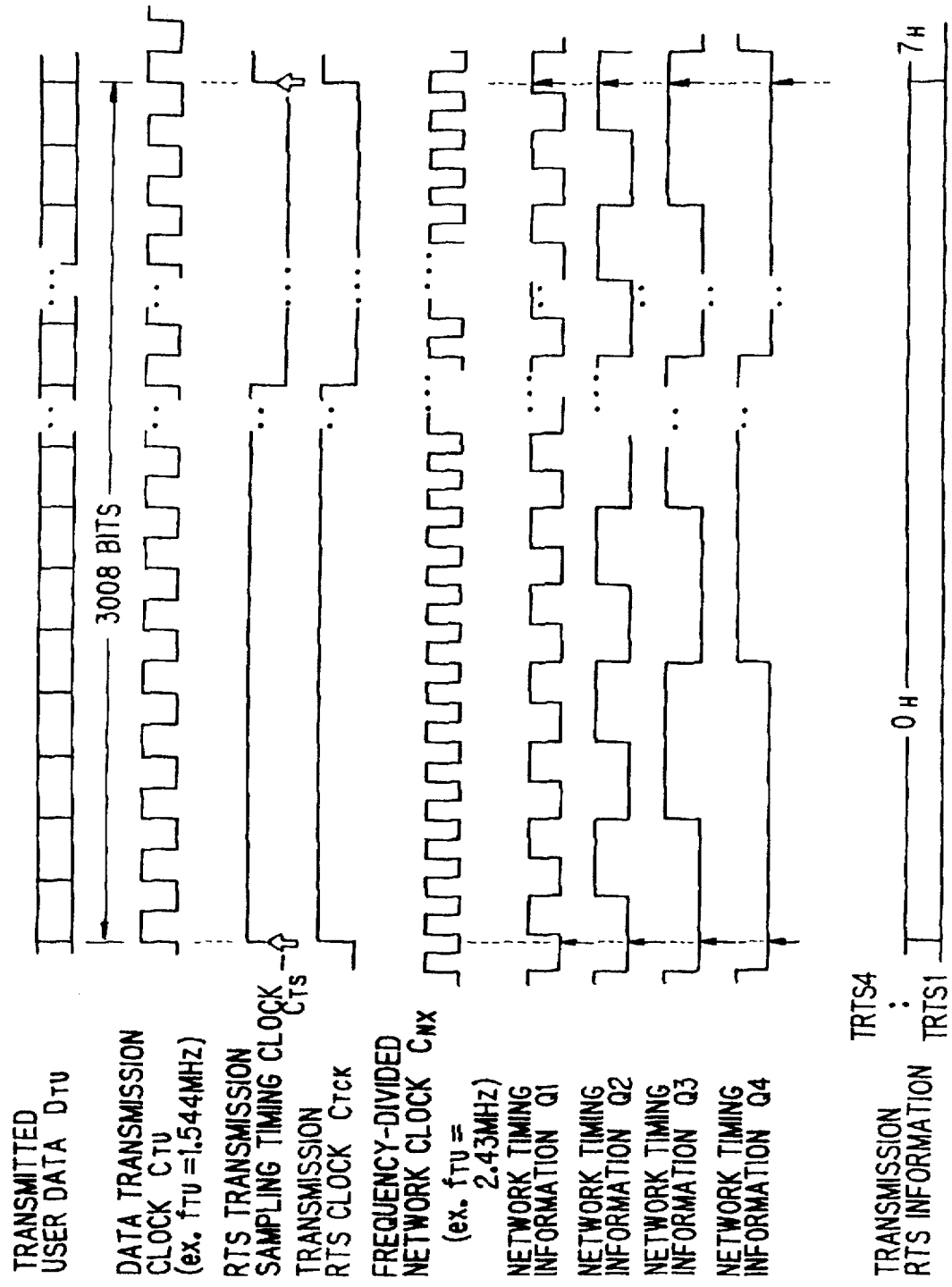
FIG. 8 shows the wave forms explaining the operation of the transmission RTS information producing portion shown in FIG. 7.

FIG. 7 shows the structure of the transmission RTS information producing portion 51 and FIG. 8 shows the wave forms explaining the operation thereof.

The transmission RTS information producing portion 51 produces the transmission RTS information TRTS1 to TRTS4 which is the timing information on the data transmission clock $C_{TU}$, and it is composed of a transmission frequency division counter portion 51a and a transmission RTS information producing circuit 51b.

The transmission frequency division counter portion 51a divides the data transmission clock $C_{TU}$ (frequency $f_{TU}$) into 1/3008 so as to output the RTS transmission sampling timing clock $C_{TS}$ (frequency $f_{TS}=f_{TU}/3008$). The transmission RTS sampling timing clock $C_{TS}$ is input to the ATM cell assembling portion 61 as the RTS transmission clock $C_{TCK}$. The transmission RTS information producing portion 51b is provided with four flip flops FF1 to FF4, as shown in FIG. 7, and sets the network timing information $Q_1$, $Q_2$, $Q_3$, $Q_4$ at the rise of the RTS transmission sampling timing clock $C_{TS}$ and samples and outputs the transmission RTS information TRTS1, TRTS2, TRTS3 and TRTS4. In the example shown in FIG. 8, since all of the $Q_1$, $Q_2$, $Q_3$, $Q_4$ are 0 at a first rise of the RTS transmission sampling timing clock $C_{TS}$, the value $X_H$ (H means hexa) of the transmission RTS information is 0. At a second rise of the RTS transmission sampling timing clock $C_{TS}$, since the $Q_1$, $Q_2$, $Q_3$, are 1 and $Q_4$ is 0, the value $X_H$ of the transmission RTS information is 7. When the timing (frequency, phase) of the data transmission clock $C_{TU}$ changes, the rising time of the RTS transmission sampling timing clock $C_{TS}$ changes, so that the values $X_H$ of the transmission RTS information TRTS1 to TRTS4 also change. In other words, the transmission RTS information contains the timing information on the data transmission clock $C_{TU}$.

(b-3) Internal RTS Information Producing Portion

Figure 9:
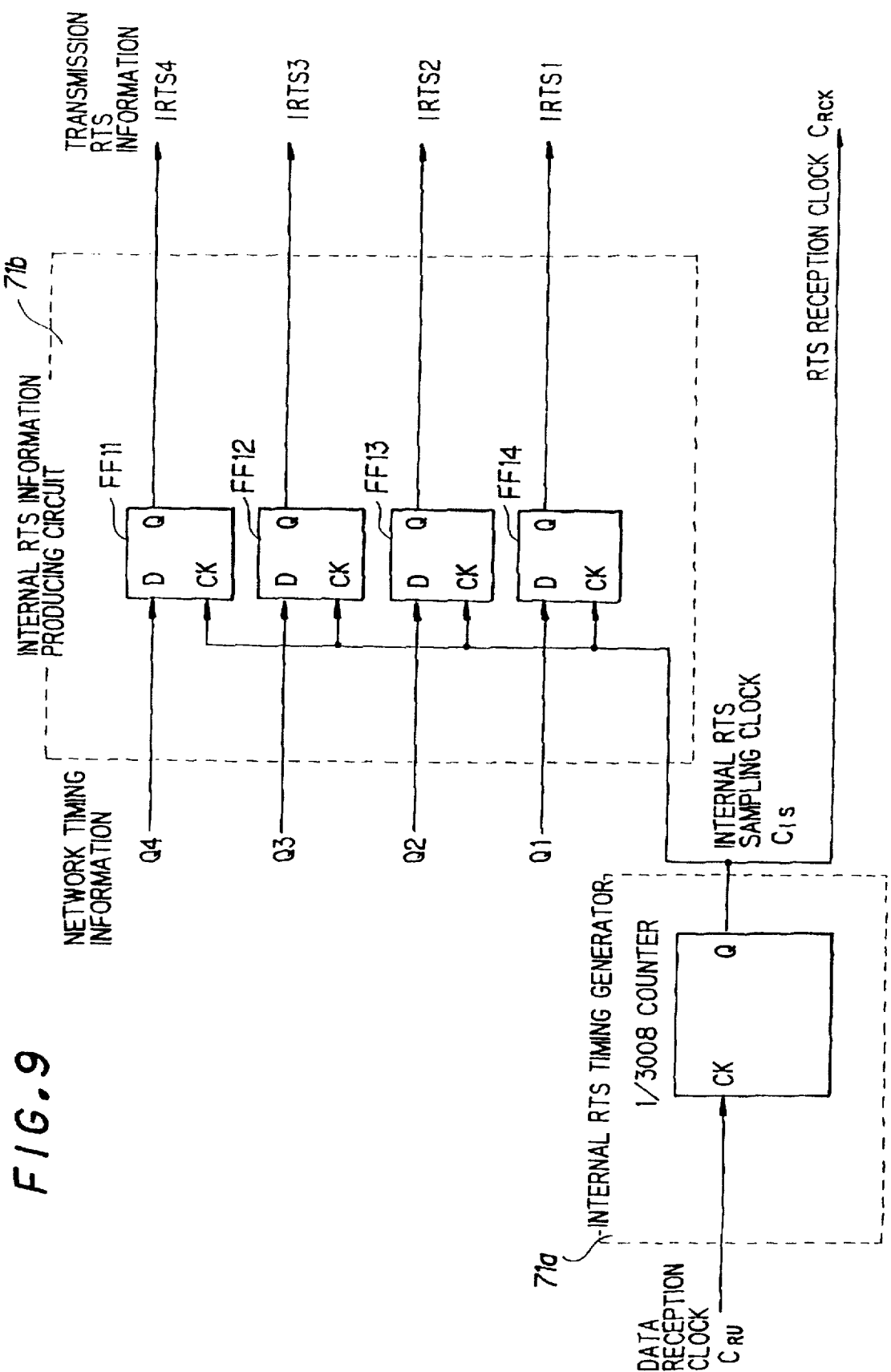
FIG. 9 shows the structure of the internal RTS information producing portion in the first embodiment.
Figure 10:
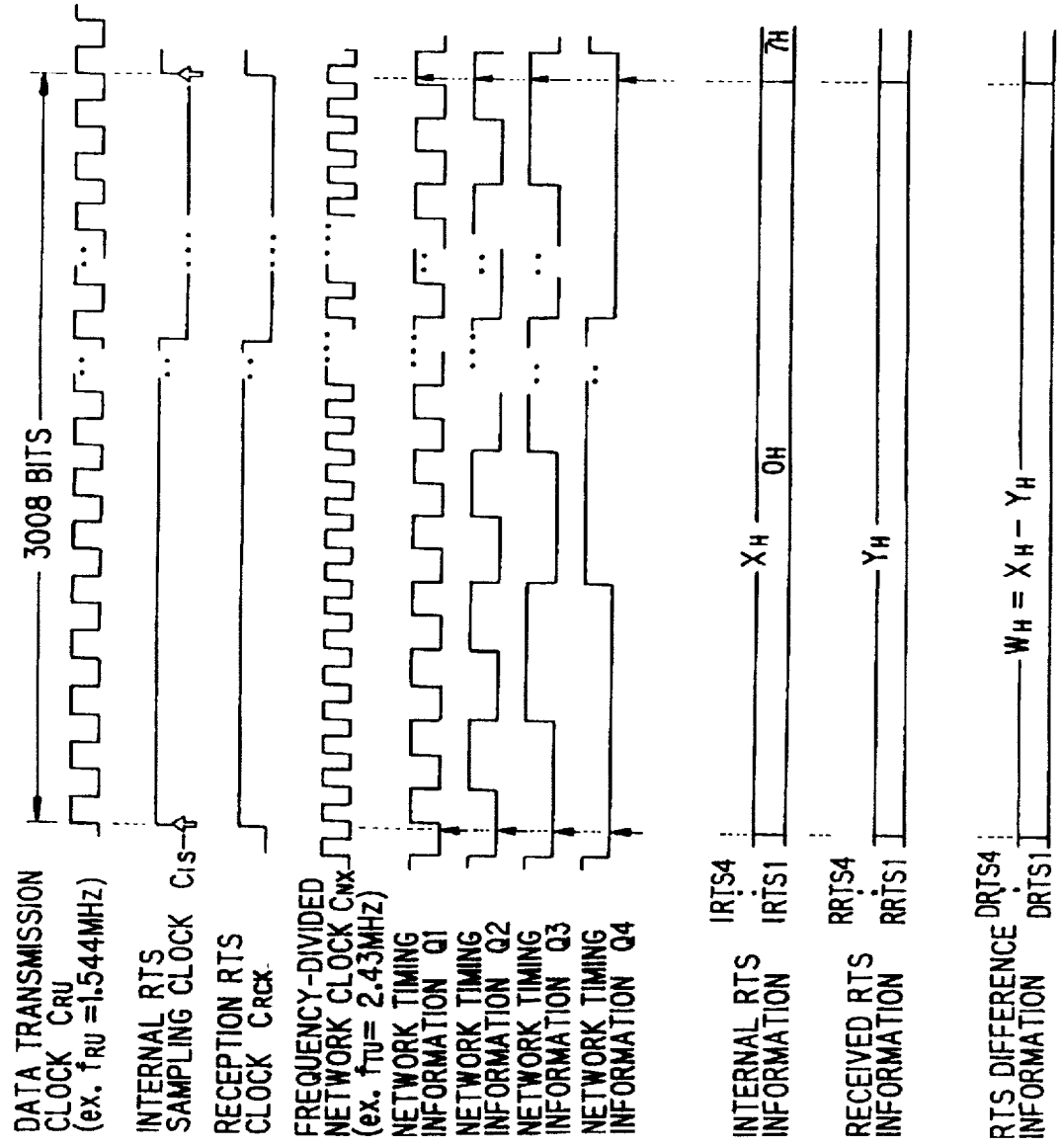
FIG. 10 shows the wave forms explaining the operation of the internal RTS information producing portion shown in FIG. 9.

FIG. 9 shows the structure of the internal RTS information producing portion 71 and FIG. 10 shows the wave forms explaining the operation thereof.

The internal RTS information producing portion 71 produces the internal RTS information IRTS1 to IRTS4 which is the timing information on the data reception clock by using the frequency of the network clock $C_N$ and the frequency of the data reception clock $C_{RU}$ by the SRST method, and it is composed of an internal RTS timing generator 71a and an internal RTS information producing circuit 71b.

The internal RTS timing generator 71a divides the frequency ($f_{RU}$) of the data reception clock $C_{RU}$ into 1/3008 and outputs an internal RTS sampling clock $C_{IS}$ (frequency $f_{IS}=f_{RU}/3008$). The internal RTS sampling clock $C_{IS}$ is also input to the ATM cell decomposing portion 81 as the RTS reception clock $C_{RCK}$. The internal RTS information producing circuit 71b is provided with four flip flops FF11 to FF14, and sets the network timing information $Q_1$, $Q_2$, $Q_3$, $Q_4$ at the rise of the internal RTS sampling clock $C_{IS}$ and samples and outputs the internal RTS information IRTS1, IRTS2, IRTS3 and IRTS4. In the example shown in FIG. 10, since all of the $Q_1$, $Q_2$, $Q_3$, $Q_4$ are 0 at a first rise of the internal RTS sampling clock $C_{IS}$, the value $X_H$ of the internal RTS information is 0. At a second rise of the internal RTS sampling clock $C_{IS}$, since the $Q_1$, $Q_2$, $Q_3$, are 1 and $Q_4$ is 0, the value $X_H$ of the internal RTS information is 7. When the timing (frequency, phase) of the data reception clock $C_{RU}$ changes, the rising time of the internal RTS sampling clock $C_{IS}$ changes, so that the values $X_H$ of the internal RTS information IRTS1 to IRTS4 also change. In other words, the internal RTS information contains the timing information on the data reception clock $C_{RU}$.

(b-4) Calculator

Figure 11:
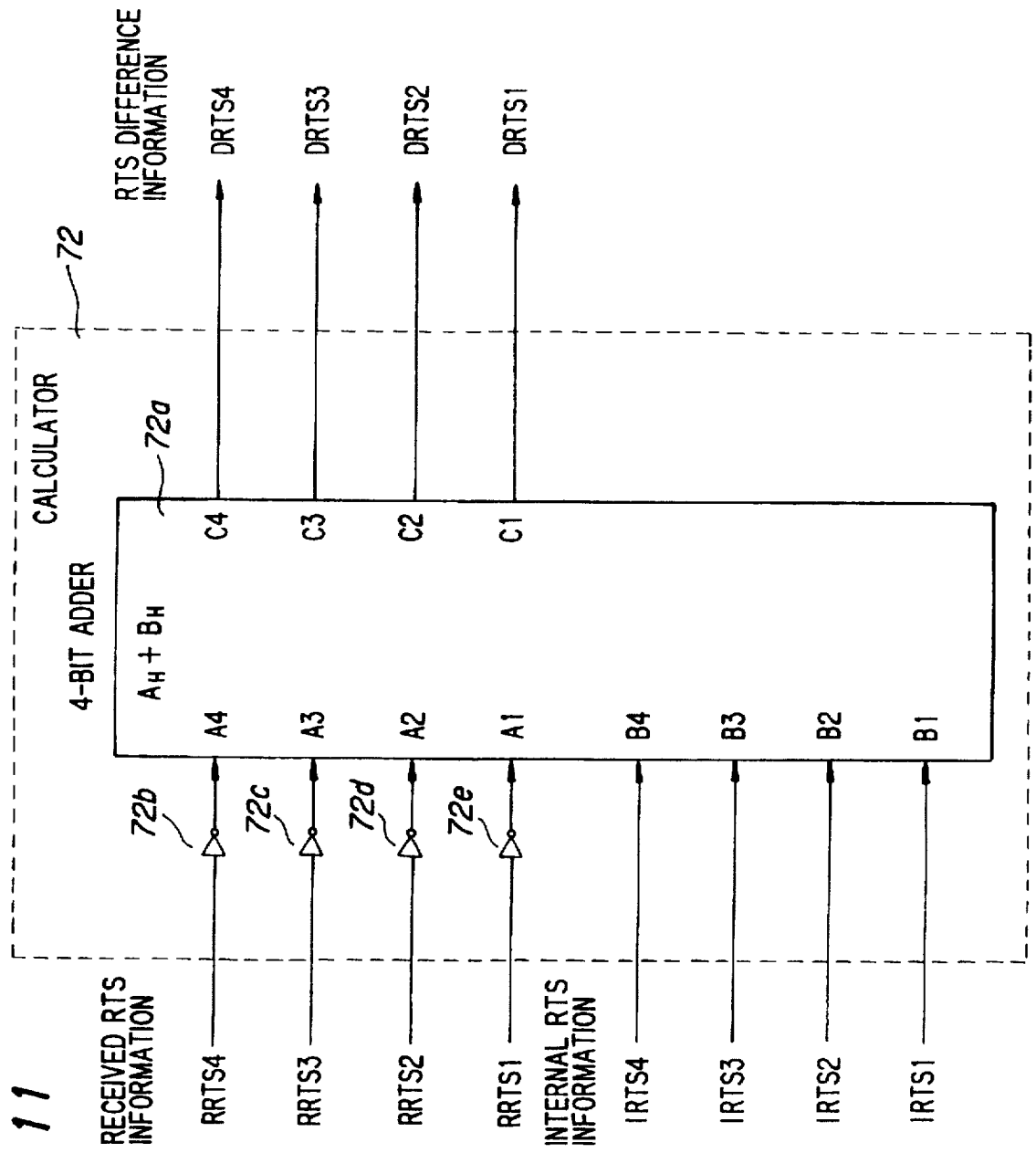
FIG. 11 shows the structure of the calculator in the first embodiment.

The calculator 72 calculates the difference $W_H$ between the received RTS information RRTS1 to RRTS4 ($Y_H$) which is decomposed and output from the received ATM cell RATM by the ATM cell decomposing portion 81 and the internal RTS information IRTS1 to IRTS4 ($X_H$). The calculator 72 has the structure shown in FIG. 11. In FIG. 11, the reference numeral 72a represents a 4-bit adder, and 72b to 72e NOT gates. The received RTS information RRTS1 to RRTS4 of 4 bits is input to the 4-bit adder 72a with the signs changed, while the internal RTS information IRTS1 to IRTS4 is input to the 4-bit adder 72a as it is. The 4-bit adder 72a calculates and outputs the difference $W_H$ (=$X_H$-$Y_H$) (RTS difference information DRTS1 to DRTS4) between the received RTS information RRTS1 to RRTS4 ($Y_H$) and the internal RTS information IRTS1 to IRTS4 ($X_H$), and outputs the difference $W_H$.

(b-5) Data Reception Clock Producing Portion

The data reception clock producing portion 73 is composed of a reference oscillator 73a for outputting a reference clock signal $C_{OSC}$ having a frequency $f_{OSC}$ of an integral multiple of the nominal value of the frequency of the user clock, a pulse adjuster 73b for dividing the frequency of the reference clock signal $C_{OSC}$ into 1/M and adjusting the divided frequency in accordance with the instruction for the increase or reduction of the number of pulses, a pulse frequency divider 73c for dividing the frequency of the adjusted clock $C_Q$ which is output from the pulse adjuster 73b into 1/N and outputting the data reception clock $C_{RU}$, a feedback line 73d for feeding back the data reception clock $C_{RU}$ to the internal RTS information producing portion 71, and a pulse controller 73e for instructing the pulse adjuster 73b to increase or reduce the number of pulses on the basis of the RTS difference information DRTS1 to DRTS4.

Reference Oscillator

Figure 12:
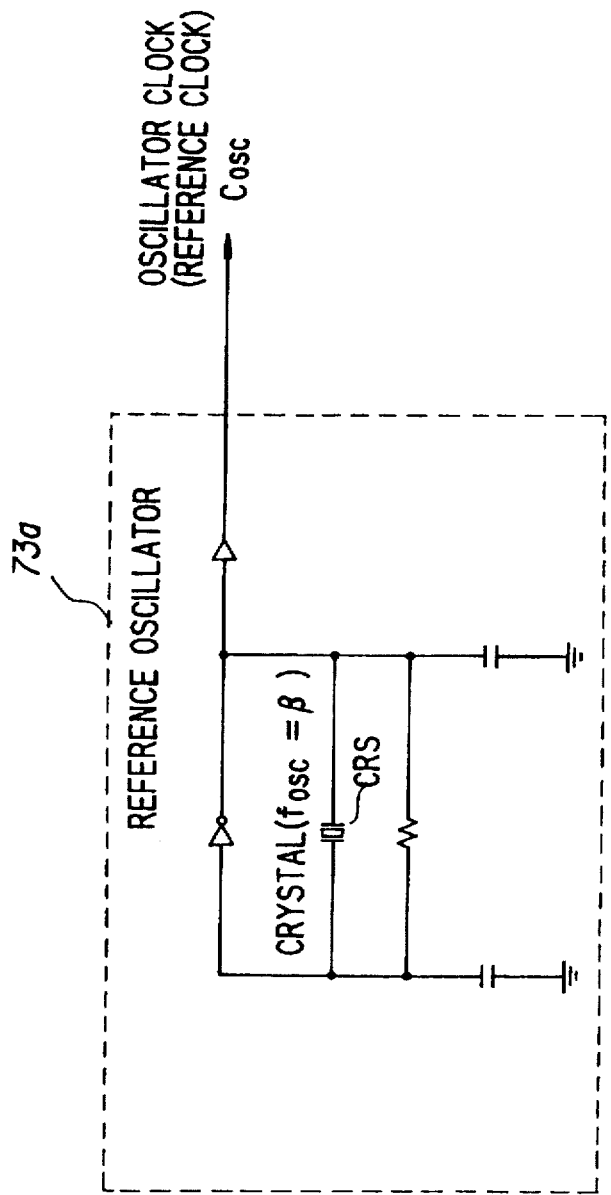
FIG. 12 shows the structure of the reference oscillator in the first embodiment.

The reference oscillator 73a has a structure of a crystal oscillator, as shown in FIG. 12. In FIG. 12, the symbol CRS represents a crystal.

In order to reproduce the data reception clock $C_{RU}$ which is synchronous with the data transmission clock $C_{TU}$ of the transmitting apparatus having a deviation of γ from the nominal value $f_{NOM}=\alpha H_Z$ (e.g., α=1.544×10$^6$ in DS1) of the frequency of the user clock, the reference oscillator 73a outputs the reference clock $C_{OSC}$ having a frequency $f_{OSC}=\beta$ Hz (β=α×M×N, M is an integer, for example, M=2, N=16, and β=49.408×10$^6$).

Pulse Controller

Figure 13:
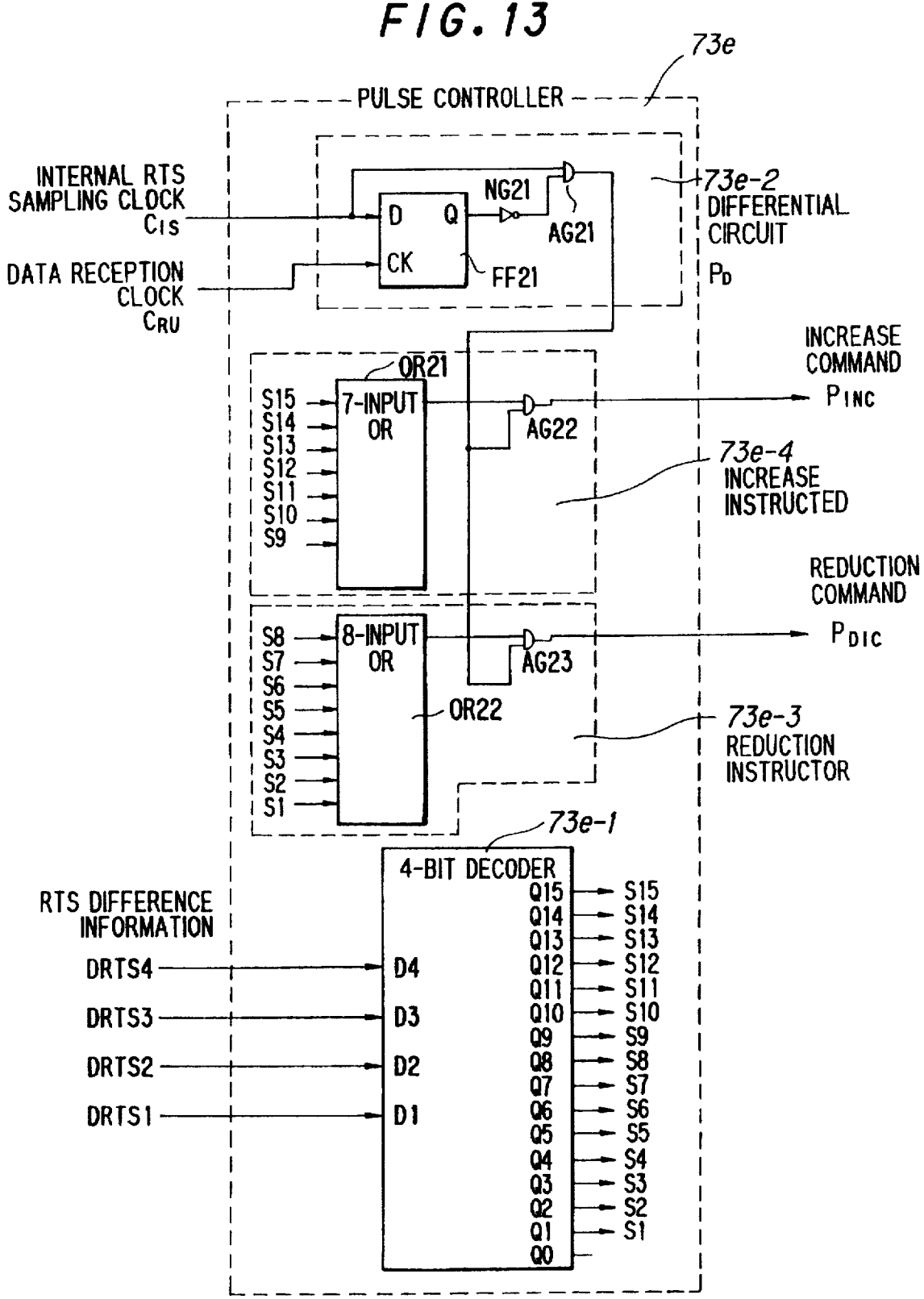
FIG. 13 shows the structure of the pulse controller in the first embodiment.

FIG. 13 shows the structure of the pulse controller 73e, and FIG. 14 shows the wave forms explaining the operation thereof. The symbol FF21 represents a flip flop, OR21 to OR22 OR gates, AG21 to AG23 AND gates and NG21 a NOT gate.

The reference numeral 73e-1 represents a decoder for converting the RTS difference information DRTS1 to DRTS4 into decimal numbers S1 to S15, 73e-2 a differential circuit for differentiating the internal RTS sampling clock $C_{IS}$ with the data reception clock $C_{RU}$ so as to output a pulse signal $P_D$ having a width of one clock, 73e-3 a reduction instructor for issuing a reduction command $P_{DIC}$ to the pulse adjuster 73b in synchronism with the pulse signal $P_D$ on the assumption that the internal RTS information IRTS1 to IRTS4 is in advance of the received RTS information RRTS1 to RRTS4 when the difference is S1 to S8, and 73e-4 an increase instructor for issuing an increase command $P_{INC}$ to the pulse adjuster 73b in synchronism with the pulse signal $P_D$ on the assumption that the internal RTS information IRTS1 to IRTS4 is behind the received RTS information RRTS1 to RRTS4 when the difference is S9 to S15. When the difference is $0_H$, neither the increase command nor the reduction command is issued.

The pulse controller 73e outputs the reduction command $P_{DIC}$ to the pulse adjuster 73b when the internal RTS information is in advance by referring to the RTS difference information DRTS1 to DRTS4 which is the difference between the received RTS information and the internal RTS information, and the pulse adjuster 73b reduces the number of pulses by one every time it receives the reduction command $P_{DIC}$. As a result, the data reception clock $C_{RU}$ with the frequency divided into 1/N by the pulse frequency divider 73c delays by 1/β of one step, so that the internal RTS information produced by the data reception clock $C_{RU}$ comes closer to the received RTS information. The operation is repeated unless the phase of the bit timing of the data reception clock agrees with that of the data transmission clock of the transmitting apparatus.

The pulse controller 73e outputs the increase command $P_{INC}$ to the pulse adjuster 73b when the internal RTS information is behind by referring to the RTS difference information DRTS1 to DRTS4 which is the difference between the received RTS information and the internal RTS information, and the pulse adjuster 73b increases the number of pulses by one every time it receives the increase command $P_{INC}$. As a result, the data reception clock $C_{RU}$ with the frequency divided into 1/N by the pulse frequency divider 73c advances by 1/β of one step, so that the internal RTS information produced by the data reception clock $C_{RU}$ comes closer to the received RTS information. This operation is repeated unless the phase of the bit timing of the data reception clock agrees with that of the data transmission clock of the transmitting apparatus.

The border of difference may be set between 1 to $7_H$ and F to $8_H$. This is determined by whether the difference information on $8_H$ is regarded as delay or advance.

However, since the actual difference information changes in the vicinity of $0_H$ (e.g., $E_H$, $F_H$, $0_H$, $1_H$, $2_H$) and does not become $8_H$, there is no substantial difference. If the difference information becomes $8_H$, it is not impossible to extract the data reception clock. Therefore, in the following explanation, it is assumed that the border is set between $1_H$ to $8_H$ and $F_H$ to $9_H$.

Pulse Adjuster

Figure 16A:
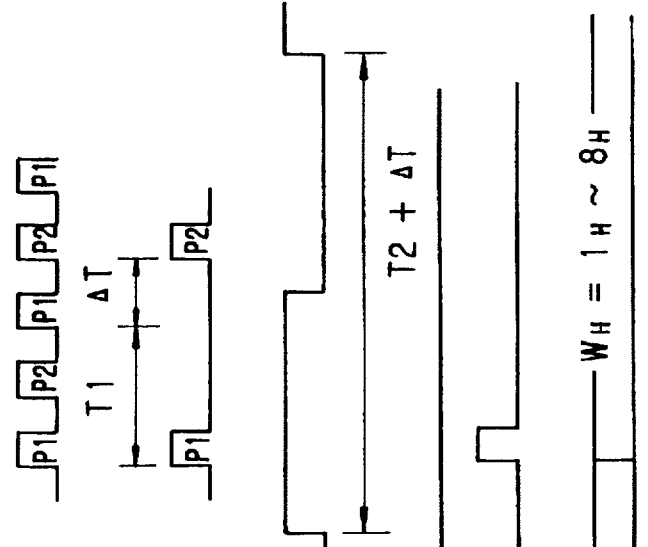
FIGS. 16A and 16B show the wave forms explaining the operation of the pulse adjuster shown in FIG. 15 when a reduction command is issued thereto.

FIG. 15 shows the structure of the pulse adjuster 73b in the case of M=2, FIG. 16 shows the wave forms explaining the operation of the pulse adjuster when the reduction command is issued thereto, and FIG. 17 shows the wave forms explaining the operation of the pulse adjuster when the increase command is issued thereto.

In FIG. 15, the symbols FF31 to FF36 represent flip flops, AG31 to AG36 AND gates, OR31 to OR33 OR gates, and NG31 to NG35 NOT gates.

At the time of initiation, all the flip flops FF31 to FF36 are reset. In this state, the flip flop FF31 is repeatedly set/reset every time the level of the reference clock $C_{OSC}$ becomes low, and the AND gates AG31 and AG32 alternately output pulses P1 and P2 every time the level of the reference clock $C_{OSC}$ becomes high. At the time of initiation, since the flip flop FF34 is reset, the pulse P1 output from the AND gate AG31 is output as the adjusted clock $C_Q$ through the AND gate AG 35 and the OR gate OR32. That is, the reference clock $C_{OSC}$ is output as the adjusted clock $C_Q$ with the frequency divided into ½ (see FIG. 16A).

In this state, if the reduction command $P_{DIC}$ is output from the pulse controller 73e, the flip flop FF32 is immediately set, and thereafter, when the level of the output of the AND gate AG32 becomes low (at the tail of the pulse P2), the flip flop FF33 at the next stage is set, and immediately thereafter the flip flop FF34 is set. The flip flops FF32 and FF33 are thereafter reset.

Figure 16B:
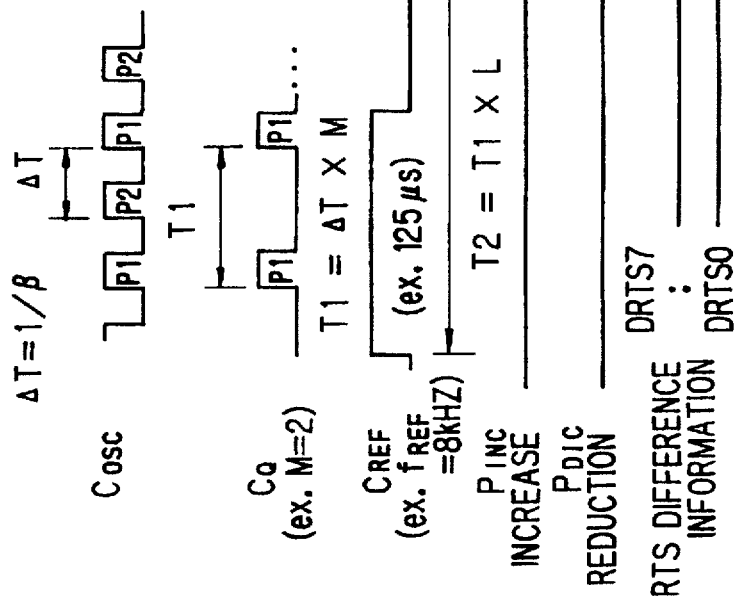

Since the flip flop FF34 is set at the tail of the pulse P2, the pulse P1 which is to be output is stopped outputting, so that the pulse P2 which is to be output from the AND gate AG32 is output instead through the AND gate AG36 and the OR gate OR32. As a result, although the pulse P1 is first output as the adjusted clock $C_Q$, the pulse P1 is stopped outputting immediately after the reduction command is issued, and the pulse P2 is thereafter output as the adjusted clock $C_Q$, as shown in FIG. 16B. Therefore, the adjusted clock $C_Q$ is reduced by one pulse. When the reduction command is issued again, the flip flop FF34 is reset and the adjusted clock $C_Q$ is reduced by one pulse in the same way.

On the other hand, if the increase command $P_{INC}$ is issued from the pulse controller 73e in the initial state, the flip flop FF35 is immediately set, and when the level of the output of the AND gate AG31 becomes low (at the tail of the pulse P1), the flip flop FF36 at the next stage is set and immediately thereafter the flip flop FF34 is set. The flip flops FF35 and FF36 are thereafter reset.

Since the flip flop FF34 is set at the tail of the pulse P1, the pulse P2 immediately after the pulse P1 is output through the AND gate AG36 and the OR gate OR32. As a result, although the pulse P1 is first output as the adjusted clock $C_Q$, since the pulse P2 is output as the adjusted clock $C_Q$ immediately after the increase command is issued, one pulse is thereafter added to the adjusted clock $C_Q$, as shown in FIG. 17B. The adjusted clock $C_Q$ is therefore increased by one pulse. When the increase command is issued again, the adjusted clock $C_Q$ is increased by one pulse in the same way.

(b-6) Entire Operation

Transmitting Operation

The network clock frequency dividing portion 74a of the network timing information producing portion 74 divides the frequency of the network clock $C_N$ which is output from the ATM cell decomposing portion 81 into ½ and produces the frequency-divided network clock $C_{NX}$. The 4-bit binary counter portion 74b counts the network clock $C_{NX}$ and outputs the network timing information $Q_1$ to $Q_4$.

The transmission frequency division counter portion 51a of the transmission RTS information producing portion 51 divides the frequency of the data transmission clock $C_{TU}$ into 1/3008 so as to output the RTS transmission sampling timing clock $C_{TS}$ to the transmission RTS information producing circuit 51b. The transmission frequency division counter portion 51a also inputs the RTS transmission sampling timing clock $C_{TS}$ to the ATM cell assembling portion 61 as the RTS transmission clock $C_{TCK}$. The transmission RTS information producing circuit 51b samples the network timing information $Q_1$ to $Q_4$ at the rise of the RTS transmission sampling timing clock $C_{TS}$ so as to output the transmission RTS information TRTS1 to TRTS4 to the ATM cell assembling portion 61.

When the transmitted user data $D_{TU}$ and the data transmission clock $C_{TU}$ which is synchronous therewith and the transmission RTS information TRTS1 to TRTS4 and the RTS transmission clock $C_{TCK}$ which is synchronous therewith are input to the ATM cell assembling portion 61, the ATM cell assembling portion 61 assembles an ATM cell from the transmitted user data $D_{TU}$ and the transmission RTS information and supplying the ATM cell (transmission ATM cell TATM) to the ATM network in synchronism with the network clock $C_N$.

Receiving Operation

Figure 18:
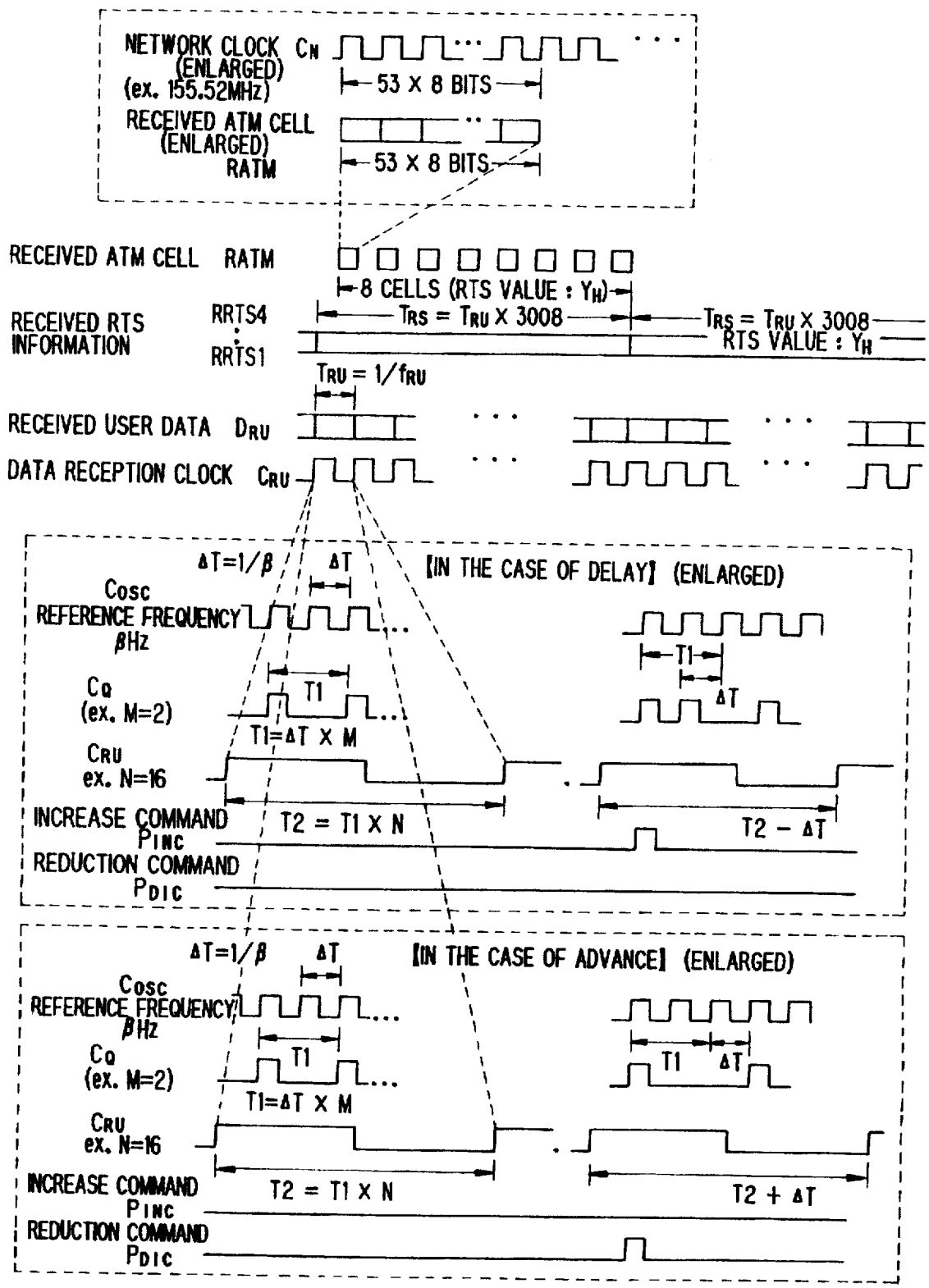
FIG. 18 shows the wave forms explaining the RTS receiving operation.

FIG. 18 shows the wave forms explaining the receiving operation.

The internal RTS information producing portion 71 and the data reception clock producing portion 73 respectively produce the RTS reception clock $C_{RCK}$ and the data reception clock $C_{RU}$ in the following manner and input them to the ATM cell decomposing portion 81.

The ATM cell decomposing portion 81 extracts the network clock $C_N$ from the ATM cell received from the ATM network, inputs the network clock $C_N$ to each element, and decomposes the received ATM cell into the user data $D_{RU}$ and the received RTS information RRTS1 to RRTS4. The ATM cell decomposing portion 81 then outputs the user data $D_{RU}$ in synchronism with the data reception clock $C_{RU}$ which is input from the data reception clock producing portion 73 and the received RTS information in synchronism with the RTS reception clock $C_{RCK}$ which is output from the internal RTS information producing portion 71.

The internal RTS timing generator 71a divides the frequency of the data reception clock $C_{RU}$ which is input form the data reception clock producing portion 73 into ⅓₀₀₈ and outputs the internal RTS sampling clock $C_{IS}$ to the internal RTS information producing circuit 71b. The internal RTS sampling clock $C_{IS}$ is also input to the ATM cell decomposing portion 81 as the RTS reception clock $C_{RCK}$. The internal RTS information producing circuit 71b produces the internal RTS information IRTS1 to IRTS4 by sampling the network timing information $Q_1$ to $Q_3$ at the rise of the internal RTS sampling clock, and inputs the internal RTS information to the calculator 72.

The calculator 72 calculates the difference between the internal RTS information IRTS1 to IRTS4 and the received RTS information RRTS1 to RRTS4 contained in the received ATM cell, and inputs the difference to the pulse controller 73e of the data reception clock producing portion 73. The pulse controller 73e outputs the reduction command $P_{DIC}$ to the pulse adjuster 73b on the assumption that the internal RTS information IRTS1 to IRTS4 is in advance of the received RTS information RRTS1 to RRTS4 when the difference is S1 to S8, while outputting the increase command $P_{INS}$ to the pulse adjuster 73b on the assumption that the internal RTS information IRTS1 to IRTS4 is behind the received RTS information RRTS1 to RRTS4 when the difference is S9 to S15.

The pulse adjuster 73b divides the frequency of the reference clock signal $C_{OSC}$ output from the reference oscillator 73a into 1/M and outputs the adjusted clock $C_Q$ with one pulse subtracted therefrom when the reduction command $P_{DIC}$ is issued while one pulse added thereto when the increase command $P_{INC}$ is input. The pulse frequency divider 73c divides the frequency of the adjusted clock $C_Q$ into 1/N and outputs the data reception clock $C_{RU}$ to the ATM cell decomposing portion 81 and feeds it back to the internal RTS timing generator 71a.

As a result, when the adjusted clock $C_Q$ is reduced by one pulse, the data reception clock $C_{RU}$ the frequency of which is divided into N/1 by the pulse frequency divider 73c at the next stage delays by 1/β of one step, so that the internal RTS information IRTS1 to IRTS4 produced thereby comes closer to the received RTS information RRTS1 to RRTS4. This operation is repeated unless the phase of the bit timing of the data reception clock agrees with that of the data transmission clock of the transmitting apparatus. On the other hand, when the adjusted clock $C_Q$ is increased by one pulse, the data reception clock $C_{RU}$ with the frequency divided into 1/N by the pulse frequency divider 73c at the next stage advances by 1/β of one step, so that the internal RTS information produced thereby comes closer to the received RTS information. This operation is repeated unless the phase of the bit timing of the data reception clock agrees with that of the data transmission clock of the transmitting apparatus.

According to the above-described control, it is possible to finally conform the timing of the data reception clock $C_{RU}$ with the timing of the data transmission clock $C_{TU}$. Consequently, the received user data $D_{RU}$ is output from the ATM cell decomposing portion 81 at the same timing as the data transmission clock.

Since the user data is output from the ATM cell decomposing portion 81 in synchronism with the data reception clock and the received RTS information RRST1 to RRST4 is also output in synchronism with the RTS reception clock $C_{RCK}$, both the demand for a reduction in jitters and the demand for an improvement of the follow-up performance are satisfied. In order to output both the received user data $D_{RU}$ and the received RTS information RRTS1 to RRTS4 in synchronism with the data reception clock $C_{RU}$, the data reception clock $C_{RU}$ is required to have the following properties: (1) few clock jitters as the timing signal of the received user data, and (2) good follow-up performance as the timing signal of the received RTS information. However, both of the demands (1) and (2) can not always be satisfied compatibly. According to the first embodiment, since the user data is output in synchronism with the data reception clock $C_{RU}$ and the received RTS information RRST1 to RRST4 is also output in synchronism with the RTS reception clock $C_{RCK}$, jitters in the data reception clock are reduced and the RTS reception clock is produced with good follow-up performance. That is, both demands (1) (2) are satisfied.

(c) Second Embodiment (c-1) Investigation on the First Embodiment

The first embodiment has the following problems (1) to (3).

(1) If it is assumed that the nominal value $f_{NOM}$ of the frequency of the user clock is α Hz, the frequency $f_{OSC}$ of the output clock (reference clock) $C_{OSC}$ of the reference oscillator 73a is $f_{OSC}=\beta$ Hz $(B=\alpha \times M \times N, N$ is an integer), and the jitter ΔT at the time when the data reception clock $C_{RU}$ is corrected by ΔT every step is ΔT=1/β sec.

Since the period $T_{RU}$ of the data reception clock is $T_{RU}=1/f_{RU}=1/\alpha$, the ratio UI (jitter ratio) of the jitter to the period of the data reception clock is $UI=\Delta T/T_{RU}=\alpha/\beta=1/(M\times N)$.

Therefore, in order to reduce the jitter ratio UI, it is necessary to increase M×N. However, if the jitter ratio is reduced, the frequency $f_{OSC}$ of the reference clock $C_{OSC}$ $f_{OSC}=\beta$ Hz (B=Δ×M×N) is increased, so that the power consumption is inconveniently increased. For example, in DS1, α=1.544 MHz. In this case, in order to reduce the jitter ratio UI to not more than 0.1, M×N must be at least not less than 10. If M×N≧16, β≧24.704 MHz.

(2) Since the nominal value α of the frequency of the user clock which can be supported by the SRTS method is less than ½ of the frequency $f_N$ of the network clock, in the B-ISDN in which the frequency $f_N$ of the network clock is $f_N$=155.52 MHz, the frequency of the user clock must be supported until $f_{NOM}$=77.76 MHz.

For example, when the frequency $f_{RU}$ of the user clock is $f_{RU}$=44.736 MHz as in a DS3 interface, if M×N≧16 in order to keep the jitter ratio at not more than 0.1, β=715.776 MHz. Accordingly, in the first embodiment, when a high-speed user clock is used, an element having a very high speed is required.

(3) If it is assumed that the amount of correction ΔT for correcting the data reception clock $C_{RU}$ at every step is $\Delta T=1/\beta$ sec, and the period of the data reception clock $C_{RU}$ is $T_{RU}$, the period T of correction of the data reception clock is, $T=3008\times T_{RU}=3008/\alpha$.

Accordingly, the range W of the allowable deviation of the reproducible user clock is $W=\Delta T/T=(1/\beta)\times(\alpha/3008)=1/(3008\times M\times N)$.

That is, if M×N is increased in order to reduce the jitter ratio, the range of the allowable deviation of the user clock from the nominal value is inconveniently reduced.

(c-2) Difference Between the First Embodiment and the Second Embodiment

Figure 19:
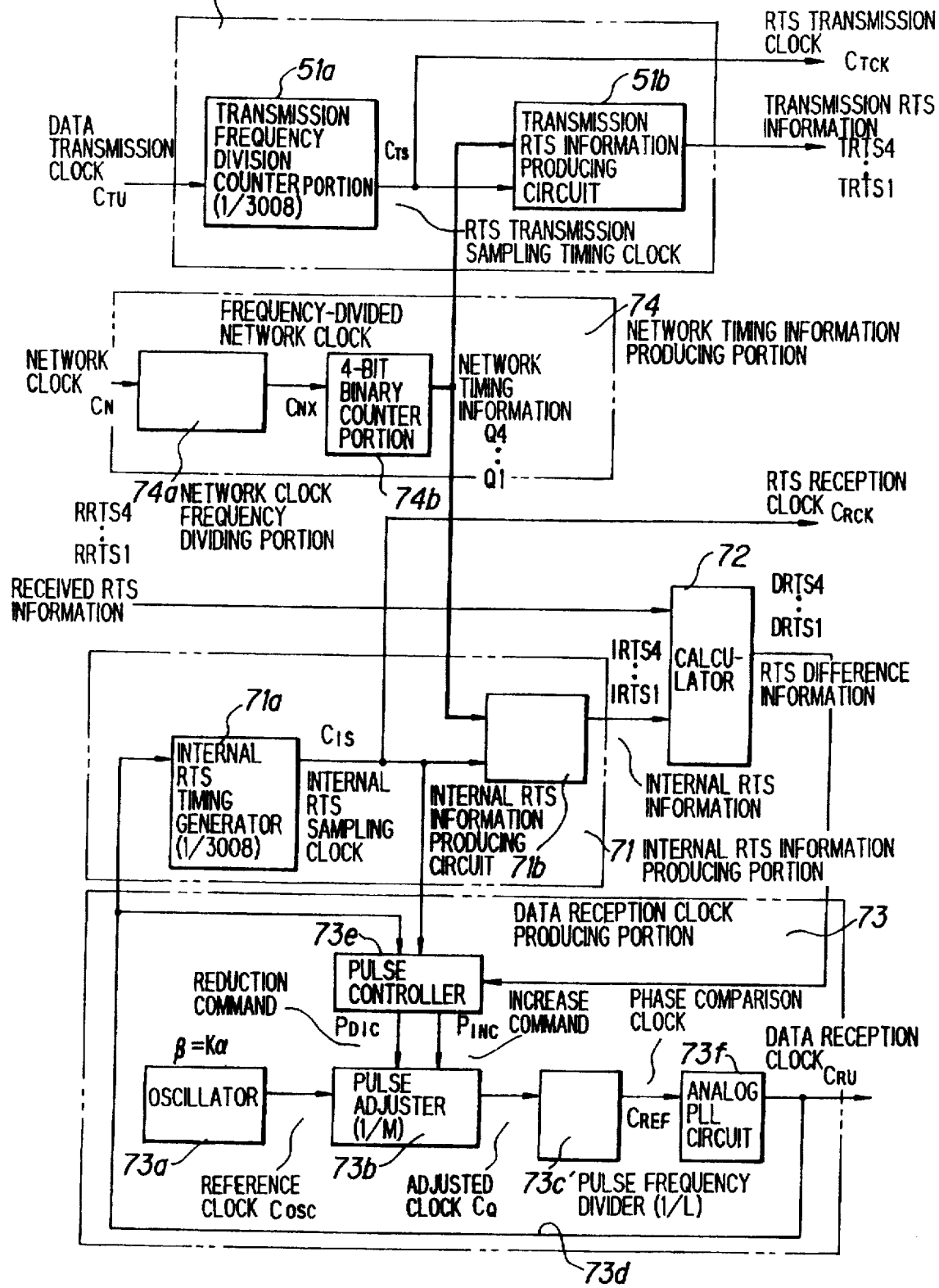
FIG. 19 shows the structure of a second embodiment of an ATM interface device according to the present invention.

FIG. 19 shows the structure of the second embodiment of an ATM interface device according to the present invention. The same reference numerals are provided for the elements which are the same as those in the first embodiment shown in FIG. 4.

The second embodiment is different from the first embodiment in the following points.

(1) An analog PLL circuit 73f is provided within the digital PLL system of the first embodiment.

(2) The frequency $f_{OSC}$ of the reference clock $C_{OSC}$ output from the reference oscillator 73a is input to the pulse adjuster 73b as a frequency approximately equal to the frequency of the user clock.

(3) The frequency of the adjusted clock $C_Q$ which is output from the pulse adjuster 73b is divided into 1/L by a pulse frequency divider 73c' to produce and output a phase comparison clock $C_{REF}$ to the analog PLL circuit 73f.

(4) The analog PLL circuit 73f produces the data reception clock $C_{RU}$ and feeds it back to the internal timing generator 71a.

(5) The feedback system is so designed that the internal timing generator 71a produces the internal sampling clock $C_{IS}$ by dividing the frequency of the data reception clock $C_{RU}$ into 1/3008.

(c-3) Operation

The range of the allowable jitter in the analog PLL is ordinarily about 1 clock of the frequency input to the analog PLL, in other words, about 1/α of the period of the nominal value of the frequency of the user clock. The reference oscillator 73a outputs the frequency clock $C_{OSC}$ having the frequency $f_{OSC}=\beta$ Hz (B=α×K; K is an integer). K is about 1 to 4.

Figure 20:
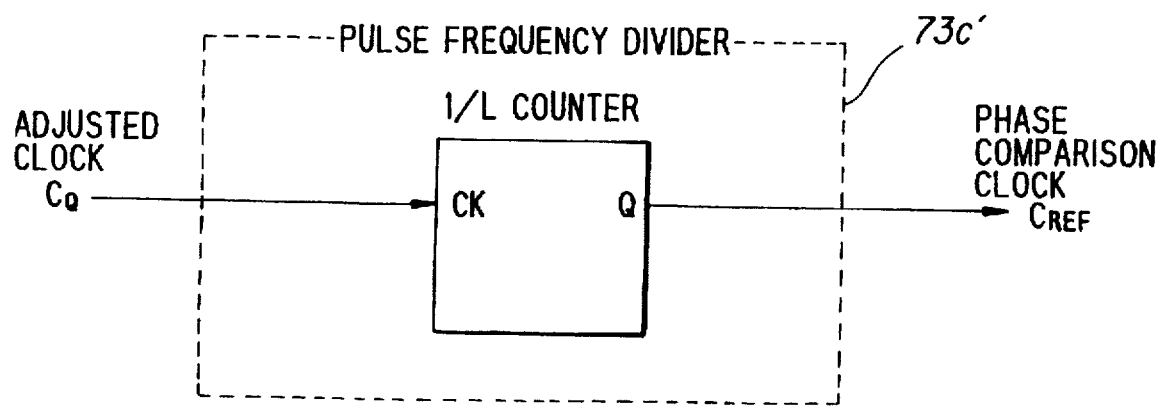
FIG. 20 shows the structure of the pulse frequency divider in the second embodiment.

The pulse adjuster 73b divides the frequency of the reference clock $C_{OSC}$ into 1/M (e.g., M=2), and further increases or reduces the number of pulses in accordance with the increase command or the reduction command, thereby outputting the adjusted clock $C_Q$. The pulse frequency divider 73c', which is composed of a counter, as shown in FIG. 20, divides the frequency of the adjusted clock $C_Q$ into 1/L (L=α×K/($f_{REF}$×M)) and outputs the phase comparison clock $C_{REF}$ (frequency $f_{REF}$: e.g., 8 KHz).

Figure 21:
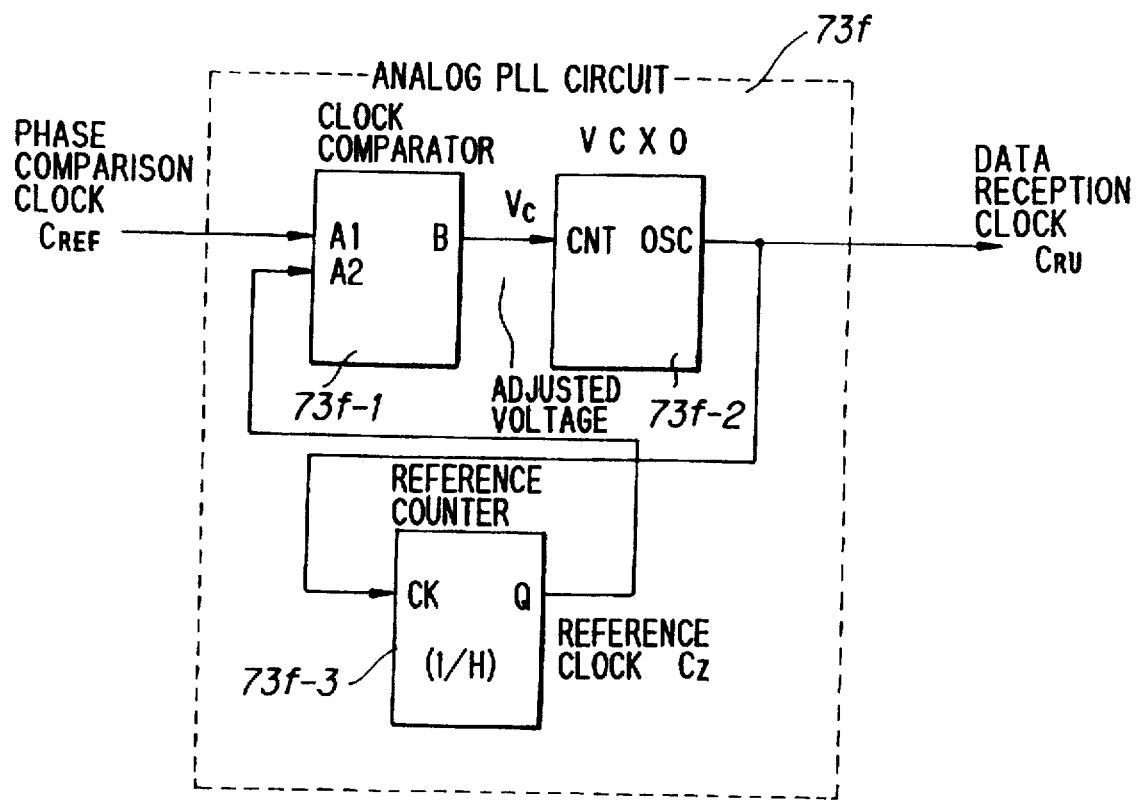
FIG. 21 shows the structure of the analog PLL circuit in the second embodiment.

When the phase comparison clock $C_{REF}$ is input to the analog PLL circuit 73f, it reproduces the data reception clock $C_{RU}$ which is synchronous with the phase comparison clock $C_{REF}$ by the PLL operation. The analog PLL circuit 73f has the structure shown in FIG. 21. In FIG. 21, the reference numeral 73f-1 represents a clock comparator for comparing the phase comparison clock $C_{REF}$ with the phase of the reference clock $C_Z$ (obtained by dividing the frequency of the data reception clock into 1/H) and outputting the voltage corresponding to the phase difference, 72f-2 a voltage control oscillator (VCXO) for outputting the clock (data reception clock) $C_{RU}$ having a frequency which is proportional to the input voltage, and 72f-3 a frequency divider (reference counter) for dividing the frequency of the data reception clock into 1/H and outputting the reference clock.

Figure 22:
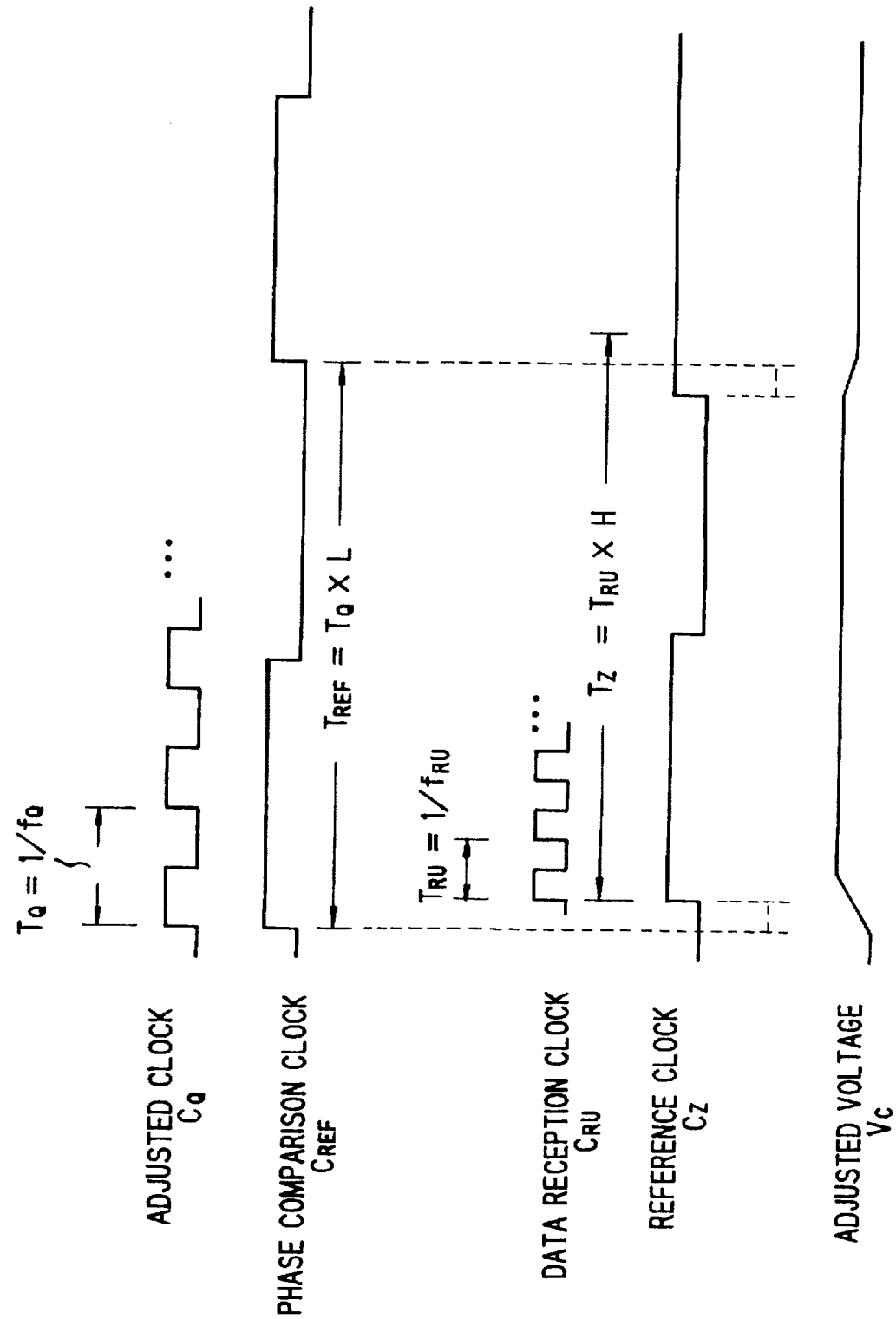
FIG. 22 shows the wave forms explaining the operation of the analog PLL circuit shown in FIG. 21.

The operation of the analog PLL circuit 73f will be explained with reference to the wave forms shown in FIG. 22. The voltage control oscillator 73f-2 outputs the clock (data reception clock $C_{RU}$) having the reference frequency equal to the nominal value α of the frequency of the user clock, and the reference counter 73f-3 divides the frequency of the data reception clock into 1/H so as to output the reference clock $C_Z$. The clock comparator 73f-1 compares the phase of the phase comparison clock $C_{REF}$ with the phase of the reference clock $C_Z$, and when the reference clock $C_Z$ is behind the phase comparison clock $C_{REF}$, the clock comparator 73f-1 raises the voltage so as to increase the frequency of the output clock (data reception clock) of the voltage control oscillator 73f-2. On the other hand, when the reference clock $C_Z$ is in advance of the phase comparison clock $C_{REF}$, the clock comparator 73f-1 lowers the voltage so as to reduce the frequency of the output clock (data reception clock) of the voltage control oscillator 73f-2. According to this feedback control, the data reception clock $C_{RU}$ which is synchronous with the phase comparison clock $C_{REF}$ is output.

When the nominal value α of the frequency of the user clock is low, the insertion of the analog PLL circuit 73 does not greatly influence the total feedback time, so that there is no problem in the follow-up performance. The period (correction period) T is represented by the formula T=3008× $T_{RU}$=3008/α (wherein $T_{RU}$ is the period of the data reception clock). If the nominal value α of the frequency of the user clock is low (e.g., α=1.544×10⁶), the correction period T=3008/α≈1.95 ms. On the other hand, the feedback period $T_{REF}$ in accordance with the phase comparison clock in the analog PLL (e.g., input: $f_{REF}$=8 KHz, output: $f_{RU}$=1.544 MHz) is 125 μs ($T_{REF}$=125 μs). Since this feedback period $T_{REF}$ is sufficiently shorter than the period T (1.95 ms) of the feedback timing in accordance with the received RTS information, the insertion of the analog PLL does not greatly influence the total feedback time.

The data reception clock $C_{RU}$ produced by the analog PLL circuit 73f is input to the internal RTS timing generator 71a, and the frequency of the data reception clock is divided by 3008 so as to produce the internal RTS sampling clock $C_{IS}$. The internal RTS sampling clock $C_{IS}$ is output as the RTS reception clock $C_{RCK}$ which is synchronous with the received RTS information.

Thereafter, the internal RTS information IRTS1 to IRTS4 is produced in the same way as in the first embodiment, and the pulse controller 73e outputs the reduction command $P_{DIC}$ or the increase command $P_{INC}$ to the pulse adjuster 73b in accordance with the difference between the internal RTS information IRTS1 to IRTS4 and the received RTS information RRTS2 to RRTS4. The pulse adjuster 73b divides the frequency of the reference clock $C_{OSC}$ into 1/M (M=2), and reduces the pulse by one when the reduction command $P_{DIC}$ is input, while increasing the pulse by one when the increase command $P_{INC}$ is input. In this manner, the pulse adjuster 73b outputs the adjusted clock $C_Q$. The pulse frequency divider 73c divides the frequency of the adjusted clock $C_Q$ into 1/L, and inputs the phase comparison clock $C_{REF}$ to the analog PLL circuit 73f. Thereafter, similar feedback control is conducted.

According to the second embodiment, when the nominal value $\alpha$ of the frequency of the user clock is comparatively low, since K=1 to 4 in the frequency $f_{OSC}$ (=$\beta$=$\alpha \times K$) of the reference clock $C_{OSC}$ is sufficient, it is possible that the frequency of the reference clock is approximately equal to the frequency of the user clock. In other words, it is possible to reduce the frequency of the reference clock $C_{OSC}$ in comparison with the frequency $f_{OSC}$ (=$\beta$=$\alpha \times M \times N$, $M \times N \geq 10$) in the first embodiment, thereby enabling the reduction in the power consumption and the jitter in the data reception clock. The range W of the allowable deviation of the frequency of the user clock from the nominal value is $$W = \Delta T/T = (1/\beta) \times (\alpha/3008) = 1/(3008 \times K),$$

and since about 1 to 4 is sufficient as the actual value of K, the range is larger than the range in the first embodiment $$W = 1/(3008 \times M \times N).$$

(c-4) Modification of Second Embodiment

Figure 23:
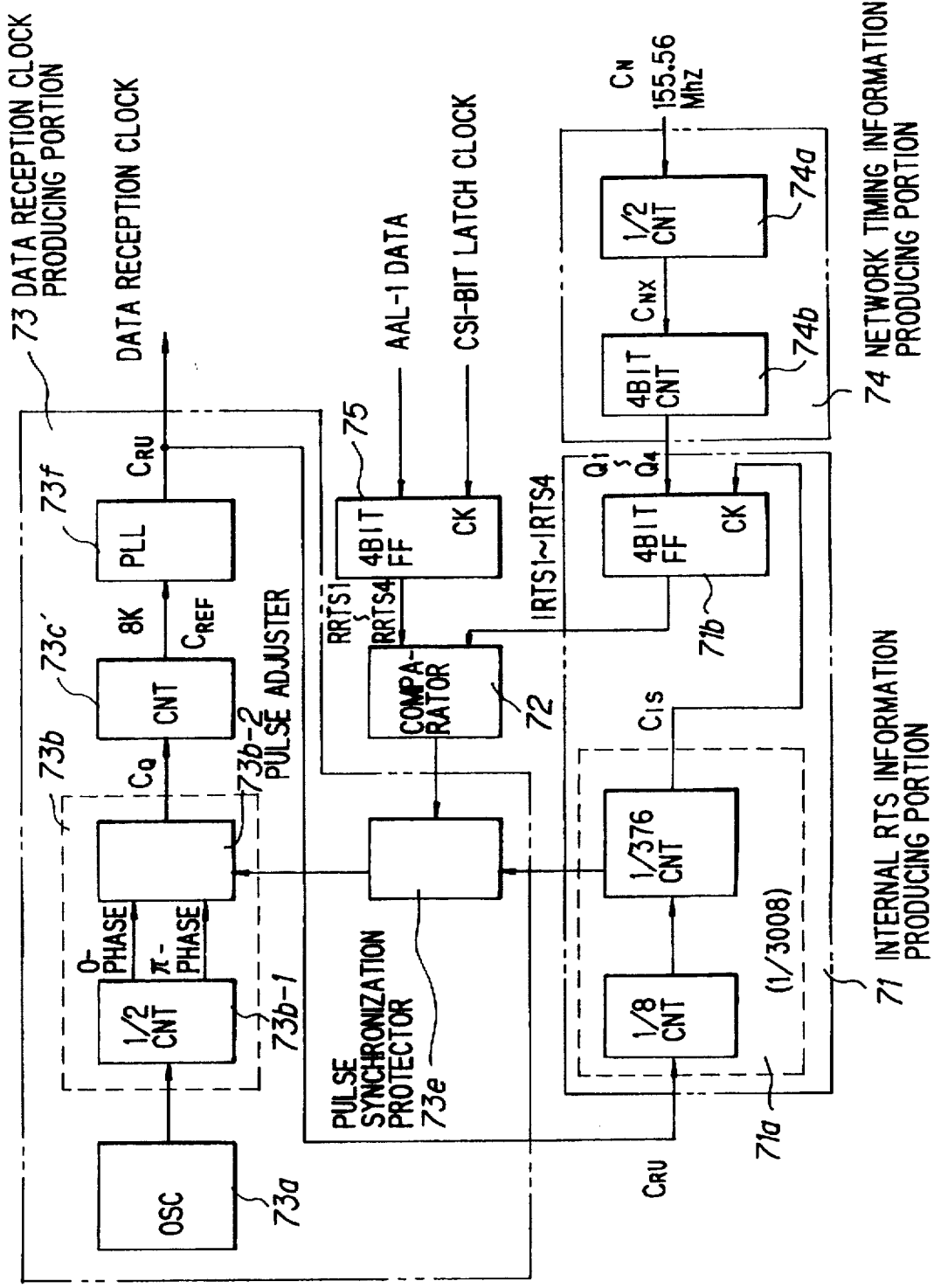
FIG. 23 shows a modification of the second embodiment of the present invention.

FIG. 23 shows a modification of the second embodiment of the present invention. The same reference numerals are provided for the elements which are the same as those in the second embodiment shown in FIG. 19. In FIG. 23, the reference numeral 71 represents an internal RTS information producing portion, 72 a comparator (calculator), 73 a data reception clock producing portion, 74 a network timing information producing portion, and 75 a flip flop of 4 bits for storing the received RTS information RTS1 to RTS4.

The network timing information producing portion 74 produces network timing information $Q_1$ to $Q_4$ of 4 bits which is necessary for the production of the transmission RTS information and the internal RTS information. It is provided with a network clock frequency dividing portion 74a and a 4-bit binary counter portion 74b.

The internal RTS information producing portion 71 produces the internal RTS information IRTS1 to IRTS4 which is the timing information on the data reception clock $C_{RU}$ by using the frequency (=156.56 MHz) of the network clock $C_N$ and the frequency of the data reception clock $C_{RU}$ by the SRST method, and it is composed of an internal RTS timing generator 71a and an internal RTS information producing circuit 71b. The internal RTS timing generator 71a sequentially divides the frequency ($f_{RU}$) of the data reception clock $C_{RU}$ into ⅛ and ⅟376, namely totally into ⅟3008 and outputs an internal RTS sampling clock $C_{IS}$ (frequency $f_{IS}=f_{RU}/$ 3008). The internal RTS information producing circuit 71b is provided with four flip flops, and sets the network timing information $Q_1$, $Q_2$, $Q_3$, $Q_4$ at the rise of the internal RTS sampling clock $C_{IS}$ and samples and outputs the internal RTS information IRTS1, IRTS2, IRTS3 and IRTS4.

The comparator (calculator) 72 compares the received RTS information RRTS1 to RRTS4 with the internal RTS information IRTS1 to IRTS4.

The data reception clock producing portion 73 is composed of a reference oscillator 73a for outputting a reference clock signal $C_{OSC}$ having a frequency $f_{OSC}$ of an integral multiple of the nominal value of the frequency of the user clock, a pulse frequency divider 73b-1 for dividing the frequency of the reference clock signal output from the reference oscillator 73a into ½ and outputting two frequency-divided clock trains having phases 0 and $\pi$ which are different from each other by 180°, a pulse adjuster 73b-2 for increasing one frequency-divided clock train (0-phase) by adding one clock pulse of the other frequency-divided clock train ($\pi$-phase) in accordance with the increase command, while eliminating one clock pulse from the one frequency-divided clock train ($\pi$-phase) in accordance with the reduction command, and outputting the one frequency-divided clock train (0-phase) as the adjusted clock signal $C_Q$, a pulse frequency divider 73c' for dividing the frequency of the adjusted clock $C_Q$ which is output from the pulse adjuster 73b-2 and outputting the phase comparison clock $C_{REF}$ having a frequency of 8 KHz, a PLL circuit for producing the data reception clock $C_{RU}$ which is synchronous with the phase comparison clock $C_{REF}$ by the PLL operation, and a pulse controller 73e (DPPL synchronization protector) for instructing the pulse adjuster 73b-2 to increase or reduce the number of pulses on the basis of result of the comparison between the internal RTS information and the received RTS information contained in the ATM cell received from the ATM network. The symbol DPLL represents a digital PLL.

Operation

Figure 24A:
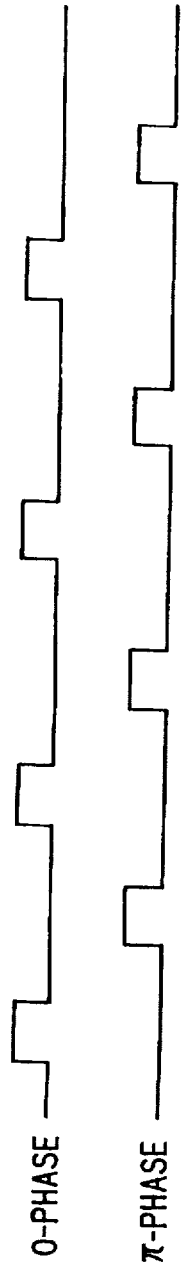
FIGS. 24A to 24C explain the clock adjusting operation in the modification of the second embodiment shown in FIG. 23.

The reference oscillator 73a outputs a clock signal having a frequency of 3.088 MHz when the DS1 PCM transmission line is connected to the ATM network, while outputting a clock signal having a frequency of 44.736 MHz when the DS3 PCM transmission path is connected to the ATM network. The frequency divider 73b-1 divides the frequency of the clock signal output from the reference oscillator 73a into ½ and outputs two frequency-divided clock trains (0-phase, $\pi$-phase) shown in FIG. 24A. These two frequency-divided clock trains are input to the pulse adjuster 73b-2.

In the network timing information producing portion 74, the network clock frequency dividing portion 74a divides the frequency (=156.56 MHz) of the network clock $C_N$ into ½, and the 4-bit binary counter portion 74b outputs the network timing information $Q_1$ to $Q_4$. The internal RTS information producing circuit 71b sets the network timing information $Q_1$, $Q_2$, $Q_3$, $Q_4$ of 4 bits at the rise of the internal RTS sampling clock $C_{IS}$ and outputs the internal RTS information IRTS1, IRTS2, IRTS3 and IRTS4. The comparator 72 compares the received RTS information RRTS1 to RRTS4 with the internal RTS information IRTS1, IRTS2, IRTS3 and IRTS4.

Figure 24B:
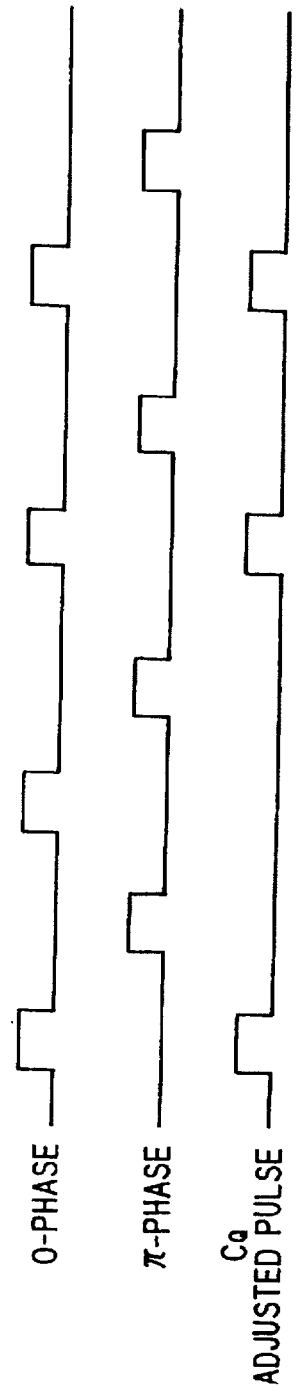
Figure 24C:
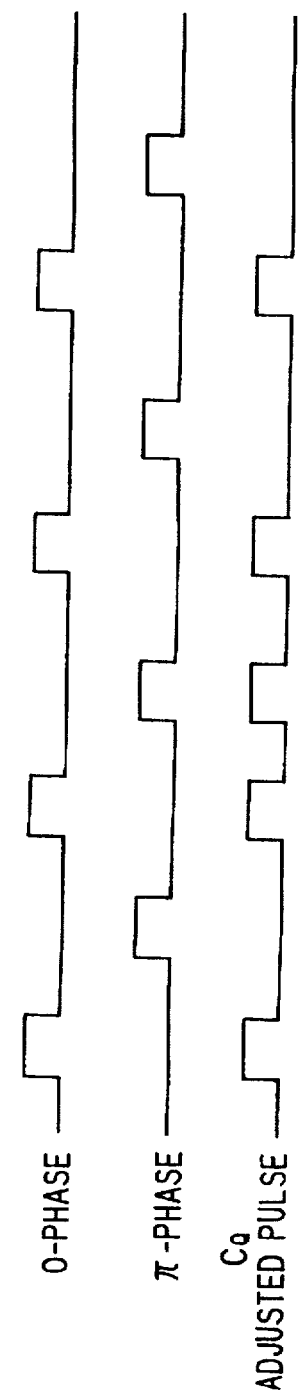

The pulse controller of synchronization protector 73e outputs the reduction command $P_{DIC}$ or the increase command $P_{INC}$ on the basis of the result of the comparison between the internal RTS information IRTS1, IRTS2, IRTS3 and IRTS4 and the received RTS information RRTS1 to RRTS4. When the data reception clock $C_{RU}$ is in advance of the data transmission clock $C_{TU}$, the synchronization protector 73e outputs the reduction command $P_{DIC}$. On the other hand, when the data reception clock $C_{RU}$ is behind the data transmission clock $C_{TU}$, the synchronization protector 73e outputs the increase command $P_{INC}$. The pulse adjuster 73b-2 increases one frequency-divided clock train (0-phase) by adding one clock pulse of the other frequency-divided clock train (π-phase) (see FIG. 24C) in accordance with the increase command $P_{INC}$, while eliminating one clock pulse from the one frequency-divided clock train (π-phase) in accordance with the reduction command $P_{DIC}$ (see FIG. 24B), and outputs the one frequency-divided clock train (0-phase) as the adjusted clock signal $C_Q$.

The pulse frequency divider 73c' divides the frequency of the adjusted clock $C_Q$ into 1/L and outputs the phase comparison clock $C_{REF}$ having a frequency of 8 KHz. 1/L is 1/193 in the case of the DS1 PCM transmission line, and 1/2796 in the case of the DS3 PCM transmission line.

When the phase comparison clock $C_{REF}$ is input to the PLL circuit 73f, it produces the data reception clock $C_{RU}$ which is synchronous with the phase comparison clock $C_{REF}$ by the PLL operation. The data reception clock produced by the analog PLL circuit 73f is input to the internal RTS timing generator 71a, and the frequency thereof is divided into 1/3008. The internal RTS timing generator 71a thus outputs the internal RTS sampling timing clock $C_{IS}$. Thereafter, the internal RTS information IRTS1, IRTS2, IRTS3 and IRTS4 is similarly produced and the above-described operation is repeated until the frequency of the data reception clock becomes 1.544 MHz in the case of the DS1 PCM transmission line, and 44.736 MHz in the case of the DS3 PCM transmission line, and the data reception clock becomes synchronous with the data transmission clock.

(d) Third Embodiment (d-1) Investigation of the Second Embodiment

In the second embodiment, when the nominal value of the frequency of the user clock is high, for example, in the case of α=44.736 MHz, the correction period T of the user clock is T=3008/α≈67 μs. For this reason, the feedback period $T_{REF}$ of the analog PLL circuit (e.g., when the frequency of 8 KHz is input, $T_{REF}$=125 μs) is ordinarily equal to or longer than the correction period T, so that the insertion of the analog PLL circuit increases the feedback time and the follow-up performance in a high-speed user clock is insufficient. That is, the second embodiment is disadvantageous when the nominal value of the frequency of the user clock is high.

(d-2) Structure of the Third Embodiment

Figure 25:
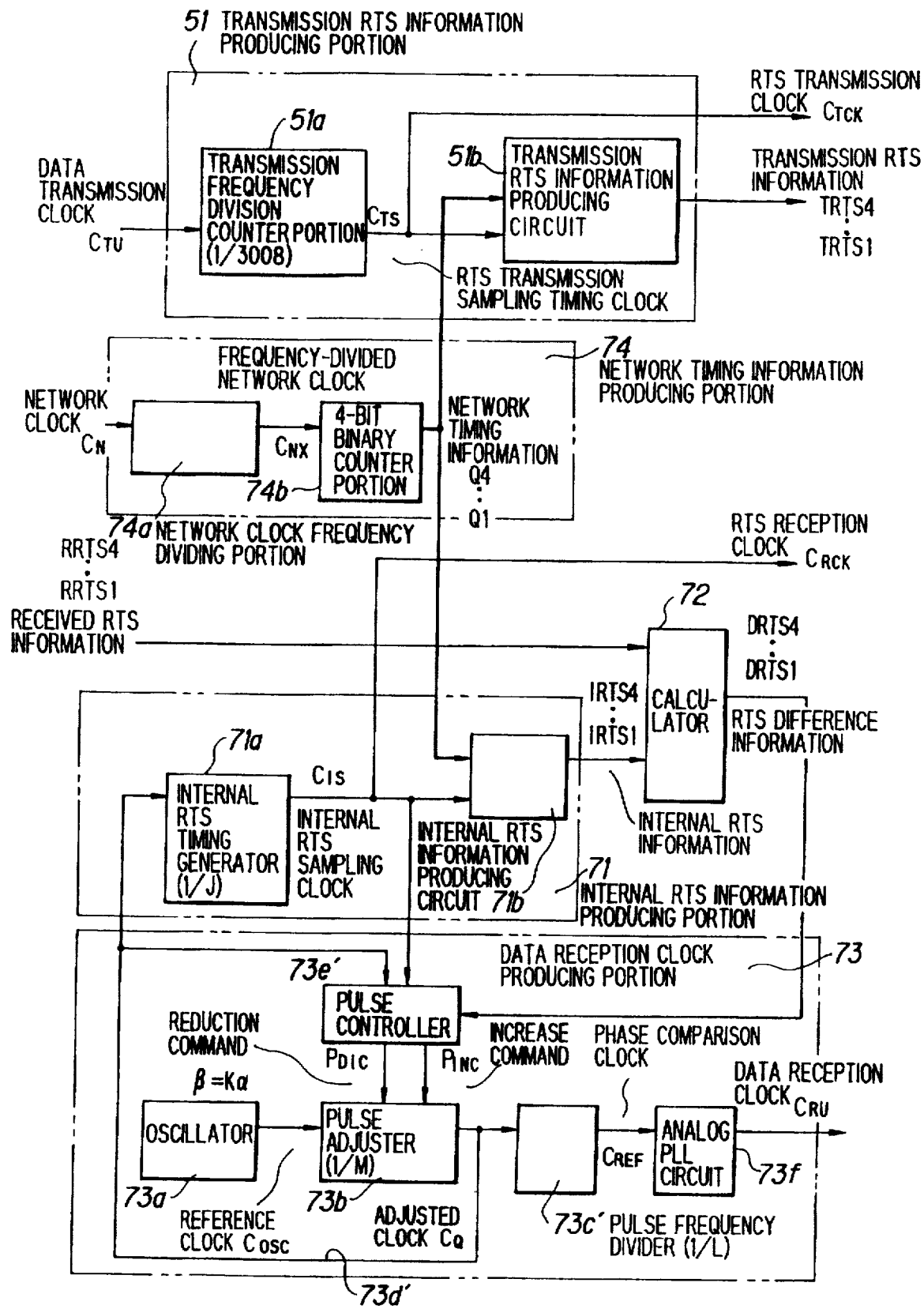
FIG. 25 shows the structure of a third embodiment of an ATM interface device according to the present invention.

FIG. 25 shows the structure of a third embodiment of an ATM interface device according to the present invention. The same reference numerals are provided for the elements which are the same as those in the second embodiment shown in FIG. 19.

It is not always necessary that the frequency of the internal RTS sampling clock $C_{IS}$ is 1/3008 of the frequency of the data reception clock $C_{RU}$ itself, which has a strict limitation in the clock jitter. In other words, it is sufficient that the timing of the internal RTS sampling clock $C_{IS}$ is synchronous with 1/3008 of the frequency of the data reception clock $C_{RU}$.

The third embodiment is obtained with this point being taken into consideration and has the following characteristics as compared with the second embodiment.

(1) Even when the nominal value of the frequency of the user clock is high, the frequency $f_{OSC}$ of the reference clock $C_{OSC}$ output from the reference oscillator 73a is input to the pulse adjuster 73b as a frequency ($f_{OSC}$=α×K, K is an integer of about 1 to 4) approximately equal to the frequency of the user clock.

(2) In the feedback system for correcting the timing of the internal RTS sampling clock $C_{IS}$, the adjusted clock $C_Q$ which is output from the pulse adjuster 73b is fed back to the internal RTS timing generator 71a.

(3) The internal RTS timing generator 71a divides the frequency of the adjusted clock $C_Q$ which is fed back thereto into 1/J so as to produce the internal RTS sampling clock $C_{IS}$.

(d-3) Operation

The range of the allowable input jitter in the analog PLL circuit is ordinarily about 1 clock of the frequency input to the analog PLL, in other words, about 1/α of the period of the nominal value of the frequency of the user clock. The reference oscillator 73a outputs the frequency clock $C_{OSC}$ having the frequency $f_{OSC}$=β Hz (B=α×K, K is an integer). K is about 1 to 4. The pulse adjuster 73b divides the frequency of the reference clock $C_{OSC}$ into 1/M (e.g., M=2), and further increases or reduces the number of pulses in accordance with the increase command or the reduction command, thereby outputting the adjusted clock $C_Q$. The pulse frequency divider 73c' divides the frequency of the adjusted clock $C_Q$ into 1/L (L=α×K/($F_{REF}$×M)) and outputs the phase comparison clock $C_{REF}$ (frequency $f_{REF}$: e.g., 8 KHz). When the phase comparison clock $C_{REF}$ is input to the analog PLL circuit 73f, it reproduces the data reception clock $C_{RU}$ which is synchronous with the phase comparison clock $C_{REF}$ by the PLL operation.

Figure 26:
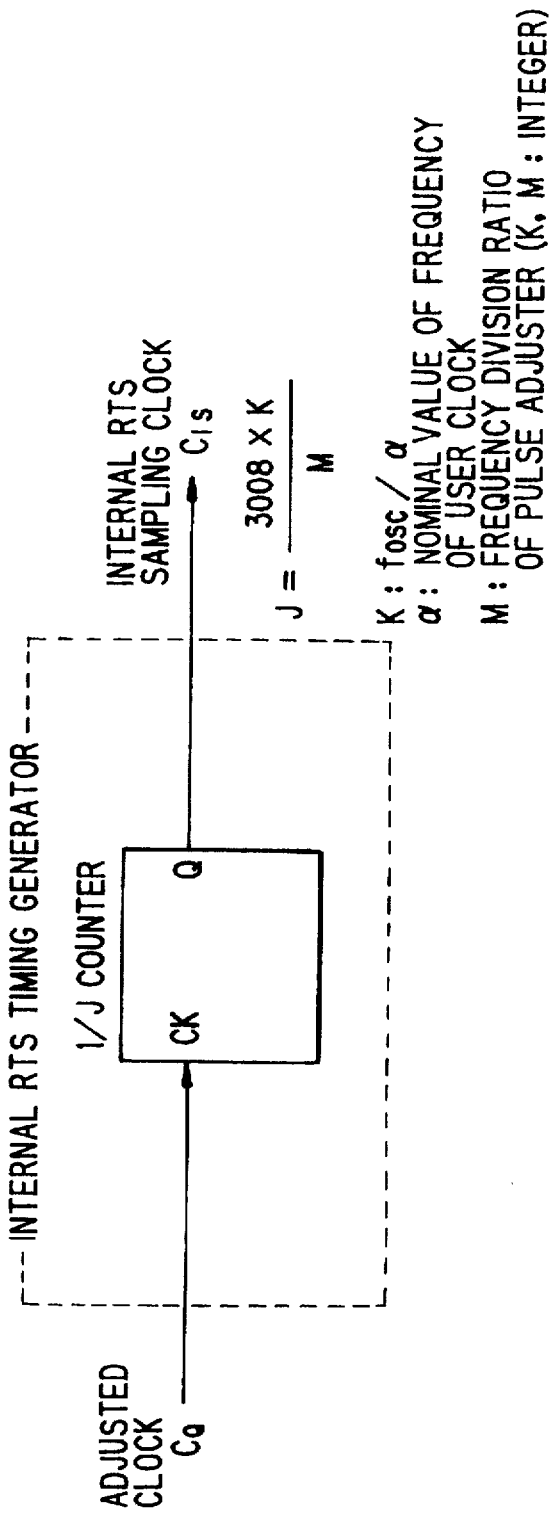
FIG. 26 shows the structure of the internal RTS timing generator in the third embodiment.

In parallel with the above-described operation, the pulse adjuster 73b feeds back the adjusted clock $C_Q$ to the internal RTS timing generator 71a. The internal RTS timing generator 71a, which has the structure shown in FIG. 26, divides the frequency of the adjusted clock into 1/J (J=3008×K/M, M is a frequency division ratio of the pulse adjuster) so as to produce the internal RTS sampling clock $C_{IS}$. The internal RTS sampling clock $C_{IS}$ is input to the ATM cell decomposing portion 81 as the RTS reception clock $C_{RCK}$ in synchronism with the received RTS information.

Figure 27:
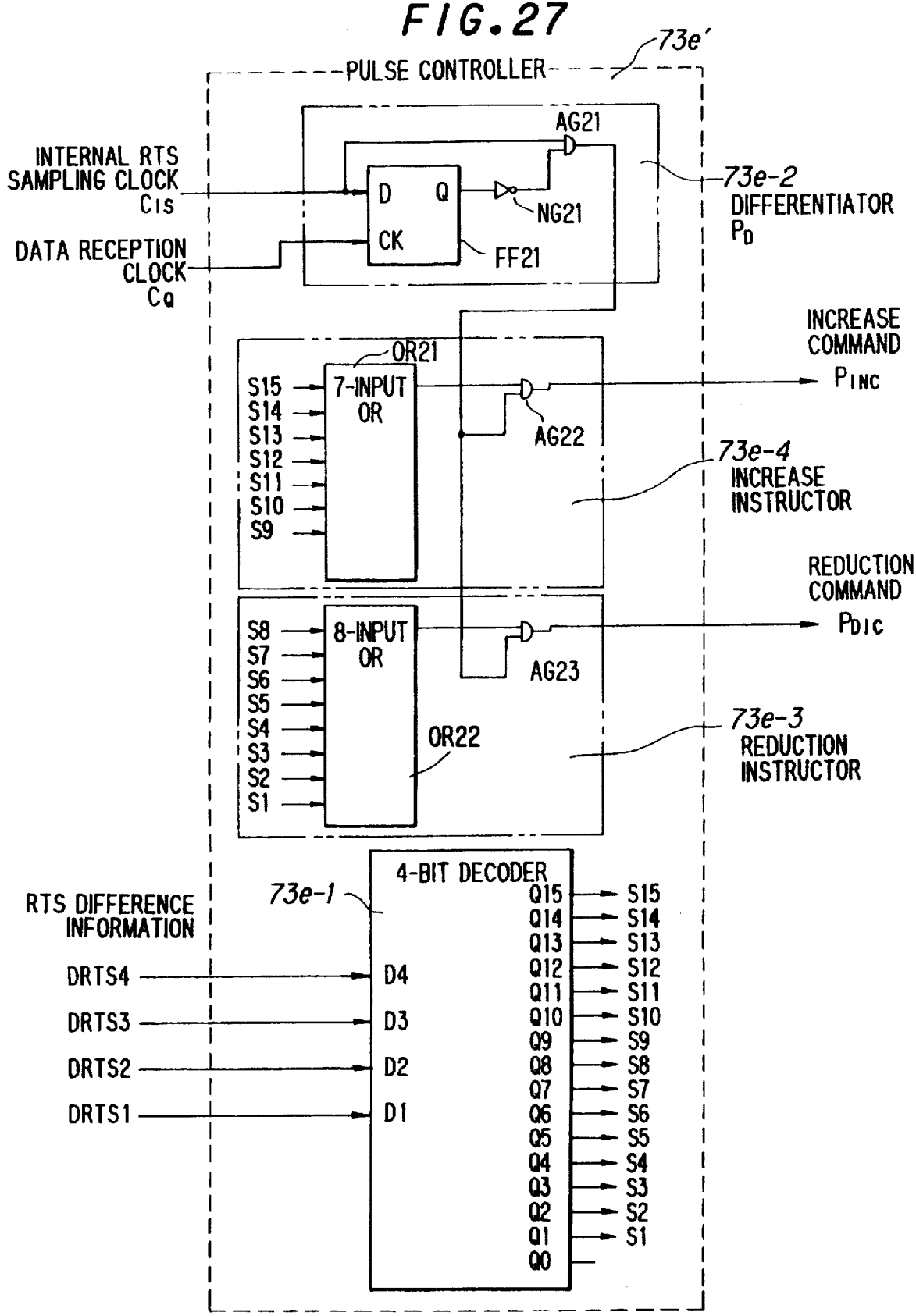
FIG. 27 shows the structure of the pulse controller in the third embodiment.
Figure 28:
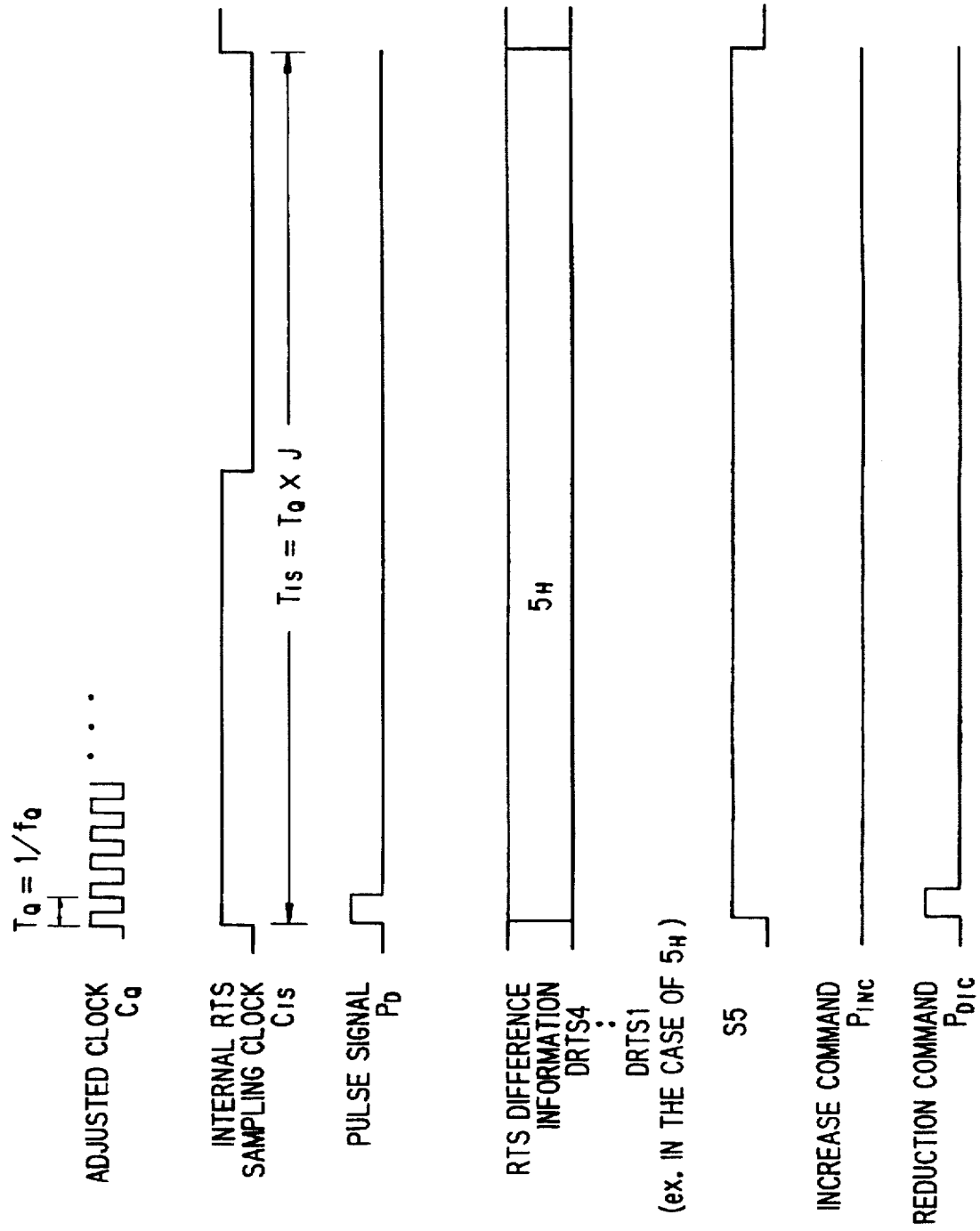
FIG. 28 shows the wave forms explaining the operation of the pulse controller shown in FIG. 27.

Thereafter, the internal RTS information IRTS1 to IRTS4 is produced in the same way as in the first and second embodiments, and a pulse controller 73e' outputs the reduction command $P_{DIC}$ or the increase command $P_{INC}$ to the pulse adjuster 73b in accordance with the difference between the internal RTS information IRTS1 to IRTS4 and the received RTS information RRTS1 to RRTS4. The structure of the third embodiment is the same as those of the first and second embodiment except that the pulse controller 73e' differentiates the internal RTS sampling clock $C_{IS}$ with the adjusted clock $C_Q$ (in the first and second embodiments, it is differentiated by the data reception clock $C_{RU}$), as shown in FIGS. 27 and 28.

The pulse adjuster 73b divides the frequency of the reference clock $C_{OSC}$ into 1/M (M=2), and reduces the number of pulses by one when the reduction command $P_{DIC}$ is input, while increasing the number of pulses by one when the increase command $P_{INC}$ is input. In this manner, the pulse adjuster 73b outputs the adjusted clock $C_Q$. The pulse frequency divider 73c' divides the frequency of the adjusted clock $C_Q$ into 1/L, and inputs the phase comparison clock $C_{REF}$ to the analog PLL circuit 73f. Thereafter, similar feedback control is conducted to correct the timing of the data reception clock $C_{RU}$.

Figure 29:
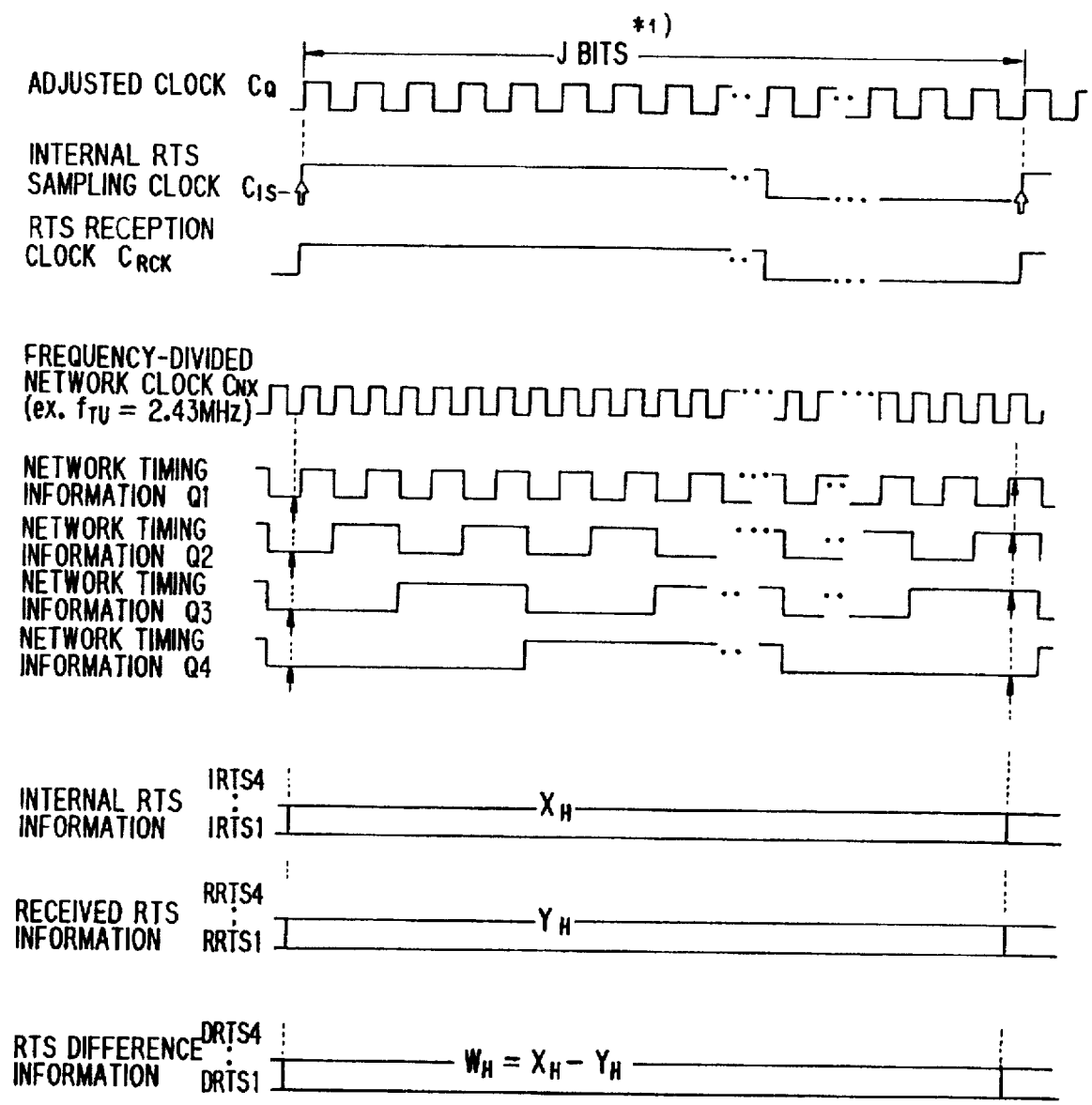
FIG. 29 shows the wave forms explaining the receiving operation in the third embodiment.

FIG. 29 shows the wave forms explaining the receiving operation in the third embodiment.

According to the third embodiment, even if the nominal value of the frequency of the user clock is high, since K=1 to 4 in the frequency $f_{OSC}$ (=β=α×K) of the reference clock $C_{OSC}$ is sufficient, it is possible that the frequency of the reference clock is approximately equal to the frequency of the user clock. In other words, it is possible to reduce the frequency of the reference clock $C_{OSC}$ in comparison with the frequency $f_{OSC}$ (=β=α×M×N, M×N≧10) in the first embodiment, thereby enabling the reduction in the power consumption and the jitter in the data reception clock. The range W of the allowable deviation of the frequency of the user clock from the nominal value is $$W=\Delta T/T=(1/\beta)\times(\alpha/3008)=1/(3008\times K),$$

and since about 1 to 4 is sufficient as the actual value of K, the range is larger than the range in the first embodiment $$W=1/(3008\times M\times N).$$

In addition, since the adjusted clock $C_Q$ output from the pulse adjuster 73b is fed back to the internal RTS information producing portion, it is possible to reduce the delay time in feedback, so that the follow-up performance in a high-speed user clock is greatly improved as compared with the first and second embodiments.

(e) Fourth Embodiment (e-1) Investigation of the First to Third Embodiments

In the above-described embodiments, since one pulse is added or eliminated every correction period T (T=3008/α), the follow-up performance of the digital feedback and the range of the allowable deviation of the frequency of the user clock from the nominal value are not satisfactory, and there is room for improvement.

When the nominal value a of the frequency of the user clock is low, for example, when α=1.544×10⁶ in DS1, the correction period T of the received RTS information is 1.95 ms (T=3008/α). If it is assumed that the frequency $F_{REF}$ of the phase comparison clock $C_{REF}$ input to the analog PLL circuit is 8 KHz, the period $T_{REF}$ is 125 μs. In other words, when the nominal value of the frequency of the user clock is comparatively low, the correction period T (1.95 ms) of the received RTS information is sufficiently longer than the period $T_{REF}$ (125 μs) of the phase comparison clock $C_{REF}$ ($T_{REF}/T \approx 15$).

Consequently, if a plurality of pulses are added to or eliminated from one correction period T so as to prevent more than one pulse from being added or eliminated in the period $T_{REF}$ of the phase comparison clock in the analog PLL circuit, it is possible to follow the analog PLL operation. Since it is possible to increase or eliminate a plurality of pulses in one correction period, it is possible to increase the following speed for the digital PLL operation.

(e-2) Structure of the Fourth Embodiment

Figure 30:
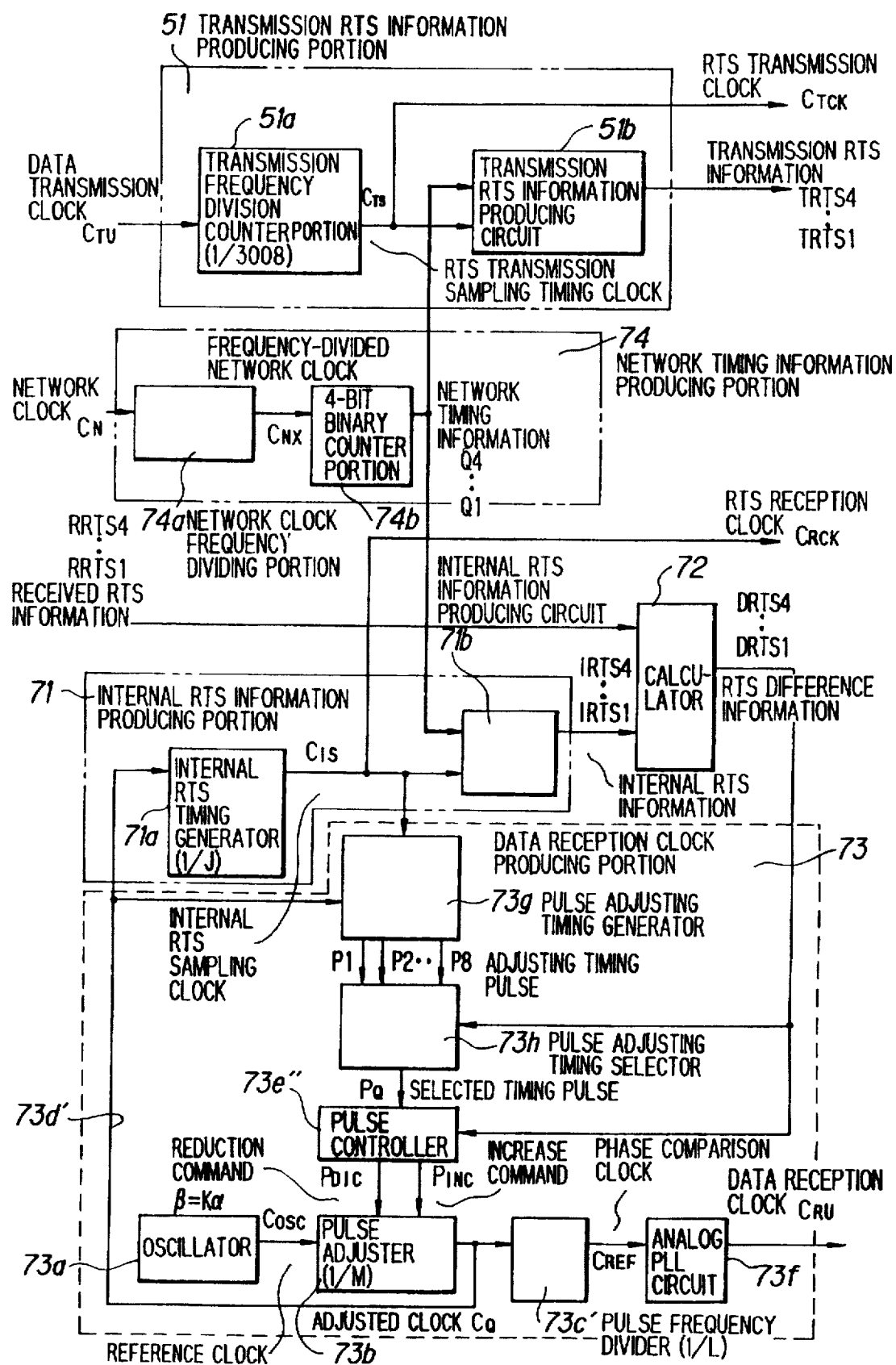
FIG. 30 shows the structure of a fourth embodiment of an ATM interface device according to the present invention.

FIG. 30 shows the structure of the fourth embodiment of an ATM interface device according to the present invention. The same reference numerals are provided for the elements which are the same as those in the third embodiment shown in FIG. 25.

The fourth embodiment is functionally different from the third embodiment in that the number of pulses of the adjusted clock $C_Q$ is increased or reduced by a plurality of pulses in one correction period. The structure of the fourth embodiment is different from that of the third embodiment in the following points.

(1) A pulse adjusting timing generator 73g is provided which produces a plurality of adjusting timing pulse trains P1, P2, . . . P8 each having timing pulses approximately uniformly in one period of the RTS reception clock $C_{RCK}$, namely one period of correction.

(2) A pulse adjusting timing selector 73h is provided which selects a predetermined timing pulse train Pi (i=1 to 8) in accordance with the difference (RTS difference information) DRTS1 to DRTS4 between the internal RTS information and the received RTS information.

(3) A pulse controller 73e" instructs the pulse adjuster 73b to add or eliminate pulses at an adjusting timing pulse position in the selected adjusting timing pulse train Pi in accordance with the difference.

(4) The pulse adjuster 73b divides the frequency of the reference clock $C_{OSC}$ into 1/M (e.g., M=2), and further increases or reduces the number of pulses in accordance with the increase command or the reduction command, thereby outputting the adjusted clock $C_Q$.

Pulse Adjusting Timing Generator

Figure 31:
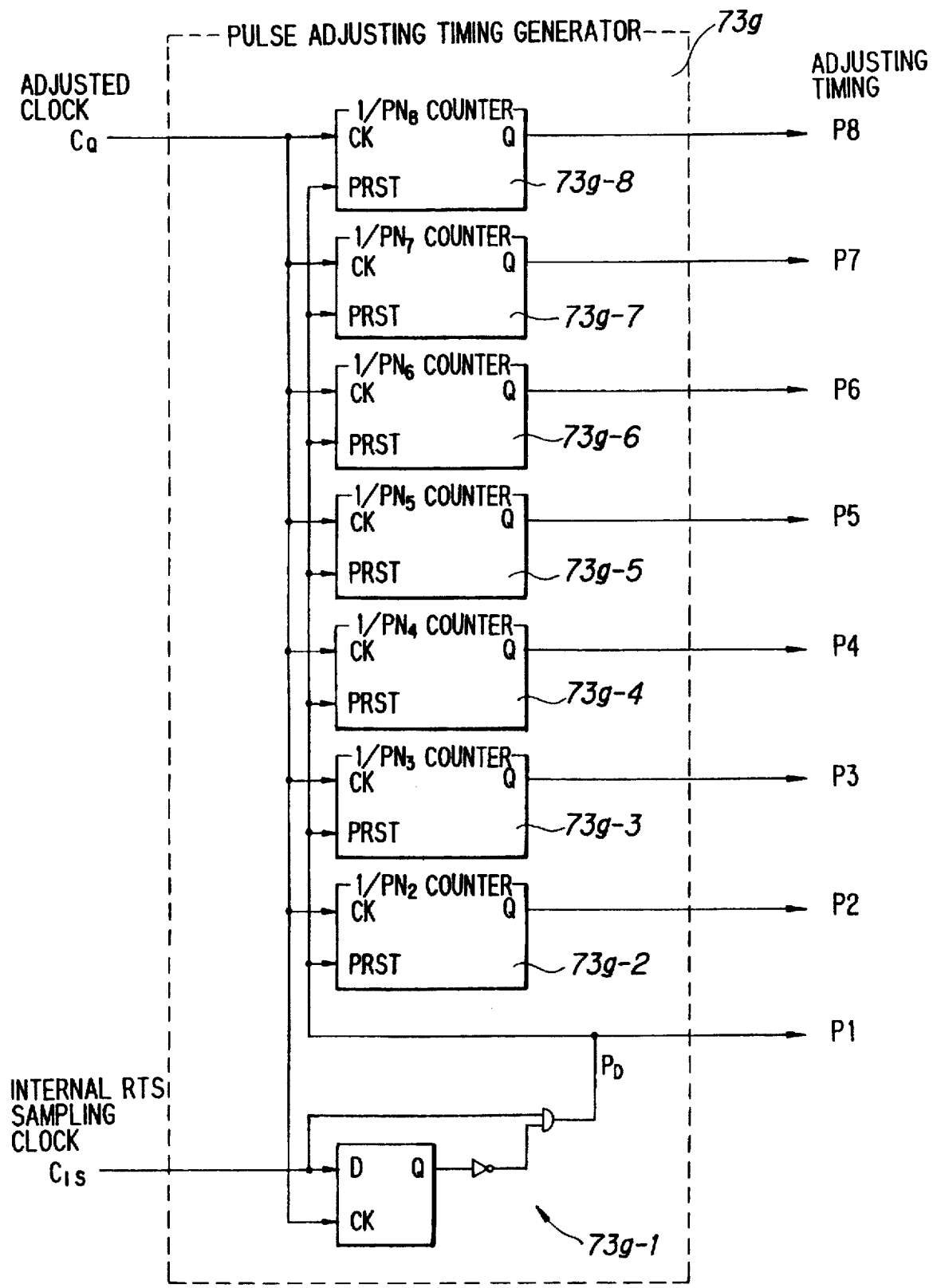
FIG. 31 shows the structure of the pulse adjusting timing generator in the fourth embodiment.
Figure 32:
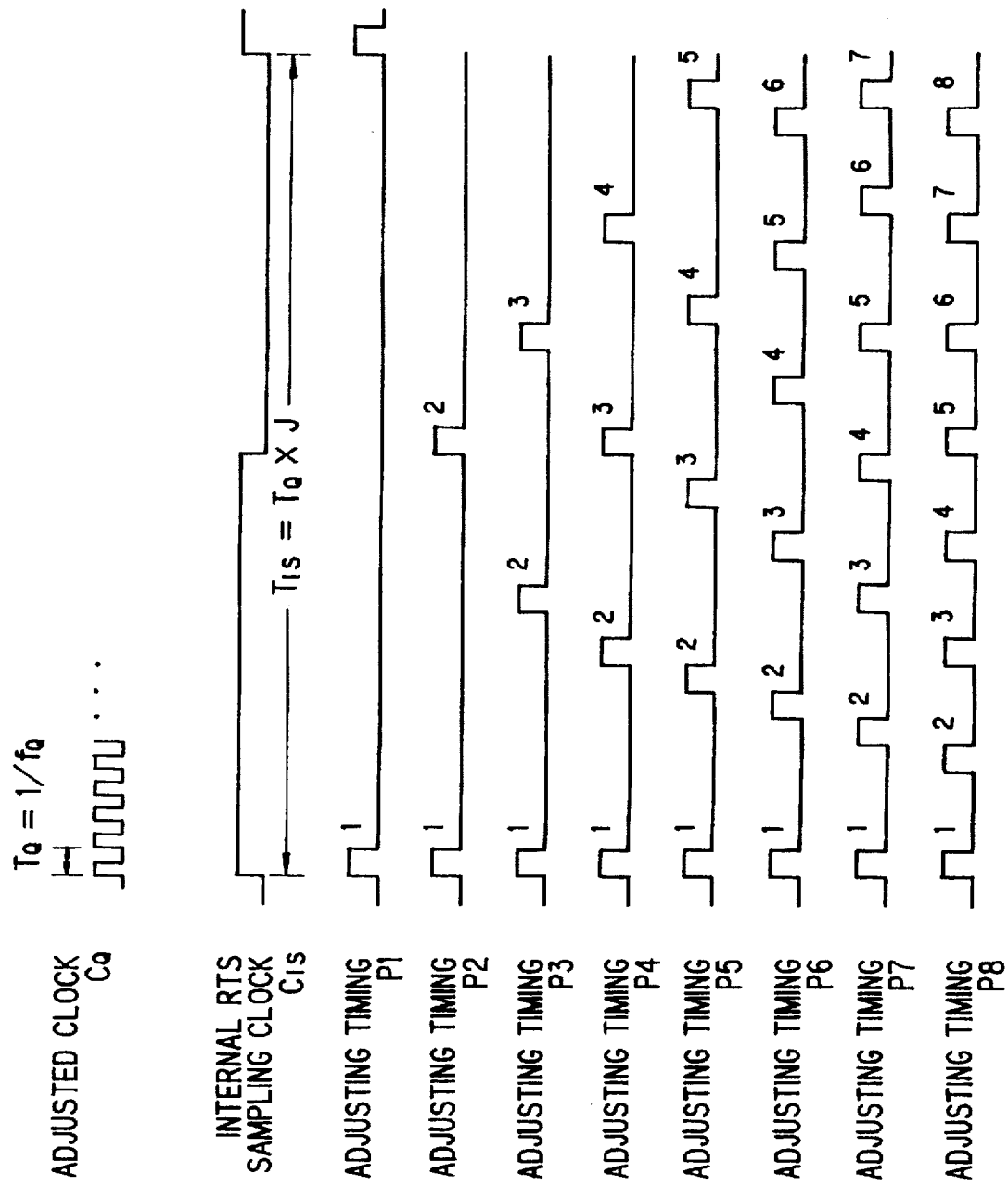
FIG. 32 shows the wave forms explaining the operation of the pulse adjusting timing generator shown in FIG. 31.

FIG. 31 shows the structure of the pulse adjusting timing generator 73g, and FIG. 32 shows the wave forms explaining the operation thereof. The reference numeral 73g-1 represents a differential circuit which differentiates the internal RTS sampling clock $C_{IS}$ with the adjusted clock $C_Q$ and outputs the differentiated pulse $P_D$ (first timing pulse train P1) having a width of one clock at the rise of the clock $C_{IS}$.

The reference numerals 73g-2 to 73g-8 represent counters for dividing the frequency of the adjusted clock $C_Q$ into 1/PN₂ to 1/PN₈ after the differentiated pulse $P_D$ is input to the preset terminal. PN$_x$ is the maximum integer that does not exceed $f_Q/(f_{IS} \cdot X)$ (wherein $f_Q$ represents the frequency of the adjusted clock, and $f_{IS}$ the frequency of the internal RTS sampling clock $C_{IS}$). According to this structure, as shown in FIG. 32, it is possible to produce the adjusting timing pulse trains P1 to P8 with the number of pulses which is proportional to the RTS difference information DRTS1 to DRTS4 and the pulses are uniformly arranged in the correction period (the period of the internal RTS sampling clock $C_{IS}$). When the nominal value of the frequency of the user clock is low (e.g., 1.544 MHz), in these adjusting timing pulse trains, more than 1 pulses do not enter in one period of the phase comparison clock $C_{REF}$.

Pulse Adjusting Timing Selector

Figure 33:
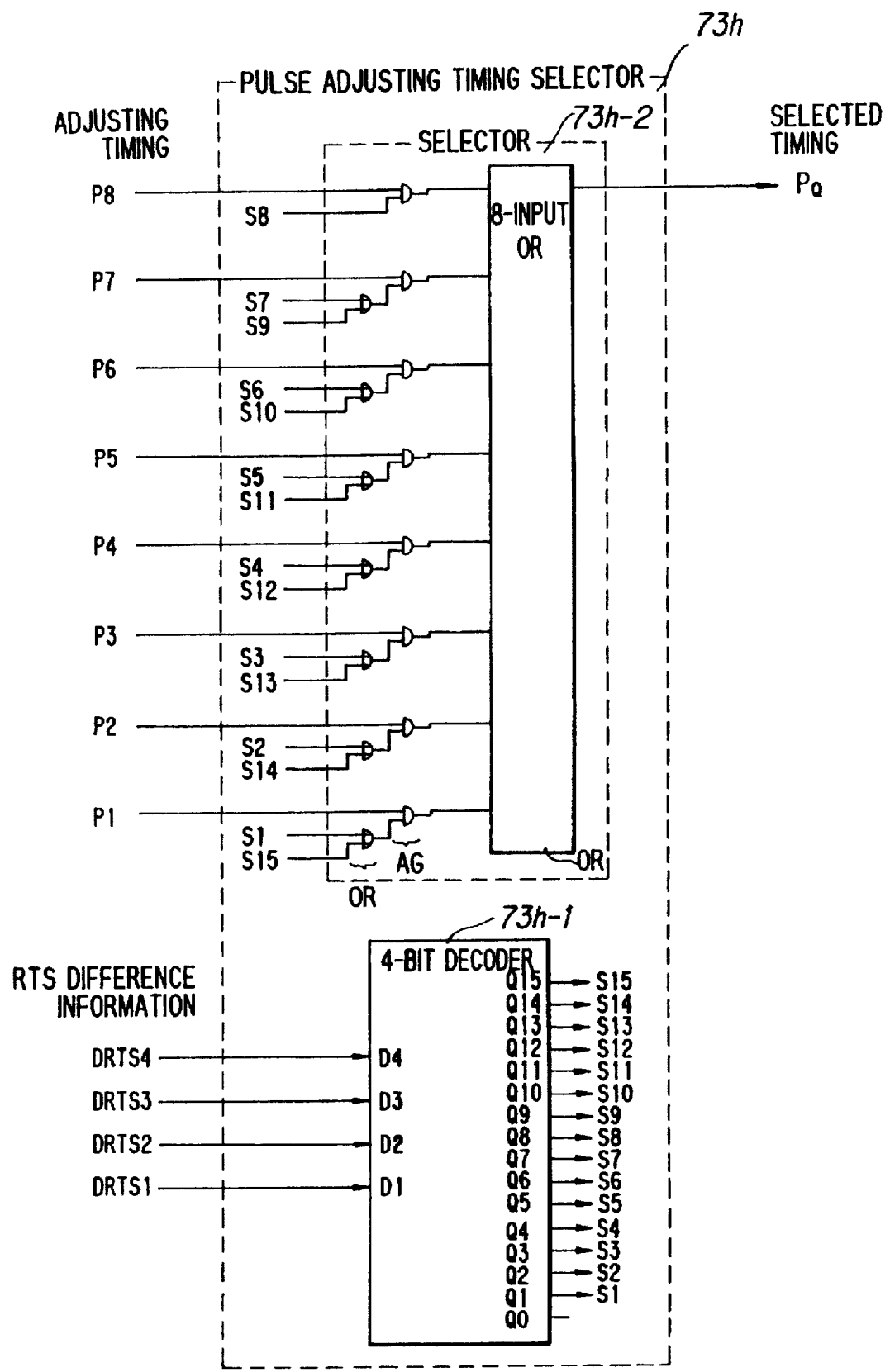
FIG. 33 shows the structure of the pulse adjusting timing selector in the fourth embodiment.
Figure 34:
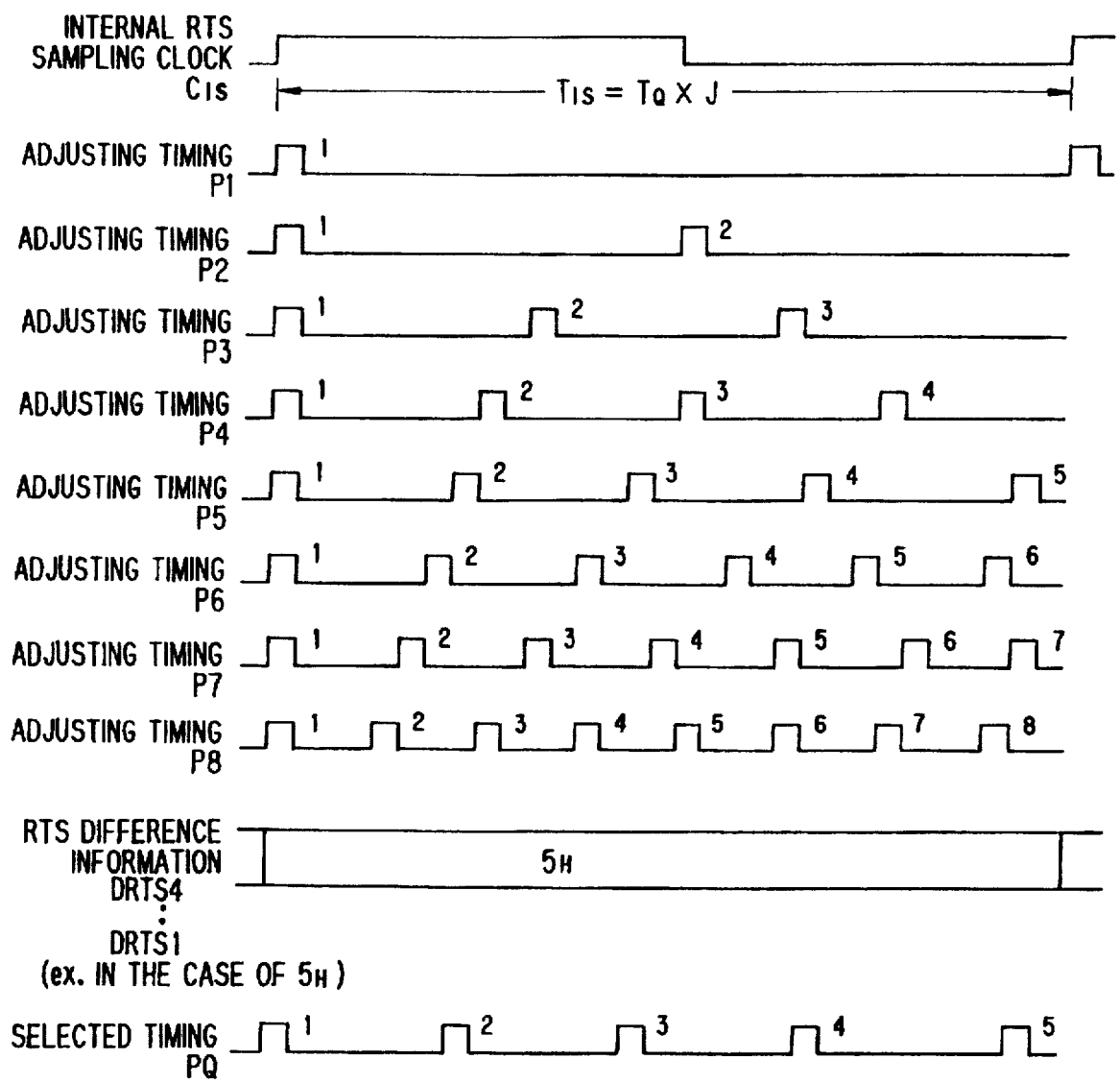
FIG. 34 shows the wave forms explaining the operation of the pulse adjusting timing selector shown in FIG. 33.

FIG. 33 shows the structure of the pulse adjusting timing selector 73h and FIG. 34 shows the wave forms explaining the operation thereof.

The reference numeral 73h-1 represents a 4-bit decoder for converting the RTS difference information DRTS1 to DRTS4 into decimal numbers S1 to S16, 73h-2 a selector for selecting the adjusting timing pulse train from P1 to P8 in accordance with the difference S1 to S16, and outputting the selected timing pulse train $P_Q$. The symbol OR represents an OR gate and AG an AND gate. In the example shown in FIG. 34, the adjusting timing pulse train P5 is selected and output as the selected timing pulse train $P_Q$ when the difference is 5 (S5=1).

Pulse Controller

Figure 35:
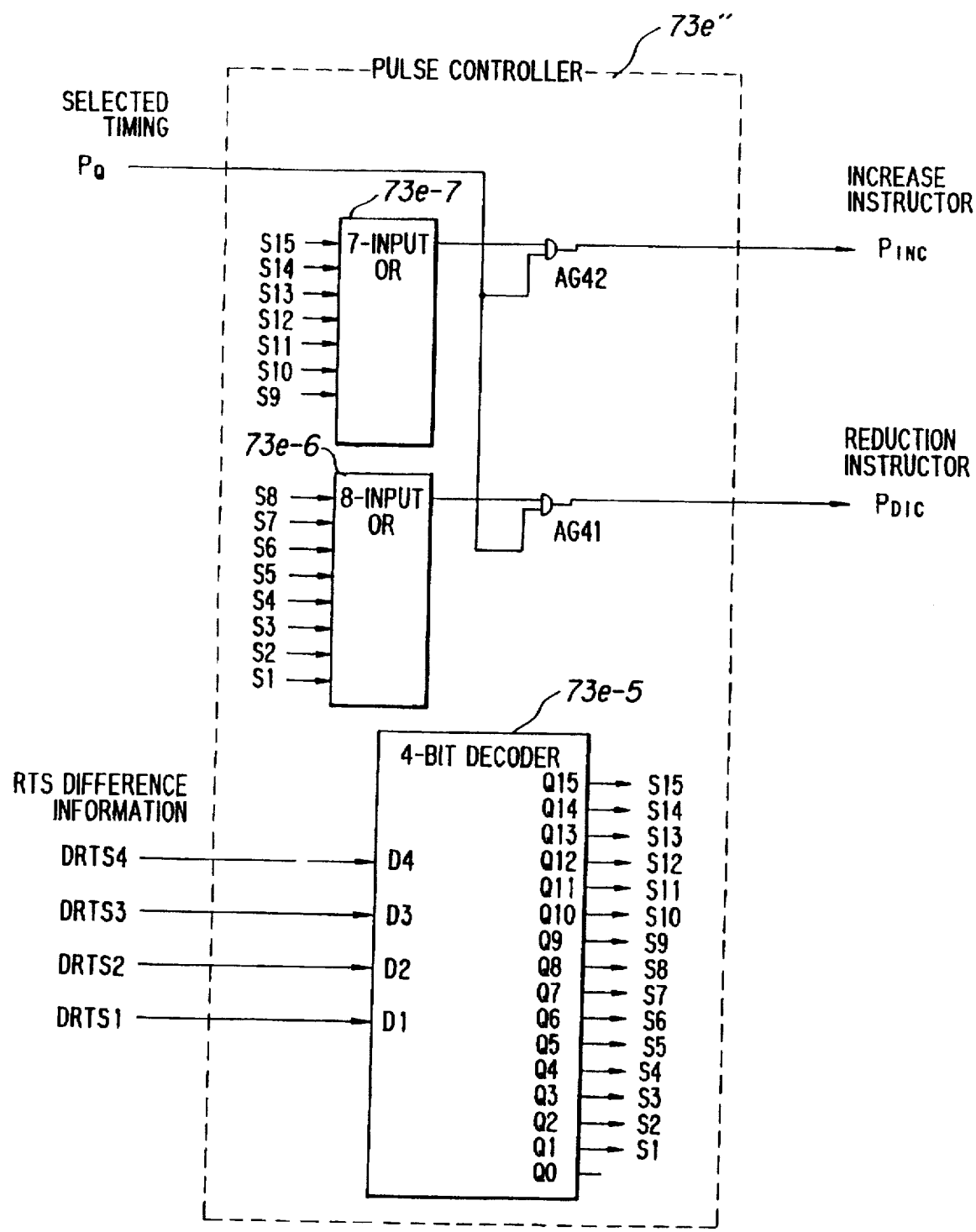
FIG. 35 shows the structure of the pulse controller in the fourth embodiment.
Figure 36:
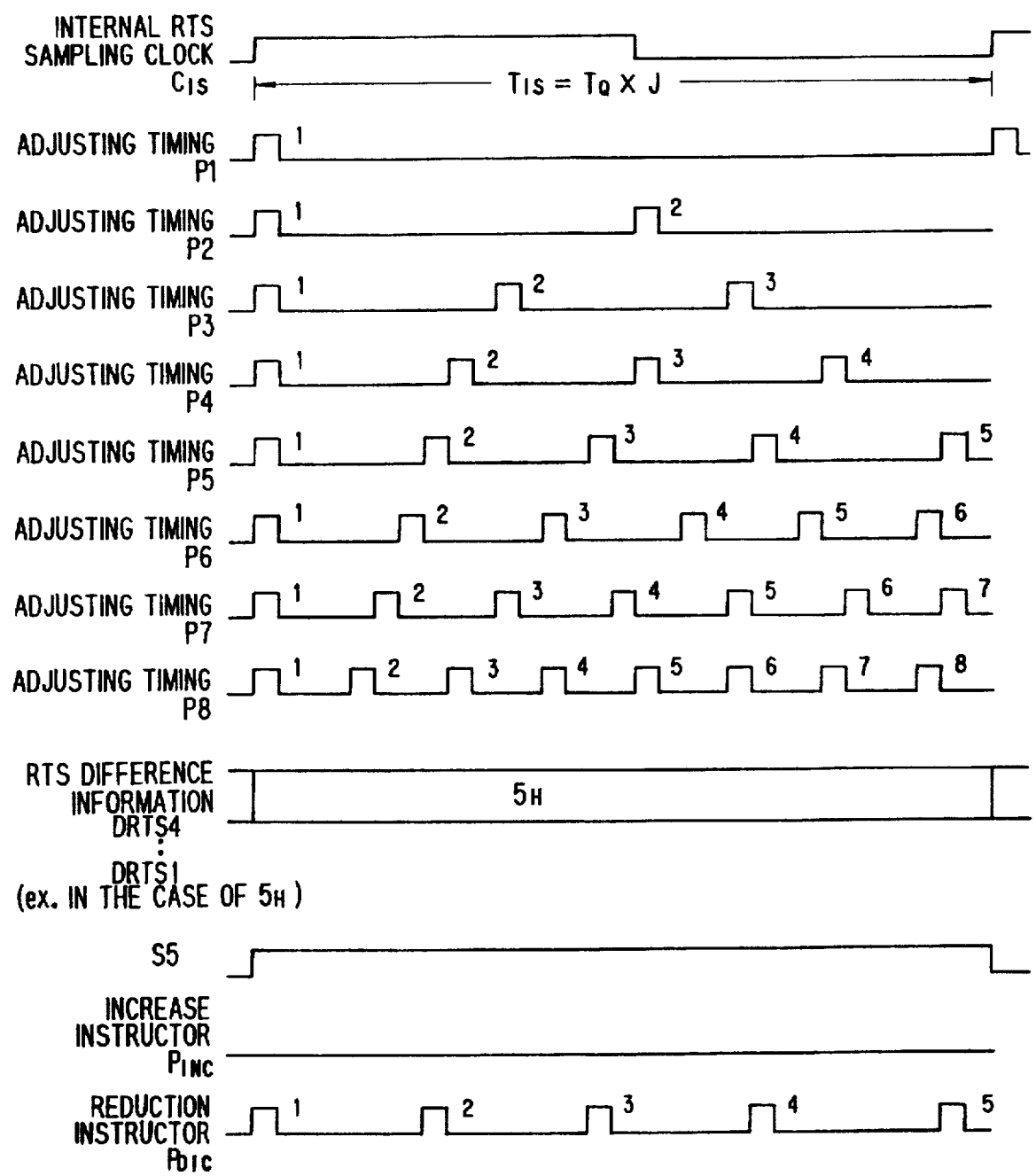
FIG. 36 shows the wave forms explaining the operation of the pulse controller shown in FIG. 35.

FIG. 35 shows the structure of the pulse controller 73e" and FIG. 36 shows the wave forms explaining the operation thereof. The reference numeral 73e-5 represents a 4-bit decoder for converting the RTS difference information DRTS1 to DRTS4 into decimal numbers S1 to S15, 73e-6 an 8-input OR gate for outputting a high level signal for one period (one correction period) of the internal RTS sampling clock $C_{IS}$ when the RTS difference information is S1 to S8, and 73e-7 a 7-input OR gate for outputting a high level signal for one period (one correction period) of the internal RTS sampling clock $C_{IS}$ when the RTS difference information is S9 to S15. The symbol AG41 represents an AND gate for outputting the selected timing pulse train $P_Q$ as the reduction command $P_{DIC}$, and AG42 represents an AND gate for outputting the selected timing pulse train $P_Q$ as the increase command $P_{INC}$. In the example shown in FIG. 36, 5 reduction commands $P_{DIC}$ are output when the difference is 5 (S5=1).

(e-3) Operation

The range of the allowable input jitter in the analog PLL is ordinarily about 1 clock of the frequency input to the analog PLL, in other words, about $1/\alpha$ of the period of the nominal value of the frequency of the user clock. The reference oscillator 73a outputs the frequency clock $C_{OSC}$ having the frequency $f_{OSC}=\beta$ Hz (B=$\alpha\times$K, K is an integer). K is about 1 to 4.

The pulse adjuster 73b divides the frequency of the reference clock $C_{OSC}$ into 1/M (e.g., M=2), and further increases or reduces the number of pulses in accordance with the increase command or the reduction command, thereby outputting the adjusted clock $C_Q$. The pulse frequency divider 73c' divides the frequency of the adjusted clock $C_Q$ into 1/L (L=$\alpha\times$K/($F_{REF}\times$M)) and outputs the phase comparison clock $C_{REF}$ (frequency $f_{REF}$: e.g., 8 KHz). When the phase comparison clock $C_{REF}$ is input to the analog PLL circuit 73f, it reproduces the data reception clock $C_{RU}$ which is synchronous with the phase comparison clock $C_{REF}$ by the PLL operation.

In parallel with the above-described operation, the pulse adjuster 73b feeds back the adjusted clock $C_Q$ to the internal RTS timing generator 71a. The internal RTS timing generator 71a divides the frequency of the adjusted clock into 1/J (J=3008$\times$K/M, M is a frequency division ratio of the pulse adjuster 73b) so as to produce the internal RTS sampling clock $C_{IS}$. The internal RTS sampling clock $C_{IS}$ is input to the ATM cell decomposing portion 81 as the RTS reception clock $C_{RCK}$ in synchronism with the received RTS information.

The internal RTS information producing circuit 71b produces the internal RTS information IRTS1 to IRTS4 at the rise of the internal RTS sampling clock, and the calculator 72 calculates the difference between the internal RTS information IRTS1 to IRTS4 and the received RTS information RRTS1 to RRTS4 and inputs the difference to the pulse adjusting timing selector 73h and the pulse controller 73e".

The pulse adjusting timing selector 73h selects the timing pulse train which corresponds to the RTS difference information (difference) and outputs it as the selected timing pulse train $P_Q$. The pulse controller 73e" determines whether to instruct an increase or reduction in accordance with the RTS difference information (difference) DRTS1 to DRTS4, and outputs the increase command $P_{INC}$ or the reduction command $P_{DIC}$ to the pulse adjuster 73b at an adjusting timing pulse position in the selected adjusting timing pulse train $P_Q$. The pulse adjuster 73b divides the frequency of the reference clock $C_{OSC}$ into 1/M (M=2), and reduces the number of pulses by one when the reduction command $P_{DIC}$ is input, while increasing the number of pulses by one when the increase command $P_{INC}$ is input. In this manner, the pulse adjuster 73b adds or eliminates the number of pulses which is proportional to the difference RTS information in one correction period.

The pulse frequency divider 73c' divides the frequency of the adjusted clock $C_Q$ into 1/L and outputs the phase comparison clock $C_{REF}$ to the analog PLL circuit 73f. Similar feedback control is thereafter conducted so as to correct the timing of the data reception clock $C_{RU}$. The adjusted clock $C_Q$ is fed back to the internal RTS timing generating portion 71a, and the timing of the internal sampling clock $C_{IS}$ is controlled by similar control.

According to the above-described control, the timing of the internal RTS information agrees with the timing of the received RTS information, and the timing of the data reception clock agrees with that of the data transmission clock.

According to the fourth embodiment, since K=1 to 4 in the frequency $f_{OSC}$ (=$\beta$=$\alpha\times$K) of the reference clock $C_{OSC}$ is sufficient, it is possible that the frequency of the user clock is approximately equal to the frequency of the reference clock. In other words, it is possible to reduce the frequency of the reference clock $C_{OSC}$ in comparison with the frequency $f_{OSC}$ (=$\beta$=$\alpha\times$M$\times$N, M$\times$N$\geq$10) in the first embodiment, thereby enabling the reduction in the power consumption and the jitter in the data reception clock.

In addition, according to the fourth embodiment, it is possible to enlarge the range of the allowable deviation of the frequency of the user clock from the nominal value, especially when the nominal value of the frequency is low. Since it is possible to correct 7$\times$F clocks (F is an integer and the value of which is proportional to the RTS difference information) clocks at its maximum in one correction period T, the range W of the allowable deviation of the frequency of the user clock from the nominal value is $$W = \Delta T/T = (1/\beta) \times 7 \times F \times (\alpha/3008)$$
$$= 7 \times F/(3008 \times K)$$

Since the actual value of K is about 1 to 4, the range is much larger than the range in the first embodiment $$W=1/(3008\times M\times N).$$

In addition, since it is possible to correct 7$\times$F clocks at its maximum in one correction period T, the follow-up performance in the feedback is enhanced. Furthermore, since the adjusted clock $C_Q$ output from the pulse adjuster 73b is fed back to the internal RTS information producing portion 71a, it is possible to reduce the delay time in feedback, so that the follow-up performance in a high-speed user clock is greatly improved as compared with the first and second embodiments.

(f) Fifth Embodiment

In the second embodiment, two feedback systems (analog PLL, digital PLL) are necessary. For this operation, the synchronization protecting circuits of the two systems influence each other, and deteriorate the synchronization establishing time, synchronization stability, etc., which leads to a problem in stability of the data reception clock.

In a fifth embodiment of the present invention, the synchronization protecting control which is conducted for each system independently of each other in the second embodiment is conducted in common so as to unite two feedback systems into one, thereby realizing the reproduction of a stabler data reception clock.

Structure

Figure 37:
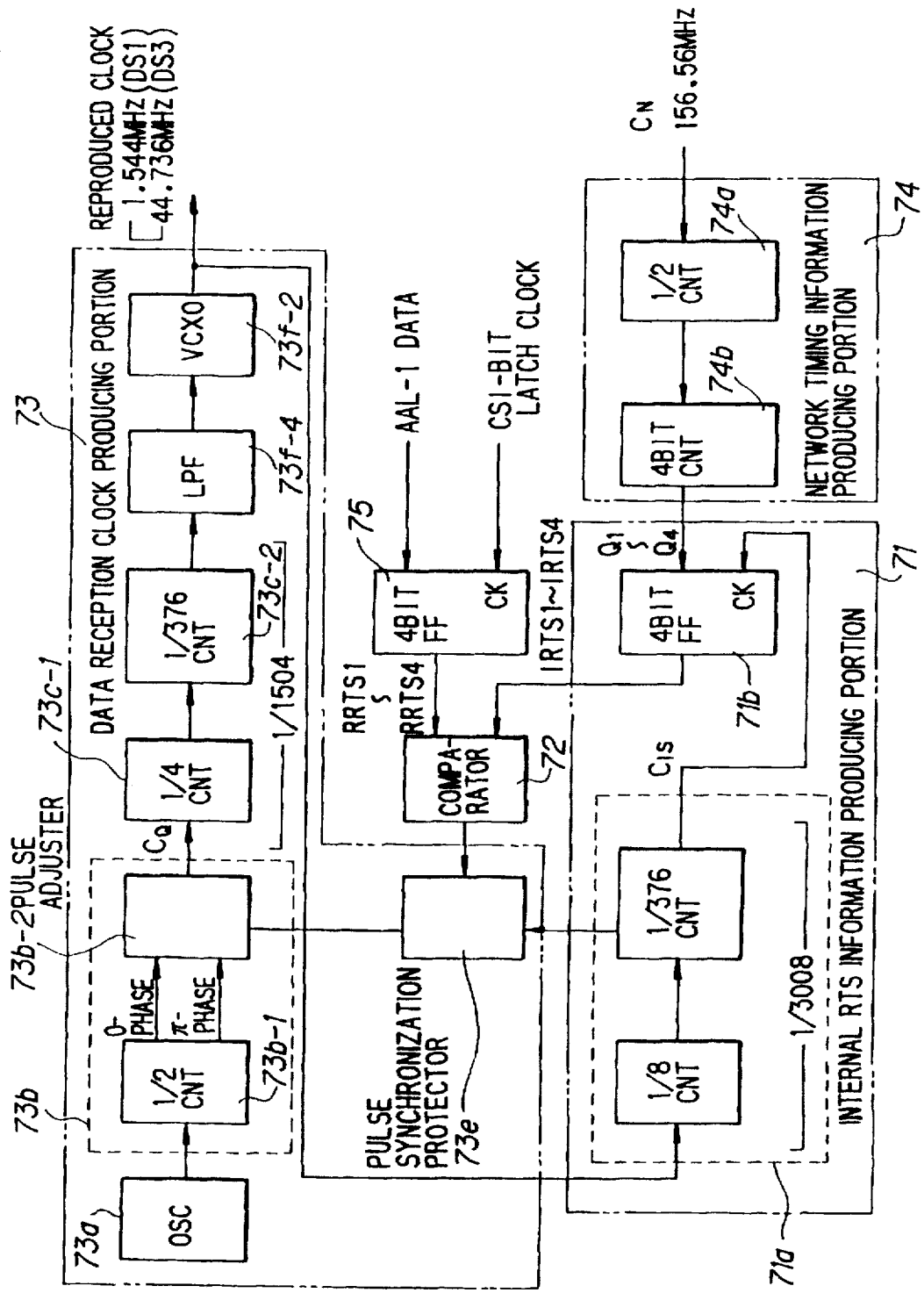
FIG. 37 shows the structure of a fifth embodiment of an ATM interface device according to the present invention.

FIG. 37 shows the structure of a fifth embodiment of an ATM interface device according to the present invention. The same reference numerals are provided for the elements which are the same as those in the second embodiment shown in FIG. 19.

In FIG. 37, the reference numeral 71 represents an internal RTS information producing portion, 72 a comparator, 73 a data reception clock producing portion, 74 a network timing information producing portion, and 75 a flip flop of 4 bits for storing the received RTS information RTS1 to RTS4.

The network timing information producing portion 74 produces network timing information $Q_1$ to $Q_4$ of 4 bits which is necessary for the production of the transmission RTS information and the internal RTS information. It is provided with a network clock frequency dividing portion 74a and a 4-bit binary counter portion 74b.

The internal RTS information producing portion 71 produces the internal RTS information IRTS1 to IRTS4 which is the timing information on the data reception clock by using the frequency (=156.56 MHz) of the network clock $C_N$ and the frequency of the data reception clock $C_{RU}$ by the SRST method, and it is composed of an internal RTS timing generator 71a and an internal RTS information producing circuit 71b. The internal RTS timing generator 71a sequentially divides the frequency ($f_{RU}$) of the data reception clock $C_{RU}$ into ⅛ and ⅟376, namely totally into ⅟3008 and outputs an internal RTS sampling clock $C_{IS}$ (frequency $f_{IS}=f_{RU}/3008$). The internal RTS information producing circuit 71b is provided with four flip flops, and sets the network timing information $Q_1$, $Q_2$, $Q_3$, $Q_4$ at the rise of the internal RTS sampling clock $C_{IS}$ and samples and outputs the internal RTS information IRTS1, IRTS2, IRTS3 and IRTS4.

The comparator (calculator) 72 compares the received RTS information RRTS1 to RRTS4 with the internal RTS information IRTS1 to IRTS4.

The data reception clock producing portion 73 is composed of a reference oscillator 73a, a pulse frequency divider 73b-1, a pulse adjuster 73b-2, pulse frequency dividers 73c-1, 73c-2, a low-pass filter 73f-4, a voltage control oscillator 73f-2 and a pulse controller 73e (DPPL synchronization protector).

The reference oscillator 73a outputs a clock signal having a frequency of an integral multiple of the nominal value of the user clock, for example, 1.544 MHz in DS1 and 44.736 MHz in DS3. The pulse frequency divider 73b-1 divides the frequency of the clock signal which is output from the reference oscillator into ½ and outputs two frequency-divided clock trains having phases 0 and π which are different from each other by 180°. The pulse adjuster 73b-2 increases one frequency-divided clock train (0-phase) by adding one clock pulse of the other frequency-divided clock train (π-phase) in accordance with the increase command, while eliminating one clock pulse from the one frequency-divided clock train (0-phase) in accordance with the reduction command, and outputs the one frequency-divided clock train (0-phase) as the adjusted clock signal $C_Q$.

The pulse frequency dividers 73c-1, 73c-2 sequentially divide the frequency of the adjusted clock signal output from the pulse adjuster 73b-2 into ¼ and ⅟376, namely totally into ⅟1504. In order to use the PLL circuit in the second embodiment in common, it is necessary to change the feedback frequency to ⅟3008 of the frequency of the data reception clock (513 Hz in DS1, 14.9 KHz in DS3). Actually, since the feedback frequency is already divided into ½ by the pulse frequency divider 73b-1, it is divided into ⅟1504 by the pulse frequency dividers 73c-1, 73c-2.

The low-pass filter 73f-4 smooths the frequency-divided signal output from the pulse frequency dividers 73c-1, 73c-2, and the voltage control oscillator 73f-2 oscillates at a frequency corresponding to the level of the signal output from the low pass filter, thereby outputting the data reception clock (1.544 MHz in DS1 and 44.736 MHz in DS3). The pulse controller 73e (DPPL synchronization protector) instructs the pulse adjuster 73b-2 to increase or reduce a pulse on the basis of the result of the comparison between the internal RTS information and the received RTS information contained in the ATM cell.

Operation

Figure 38A:
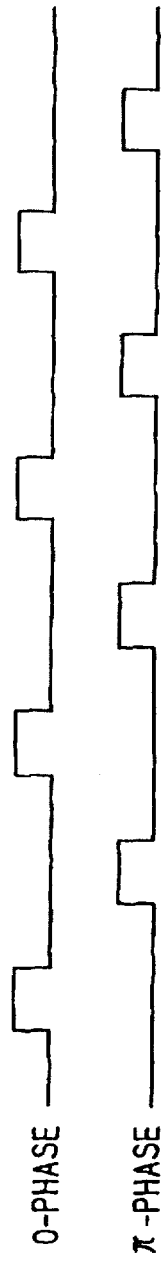
FIGS. 38A to 38C explain the clock adjusting operation in the fifth embodiment.

The reference oscillator 73a outputs a clock signal having a frequency of 1.544 MHz when the DS1 PCM transmission line is connected to the ATM network, while outputting a clock signal having a frequency of 44.736 MHz when the DS3 PCM transmission line is connected to the ATM network. The frequency divider 73b-1 divides the frequency of the clock signal output from the reference oscillator 73a into ½ and outputs two frequency-divided clock trains (0-phase, π-phase) shown in FIG. 38A. These two frequency-divided clock trains are input to the pulse adjuster 73b-2.

In the network timing information producing portion 74, the network clock frequency dividing portion 74a divides the frequency (=156.56 MHz) of the network clock $C_N$ into ½, and the 4-bit binary counter portion 74b outputs the network timing information $Q_1$ to $Q_4$. The internal RTS information producing circuit 71b sets the network timing information $Q_1$, $Q_2$, $Q_3$, $Q_4$ of 4 bits at the rise of the internal RTS sampling clock $C_{IS}$ and outputs the internal RTS information IRTS1, IRTS2, IRTS3 and IRTS4. The comparator 72 compares the received RTS information RRTS1 to RRTS4 with the internal RTS information IRTS1, IRTS2, IRTS3 and IRTS4.

Figure 38B:
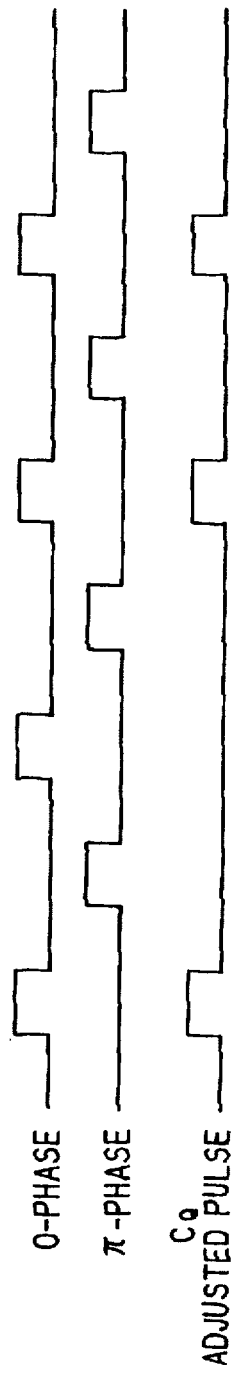
Figure 38C:
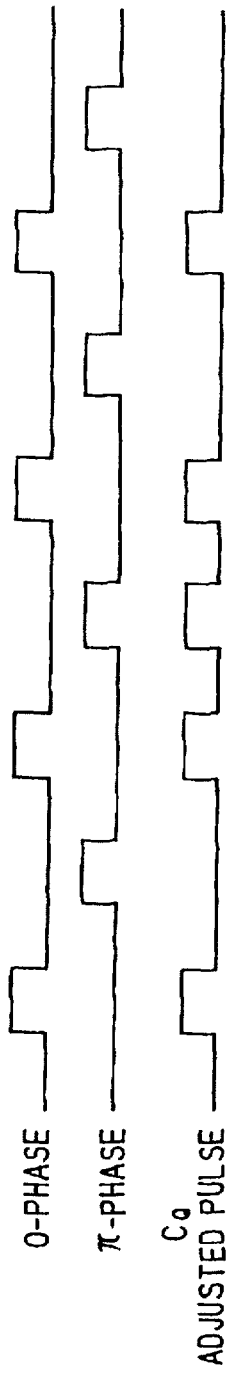

The synchronization protector 73e outputs the reduction command $P_{D/C}$ or the increase command $P_{INC}$ on the basis of the result of the comparison between the internal RTS information IRTS1, IRTS2, IRTS3 and IRTS4 and the received RTS information RRTS1 to RRTS4. When the data reception clock $C_{RU}$ is in advance of the data transmission clock $C_{TU}$, the synchronization protector 73e outputs the reduction command $P_{D/C}$. On the other hand, when the data reception clock $C_{RU}$ is behind the data transmission clock $C_{TU}$, the synchronization protector 73e outputs the increase command $P_{INC}$. The pulse adjuster 73b-2 increases one frequency-divided clock train (0-phase) by adding one clock pulse of the other frequency-divided clock train (π-phase) (see FIG. 38C) in accordance with the increase command $P_{INC}$, while eliminating one clock pulse from the one frequency-divided clock train (0-phase) in accordance with the reduction command $P_{D/C}$ (see FIG. 38B), and outputs the one frequency-divided clock train (0-phase) as the adjusted clock signal $C_Q$.

The pulse frequency divides 73c-1, 73c-2 divide the frequency of the adjusted clock $C_Q$ into ⅟1504 and output the clock having a frequency of 513 KHz in DS1, 14.9 KHz in DS. The low-pass filter 73f-4 smoothes the frequency-divided signal output from the pulse frequency dividers 73c-1, 73c-2, and the voltage control oscillator 73f-2 oscillates at a frequency corresponding to the level of the signal output from the low-pass filter, thereby outputting the data reception clock (1.544 MHz in DS1 and 44.736 MHz in DS3). Thereafter, the internal RTS information IRTS1, IRTS2, IRTS3 and IRTS4 is similarly produced and the above-described operation is repeated until the frequency of the data reception clock becomes 1.544 MHz in the case of the DS1 PCM transmission line, and 44.736 MHz in the case of the DS3 PCM transmission line, and the data reception clock becomes synchronous with the data transmission clock.

The data reception clock $C_{RU}$ output from the voltage control oscillator 73f-2 is input to the internal RTS timing generator 71a, which divides the frequency of the data reception clock into ⅟3008 to produce the internal RTS sampling clock $C_{IS}$. The pulse controller 73e (DPPL synchronization protector) instructs the pulse adjuster 73b-2 to increase or reduce a pulse on the basis of the result of comparison between the internal RTS information and the received RTS information contained in the ATM cell.

In this way, by uniting the feedback systems into one, it is possible to produce a stable data reception clock and to reduce the number of components of a circuit.

(g) Sixth Embodiment (g-1) Structure of Communication System

The function of interworking the PCM transmission line (PCM line) of DS1 or DS3 with the ATM switch is called a circuit emulation (CE) function. FIG. 39A shows the structure of a system of interworking the PCM transmission line of DS1 (DS3) with the ATM switch by ATM devices provided with the CE function, and FIG. 39B explains the layers of each part. In FIG. 39A, the reference numeral 101 represents an ATM switch (ATM SW), 102, 103 terminals (CPE), 104, 105 digital transmission lines of DS1 or DS3, and 106, 107 ATM interface devices (DS3 CE INF) having a CE function.

Figure 40B:
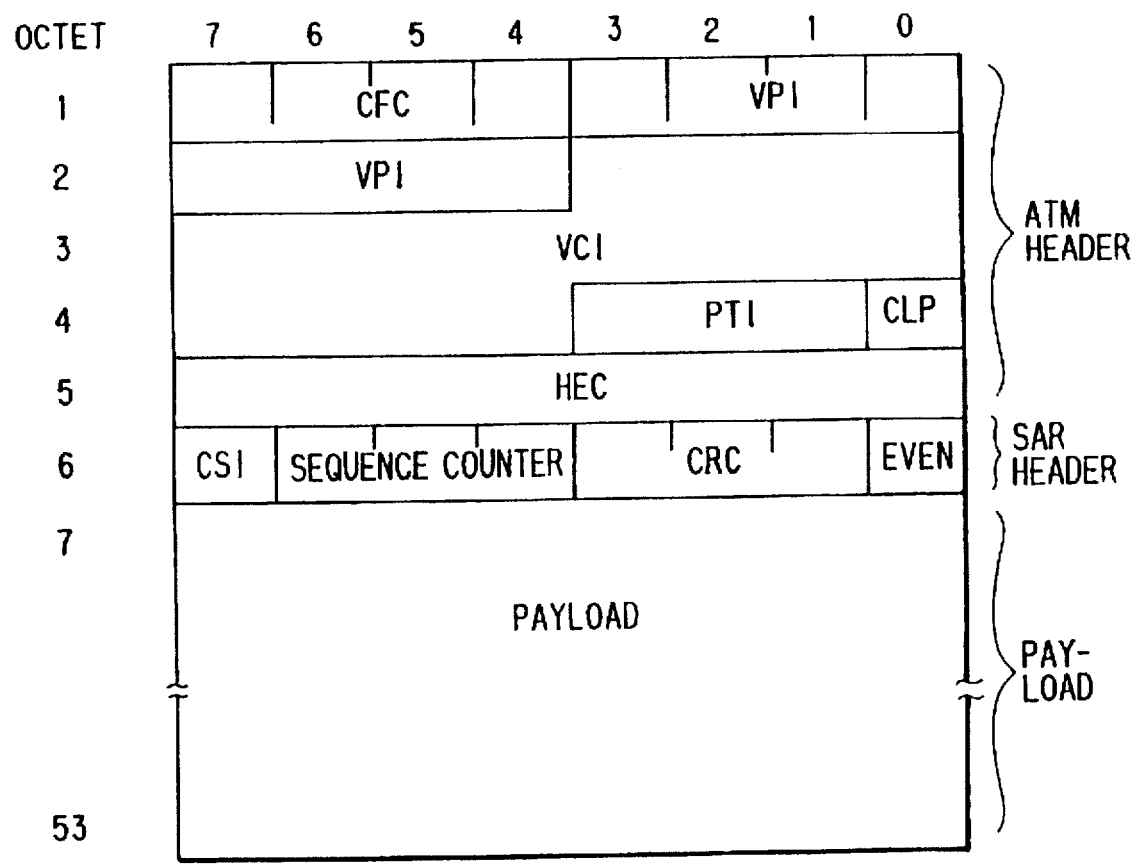
FIG. 40B explains the format of an ATM cell of the AAL-1 type in the fifth embodiment.

The ATM interface devices 106, 107 map the data which has a frame format shown in FIG. 40A and is supplied through the digital transmission lines of DS1 (DS3) in the payload of an AAL-1 (ATM Adaptation Layer-1) shown in FIG. 40B, adds the timing information on the user clock (transmission RTS information) to the CSI bit of the SAR header, thereafter supplies ATM cell to the ATM switch. The ATM interface devices 106, 107 also synchronize the data reception clock with the data transmission clock by using the transmission RTS information which is contained in the ATM cell, convert the ATM cell into the data of DS1 (DS3) and supplies the converted data to the digital transmission line of DS1 (DS3).

FIG. 40A explains DS3 frame format in the ATM interface devices (DS3 CE INF) which is conformed to the TR-NWT-000499 and has M13 frame format standardized by the TR-NWT-000499. One multi frame of M13 frame format is composed 7 submulti frame (subframe 1~subframe 7) and one submulti frame is composed 8 blocks each of which composed 85 bits. The first bit is an overhead and the remainder are payloads. X denotes Yellow Alarm, M0 and M1 multi frame alignment (M0=0, M1=1), F0 and F1 multi subframe alignment (F0=0, F1=1), P even parity for preceding multi frame information payload, C application identification.

In order to confirm the operation of such an ATM interface device 106, 107 or the path of the ATM switch, test is necessary. However, there are following problems in conducting these tests.

(1) In the case of a circuit emulation service, it is necessary to supply the cell being tested at a speed of 1.544 Mbs in the case of DS1 and at a speed of 44.736 Mbs in the case of DS3.

(2) If the cell is not supplied at the above-described speed; starvation is detected by the receiving apparatus. Starvation is a state in which the empty state of an FIFO for converting the AAL-1 of the cell into the format of DS1 (DS3) is continuously detected for more than 2.5 seconds.

(3) It is necessary to check the SAR-Header of the AAL-1 shown in FIG. 40 in testing the cell.

(4) In circuit emulation service, there are asynchronous circuit emulation service and synchronous circuit emulation service, so that it is difficult to produce the CSI bit pattern of the SAR-Header.

(g-2) Structure

In a sixth embodiment of the present invention, the problems (1) to (4) are solved by inserting a test circuit in the portion where the DS1 (DS3) layer is converted into the AAL-1 layer.

Figure 41:
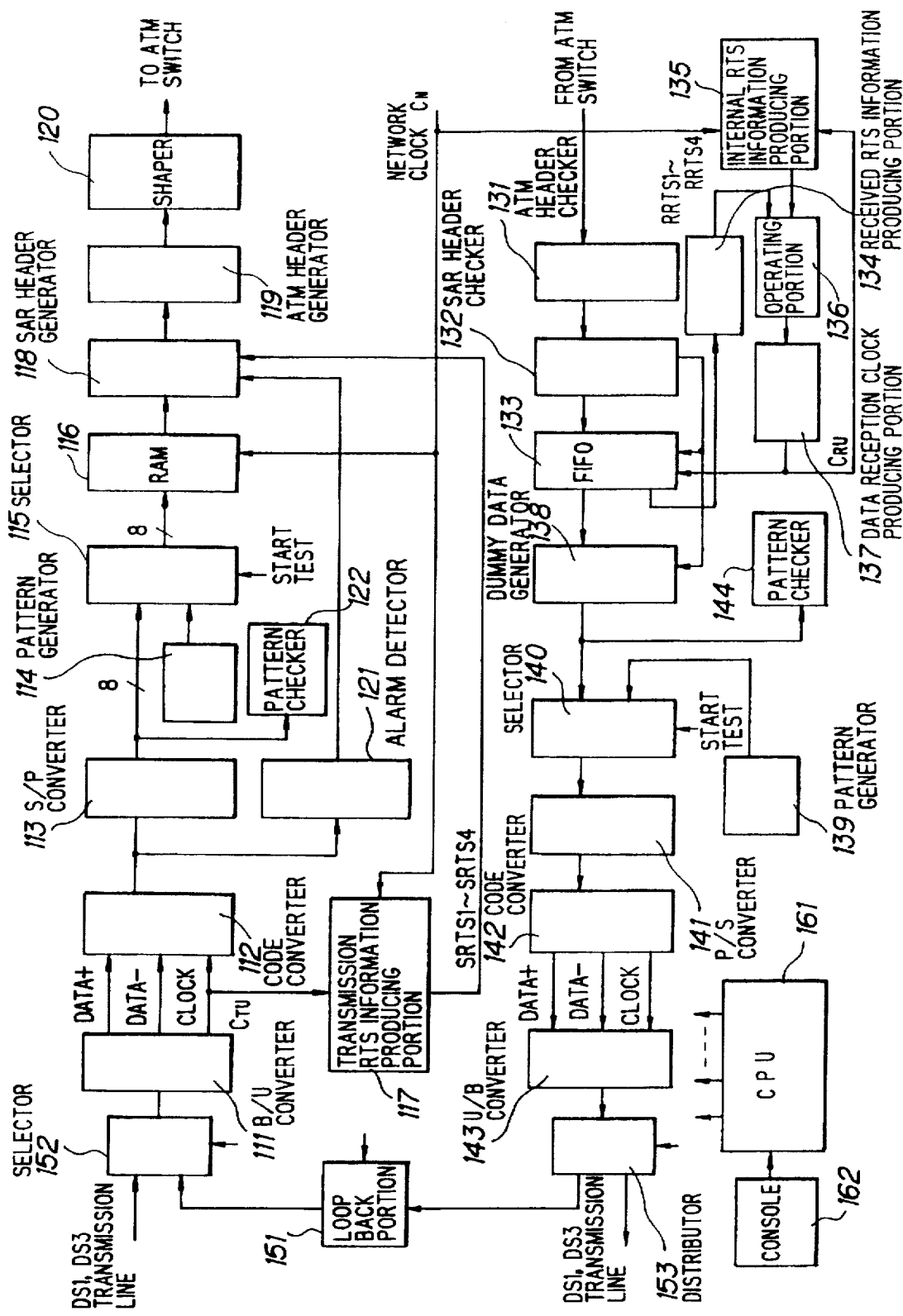
FIG. 41 shows the structure of a sixth embodiment of an ATM interface device according to the present invention.

FIG. 41 is a block diagram of the structure of the ATM interface devices 106, 107 as a sixth embodiment of the present invention. In the up path from the digital line of DS1 (DS3), the reference numeral 111 represents a B/U converter for converting a bipolar signal to a unipolar signal and extracting and outputting a user clock (data transmission clock $C_{TU}$). The reference numeral 112 represents a code converter for converting a B8ZS signal to an NRZ signal in DS1, and B3ZS signal to an NRZ signal in DS3. The reference numeral 113 denotes a serial/parallel converter for converting serial data to parallel data, 114 a first pattern generator for producing a test pattern (test data), 115 a selector for selecting and outputting the data from the serial/parallel converter 113 at an ordinary time, and selecting and outputting the test pattern input from the pattern generator 114 at the time of test. The reference numeral 116 represents a RAM for storing the data of DS1 (DS3) so as to convert the format into the cell format of the AAL-1 shown in FIG. 40.

The reference numeral 117 represents a transmission RTS information producing portion for producing the transmission RTS information SRTS1 to SRTS4 by using the user clock $C_{TU}$ and the network clock $C_N$ of the ATM switch. The reference numeral 118 denotes an SAR header generator for mapping the data of DS1 (DS3) in the payload of the AAL-1 format, producing an SAR-Header pattern and inserting the SAR-Header pattern in the SAR-Header portion of the AAL-1 format, 119 an ATM header generator for producing an ATM header and inserting it in the ATM header portion of the AAL-1 format, and 120 a shaper for arranging the cells, which are output from the ATM header generator 119 at a high frequency, at intervals of a clock rate of DS1 (DS3). The reference numeral 121 represents an alarm detector for detecting an alarm such as a loss of signal and a loss of frame of the DS1 (DS3) layer. When such an alarm is detected, the cell being transmitted to the ATM switch is stopped. The reference numeral 122 denotes a first pattern checker for receiving the test cell and confirming the operation of the ATM interface device and the operation of the path.

In the down path from the ATM switch to the digital line, the reference numeral 131 denotes an ATM header checker for checking whether or not the predetermined ATM header pattern comes. If the predetermined ATM header pattern is not detected, the cell is discarded at this point. The reference numeral 132 represents an SAR header checker and 133 an FIFO memory. The SAR header checker 132 checks the sequence counts SC, CRS, and the even parity EBP of the SAR header, and if no error is detected, the cell is stored in the FIFO memory 133, while if an error is detected, the cell is discarded at this point. The reference numeral 134 represents a received RTS information producing portion for producing the received RTS information RRTS1 to RRTS4 contained in the ATM cell, 135 an internal RTS information producing portion for producing the internal RTS information IRTS1 to IRTS4 by using the user clock (the data reception clock) $C_{RU}$ and the network clock $C_N$, 136 a calculator for comparing the internal RTS information IRTS1 to IRTS4 with the received RTS information RRTS1 to RRTS4, and 137 a data reception clock producing portion for producing the data reception clock $C_{RU}$ in the method described in the first to fifth embodiments. The FIFO memory 133 outputs the DS1 (DS3) data mapped in the payload in synchronism with the data reception clock $C_{RU}$ as continuous data.

The reference numeral 138 represents a dummy data generator for supplying fixed dummy data when an error in the SAR header is detected, 139 a second pattern generator for producing a test pattern, and 140 a selector for selecting and outputting the DS1 (DS3) data output from the FIFO memory 133 at an ordinary time, and selecting and outputting the test pattern input from the pattern generator 139 at the time of test. The reference numeral 141 denotes a parallel/serial converter for converting parallel data into serial data, 142 a code converter for converting an NRZ signal to a B8ZS signal in DS1, and an NRZ signal to an B3ZS signal in DS3, 143 a U/B converter for converting a unipolar signal to a bipolar signal and supplying it to the digital line. The reference numeral 144 denotes a second pattern checker for receiving the test cell and confirming the operation of the ATM interface device and the operation of the path.

The reference numeral 151 represents a loop back portion for connecting the down path with the up path and looping back the output signal of the U/B converter 143 to the B/U converter 111 in the up path. The reference numeral 152 denotes a selector for selecting a signal from the digital line and a signal from the loop back portion 151 and outputting them. The selector 152 selects and outputs the DS1 (DS3) data from the digital line at an ordinary time and selects and outputs the data from the loop back portion 151 at the time of test. The reference numeral 153 represents a distributor for distributing the data output from the U/B converter 143 appropriately to the digital line or the loop back portion 151. The distributor 153 outputs the data to the digital line at an ordinary time and outputs it to the loop back portion 151 at the time of test.

The reference numeral 161 denotes a processor for conducting test control and other control, and it is connected to each element through a bus. The reference numeral 162 represents a console at which various data are input, instructed and displayed.

(g-3) Test (1) ATM Switch Path Confirmation Test

A test is instructed to the processor 161 through the console 162 of the ATM interface devices (e.g. ATM interface devices 106, 107 in FIG. 39) at the transmitting side and the receiving side.

When the test start command is issued, the processor 161 of the ATM interface device 106 at the transmitting side starts the pattern generator 114 and informs the selector 115 of the start of a test. The processor 161 of the ATM interface device 107 at the receiving side starts the pattern checker 144 for the test.

The pattern generator 114 of the ATM interface device 106 produces predetermined test data, and the selector 115 selects the test data and stores it into the RAM 116. The test data is thereafter converted into an ATM cell (test cell) of the AAL-1 format by the SAR header generator 118 and the ATM header generator 119, and input to the ATM switch 101 (FIG. 39A) through the shaper 120. The test cell is switched by the ATM switch 101 and input to the ATM interface device 107 at the receiving side.

In the ATM interface device 107 at the receiving side, the test cell is subjected to predetermined checks by the ATM header checker 131 and the SAR header checker 132 and is stored in the FIFO memory 133. The FIFO memory 133 outputs the data mapped in the payload portion of the test cell in synchronism with the data reception clock $C_{RU}$.

The pattern checker 144 receives the test data and compares the received test data with the known test data. If the data agree with each other, the pattern checker 144 judges that the path from the pattern generator 114 to the pattern checker 144 is normal, while if the data are different, the pattern checker 144 judges the path to be abnormal. The pattern checker 144 supplies the judgement to the processor 161, which displays the judgement on the display portion or the like of the console 162.

(2) Test of ATM Cell

The console 162 of the ATM interface device 106 instructs the processor 161 to start a test of the ATM interface device 107 at the receiving side and the console 162 of the ATM interface device 107 also instructs the processor 161 to start a test of its own ATM interface device.

When the test start command is issued, the processor 161 of the ATM interface device 106 starts the pattern generator 114 and the pattern checker 144 and informs the selector 115 of the start of a test. The pattern generator 114 produces predetermined test data, and the selector 115 selects the test data and stores it into the RAM 116. The test data is thereafter converted into an ATM cell (test cell) of the AAL-1 format by the SAR header generator 118 and the ATM header generator 119, and input to the ATM switch 101 through the shaper 120. The test cell is switched by the ATM switch 101 and input to the ATM interface device 107 at the receiving side.

The processor 161 of the ATM interface device 107 commands the loop back portion 151, the selector 152 and the distributor 153 to loop back when the test start command is issued.

When the ATM interface device 107 at the receiving side receives the test cell from the ATM switch 101 in this state, the ATM interface device 107 converts the test cell into test data, and loops back the test data to the up path through the distributor 153, the loop back portion 151 and the selector 152.

The test data looped back is converted into an ATM cell and input to the ATM switch 101. The ATM switch 101 switches the ATM cell to the ATM interface device 106 at the transmitting side.

In the ATM interface device 106 at the transmitting side, the test cell returned is subjected to predetermined checks by the ATM header checker 131 and the SAR header checker 132 and is stored in the FIFO memory 133. The FIFO memory 133 outputs the data mapped in the payload portion of the test cell in synchronism with the data reception clock $C_{RU}$.

The pattern checker 144 receives the test data and compares the received test data with the known test data. If the data agree with each other, the pattern checker 144 judges that the path of the ATM switch 101 and the ATM interface device 107 at the receiving side are normal, while if the data are different, the pattern checker 144 judges that either the path of the ATM switch 101 or the ATM interface device 107 is abnormal. The pattern checker 144 supplies the judgement to the processor 161.

(3) Test of DS1 (DS3) Layer

A test of the DS1 (DS3) layer is instructed to the processor 161 of the ATM interface device 106 through the console 162.

When the test start command is issued, the processor 161 informs the selector 140 of the start of the test and commands the loop back portion 151, the selector 152 and the distributor 153 to loop back. Further, the processor 161 starts the pattern generator 139 and the pattern checker 122.

The pattern generator 139 produces predetermined test data in the down path. The test data is input to the distributor 153 through the selector 140, the parallel/serial converter 141, the code converter 142 and the U/B converter 143. Since the loopback command is issued to the distributor 153, the loop back portion 151 and the selector 152, the test data is looped back from the down path to the up path. The test data is then received by the pattern checker 122 through the B/U converter 11, the code converter 112 and the serial/parallel converter 113.

The pattern checker 122 receives the test data and compares the received test data with the known test data. If the data agree with each other, the pattern checker 122 judges that the DS1 (DS3) layer from the pattern generator 139 to the pattern checker 122 is normal, while if the data are different, the pattern checker 122 judges the layer to be abnormal. The pattern checker 122 supplies the judgement to the processor 161, which displays the judgement on the display portion or the like of the console 162.

In this manner, the confirmation of the normality of the path of the circuit emulation is enabled. In addition, the test of the layer including the AAL-1 layer is also possible.

(h) Seventh Embodiment (h-1) Brief Explanation of Seventh Embodiment

If the same network clock $C_N$ (frequency: f) is supplied to an ATM interface device 201 at the receiving side and an ATM interface device 202 at the transmitting side, as shown in FIG. 42, it is possible to synchronize the data reception clock $C_{RU}$ and the data transmission clock $C_{TU}$ by the SRTS method, as described above, and to realize a CBR (Constant Bit Rate) service through an ATM network 203.

In contrast, in communication through the ATM networks 203a, 203b having different network clocks, it is impossible to synchronize the data reception clock $C_{RU}$ with the data transmission clock $C_{TU}$ by a conventional SRTS method and, hence, it is impossible to realize the CBR (Constant Bit Rate) service. In FIG. 43, reference numeral 201 represents the ATM interface device at the receiving side, 202 the ATM interface device at the transmitting side, 203a the ATM network having the network clock $C_{N1}$ (frequency: $f_1$), and 203b the ATM network having the network clock $C_{N2}$ (frequency: $f_2$). The network clocks $C_{N1}$ and $C_{N2}$ in the ATM network 203a and 203b are different from each other and asynchronous.

Accordingly, technique for synchronizing the data reception clock $C_{RU}$ with the data transmission clock $C_{TU}$ even in communication through the ATM networks 203a, 203b having different network clocks is necessary.

In the seventh embodiment of the present invention, an SRTS converting device 210 is provided between the ATM networks 203a and 203b having different network clocks, as shown in FIG. 44. The SRTS converting device 210 corrects the SRTS information contained in the SAR header on the basis of the difference in the network clock and synchronizes the data reception clock $C_{RU}$ with the data transmission clock $C_{TU}$.

(h-2) Principle

Figure 45:
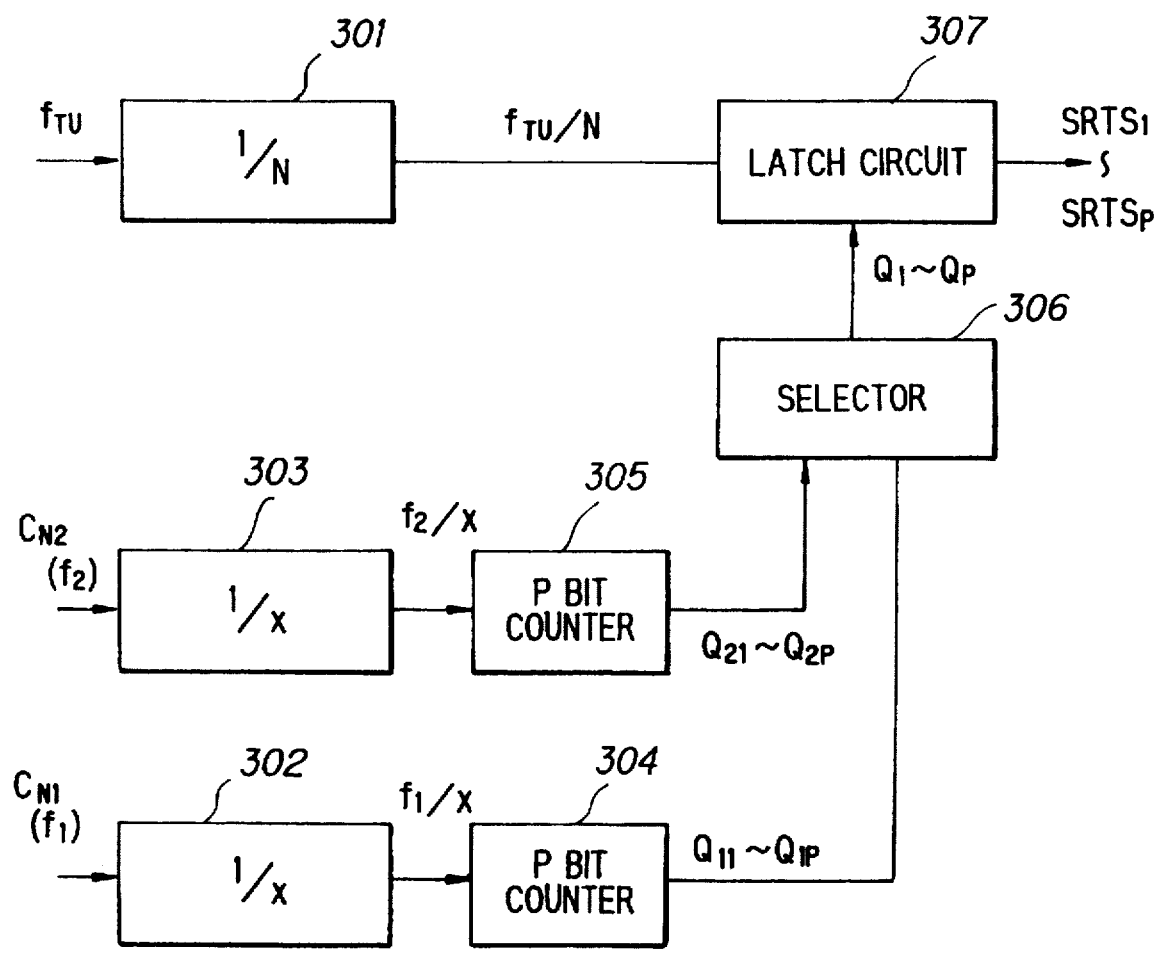
FIG. 45 shows the structure of a virtual SRTS generator which can utilize a network clock of a receiving apparatus.

FIG. 45 is a block diagram of a transmission RTS information producing circuit on the assumption that the both the network clock $C_{N1}$ of the ATM network 203a and the network clock $C_{N2}$ of the ATM network 203b can be utilized. The reference numeral 301 represents a frequency divider for dividing the frequency $f_{TU}$ of the data transmission clock $C_{TU}$ into 1/N, 302 a frequency divider for dividing the frequency $f_1$ of the first network clock $C_{N1}$ into 1/x, 303 a frequency divider for dividing the frequency $f_2$ of the second network clock $C_{N2}$ into 1/x, 304 a P bit counter for counting the frequency-divided clock having a frequency of $f_1/x$ and outputting network timing information $Q_{11}$ to $Q_{1p}$, 305 a P bit counter for counting the frequency-divided clock having a frequency of $f_2/x$ and outputting network timing information $Q_{21}$ to $Q_{2p}$, 306 a selector for selecting and outputting the network timing information $Q_1$ to $Q_p$ corresponding to the ATM network at the receiving side, and 307 a latch circuit for latching the network timing information $Q_1$ to $Q_p$ at every N data transmission clocks $C_{TU}$ and outputting transmission RTS information SRTS1 to SRTSp.

When the network clock of the ATM network at the receiving side is $C_{N1}$ (frequency: $f_1$), the selector 306 selects the network timing information $Q_{11}$ to $Q_{1p}$ as the network timing information $Q_1$ to $Q_p$ and the latch circuit 307 latches the network timing information $Q_1$ to $Q_p$ and produces the transmission RTS information by using the network timing information $Q_1$ to $Q_p$. On the other hand, when the network clock of the ATM network at the receiving side is $C_{N2}$ (frequency: $f_2$), the selector 306 selects the network timing information $Q_{21}$ to $Q_{2p}$ as the network timing information $Q_1$ to $Q_p$ and the latch circuit 307 latches the network timing information $Q_1$ to $Q_p$ and produces the transmission RTS information by using the network timing information $Q_1$ to $Q_p$. In this manner, it is possible that the ATM interface devices at the receiving side and the transmitting side can use the same network clock, and it is therefore possible to synchronize the data reception clock $C_{RU}$ and the data transmission clock $C_{TU}$ by the SRTS method.

Actually, however, it is impossible that the ATM interface device at the transmitting side can receive the network clock of the ATM network at the receiving side, so that it is actually impossible to produce the transmission RTS information by using the network clock of the ATM network at the receiving side. In the seventh embodiment, the SRTS converting device 210 (FIG. 44) corrects the value of an SRTS pointer (the transmission RTS information) in the SAR header in order to pretend that the ATM interface device at the transmitting side produces the transmission RTS information by using the network clock of the ATM network at the receiving side in the structure shown in FIG. 45.

If it is assumed that the ATM interface device at the transmitting side receives the network clock $C_{N2}$ (frequency: $f_2$) of the ATM network at the receiving side, as shown in FIG. 45, the difference in the count value between the counters 304 and 305, in other words, the difference between the numbers of the network clocks $C_{N1}$, $C_{N2}$, produced increases. If the difference is counted by a counter having a capacity of M, the count value (difference) of the counter gradually increases from 0 to M, then returns to 0 and gradually increases again to M. This operation is thereafter repeated. That is, the count value of the network clock $C_{N2}$ (frequency: $f_2$) of the ATM network at the receiving side counted by the counter 305 is represented by the count value of the counter 304 and the difference.

Therefore, the SRTS converting device 210 (FIG. 44) is provided with the counters 304, 305, and when a cell of the AAL-1 is received, the difference between the count values of the counters 304, 305 is added to the value of the SRTS pointer (the transmission RTS information) contained in the cell so as to correct the value of the SRTS pointer.

(h-3) AAL-1 Format Used in Seventh Embodiment

Figure 46A:
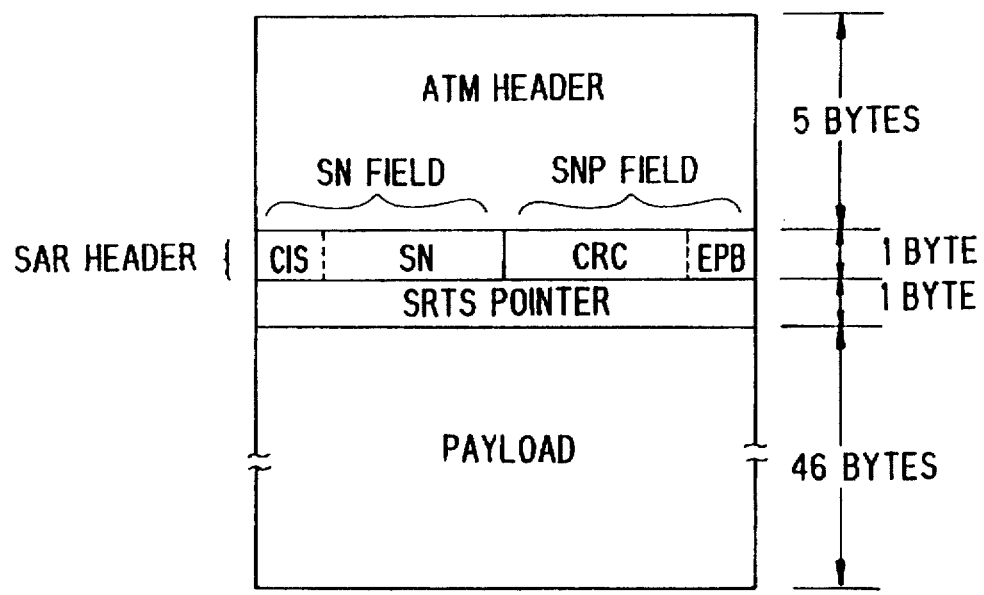
FIGS. 46A and 46B are explanatory views of AAL-1 cell formats (P-format, and non-P-format)
Figure 46B:
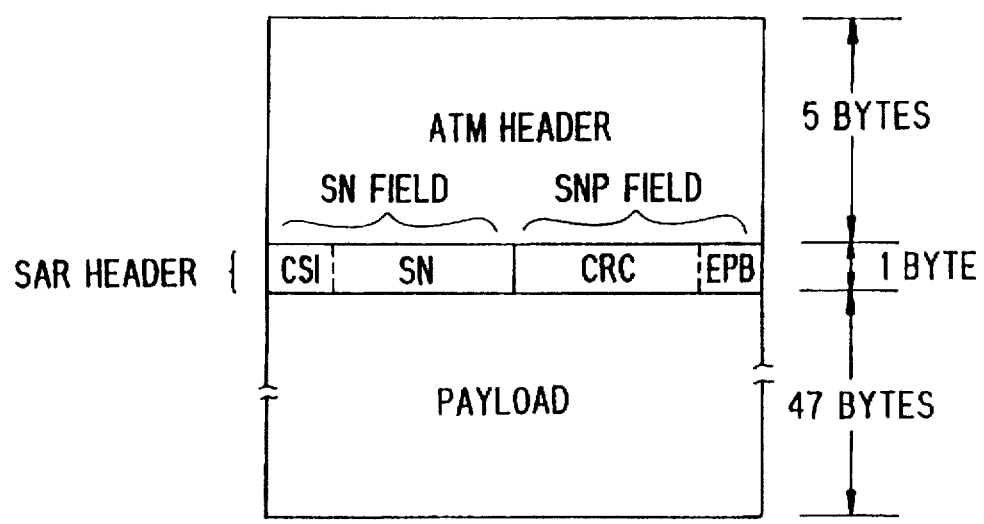

FIG. 46A is an explanatory view of an AAL-1 cell format (P-format) used in the seventh embodiment, and FIG. 46B is an explanatory view of an AAL-1 cell format (non-P-format) used in the first to sixth embodiments.

In the non-P-format, the ATM cell is composed of an ATM header of 5 bytes, an SAR header of 1 byte and a payload of 47 bytes. The SRTS information is represented by CSI bits CS1, CS3, CS5 and CS7 of the cells having the sequence numbers SN of 1, 3, 5 and 7, respectively. That is, in the non-P-format, one piece of RTS information is transmitted every eight cells.

On the other hand, in the P-format, the ATM cell is composed of an ATM header of 5 bytes, an SAR header of 1 byte, an SRTS pointer (SRTS information) of 1 byte and a payload of 46 bytes. One SRTS pointer (one piece of SRTS information) is transmitted per two cells at its maximum, and when the CSI bit is "1", the SRTS pointer is contained in the sixth octet, while when the CSI bit is "0", no SRTS pointer is contained in the cell.

(h-4) SRTS Converting Device

Figure 47:
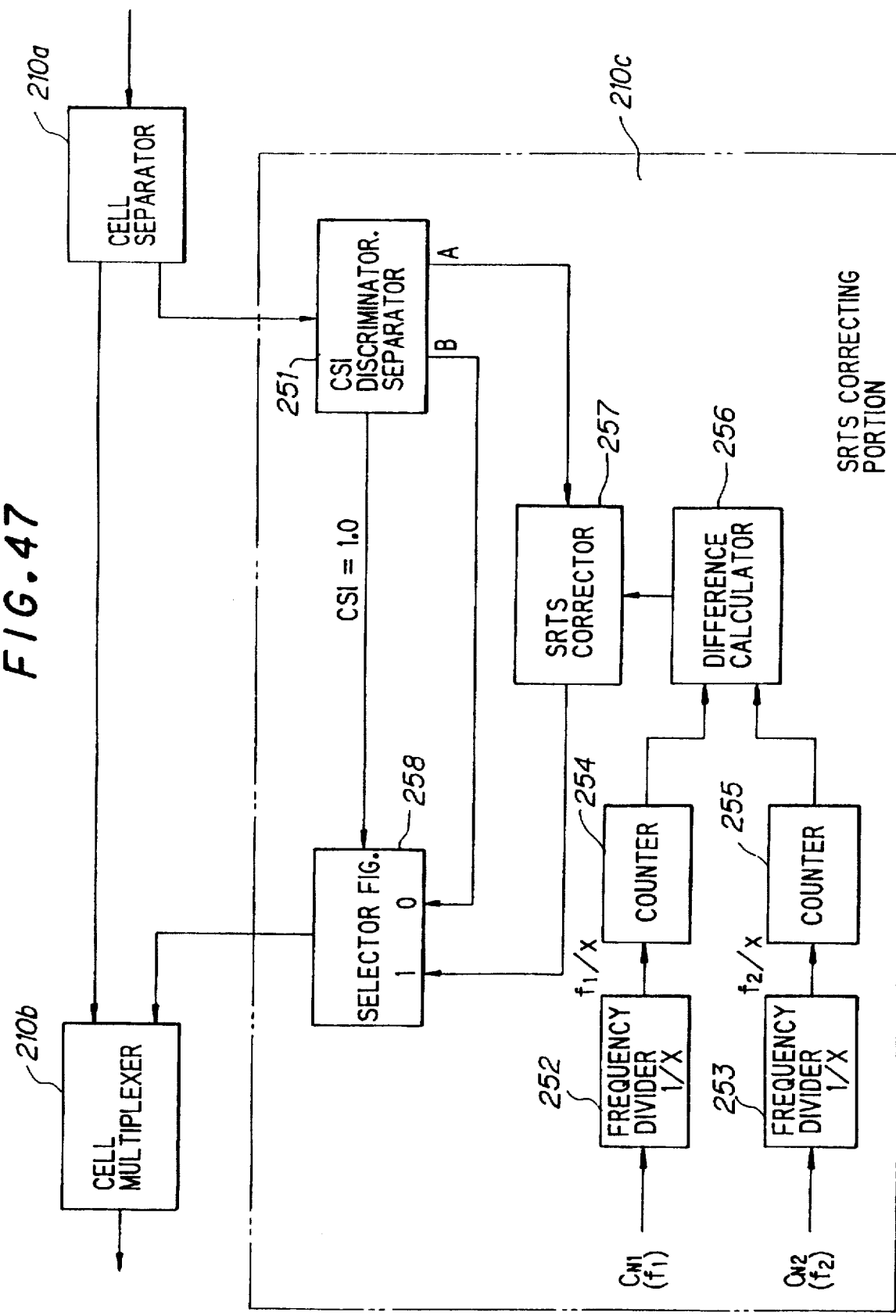
FIG. 47 shows the structure of an SRTS converting device.
Figure 48:
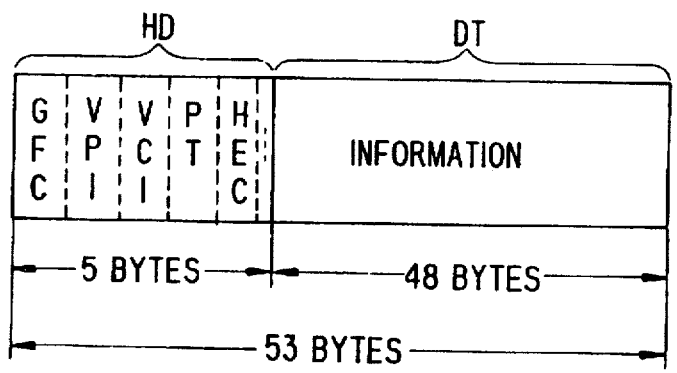
FIG. 48 shows the structure of an ATM cell.
Figure 49:
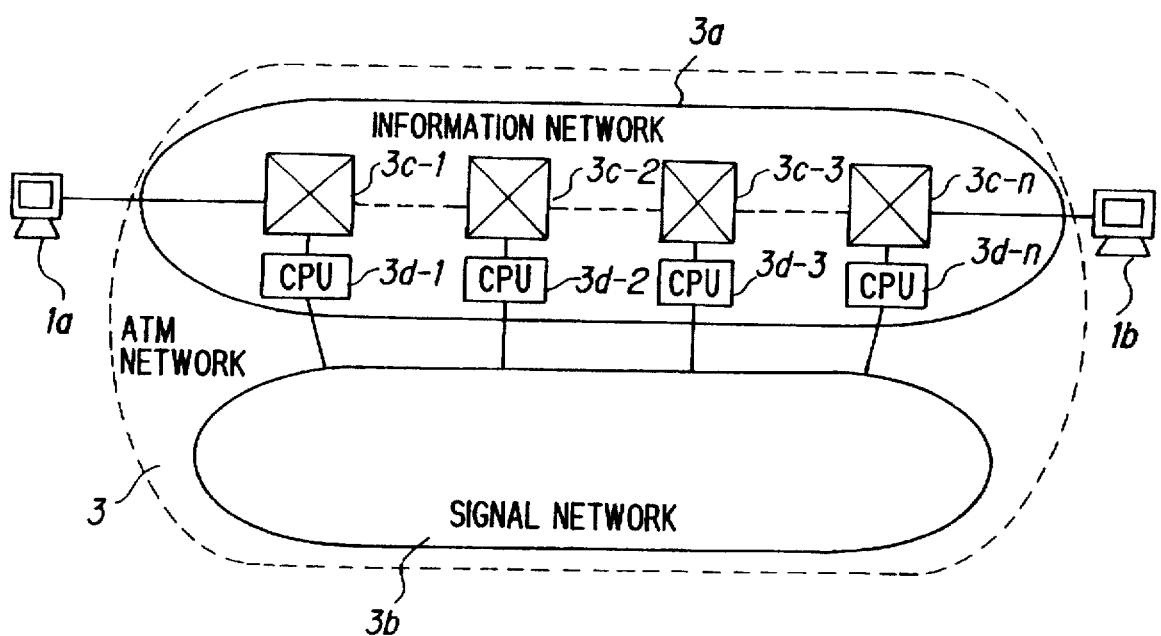
FIG. 49 schematically explains an ATM network.
Figure 50A:
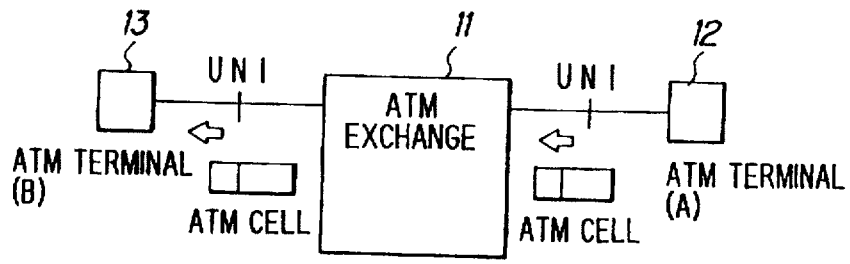
FIGS. 50A to 50D show the structure of a broadband ISDN system.
Figure 50B:
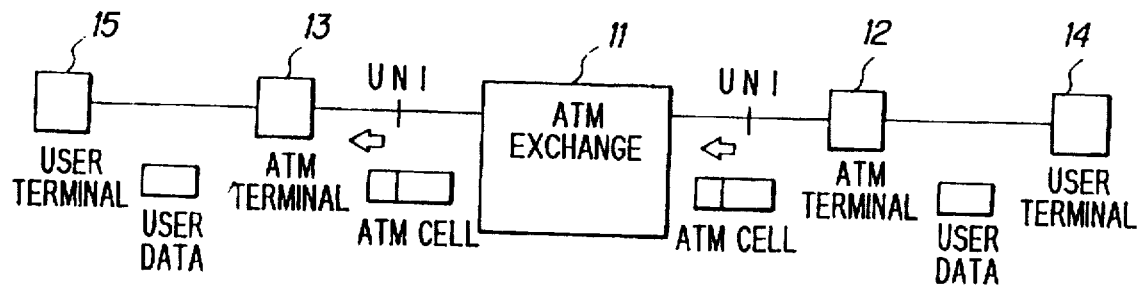
Figure 50C:
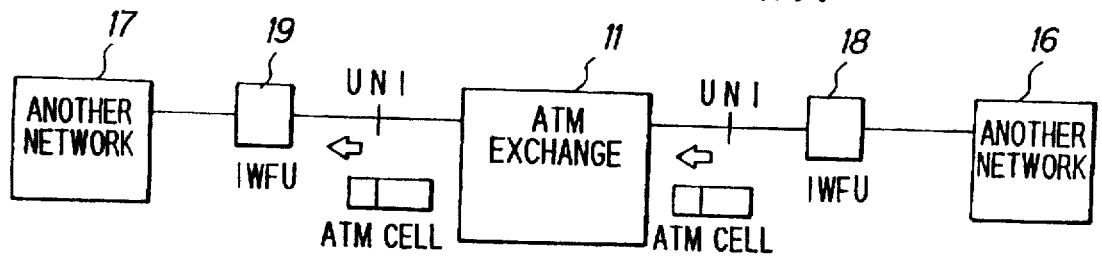
Figure 50D:
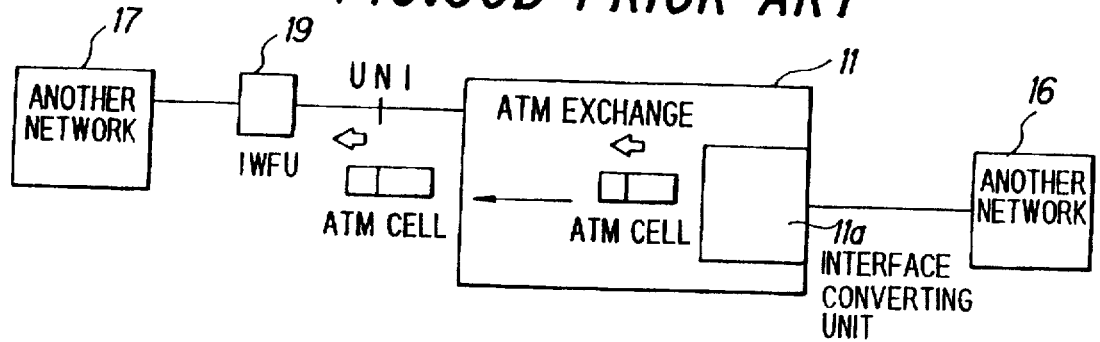
Figure 51:
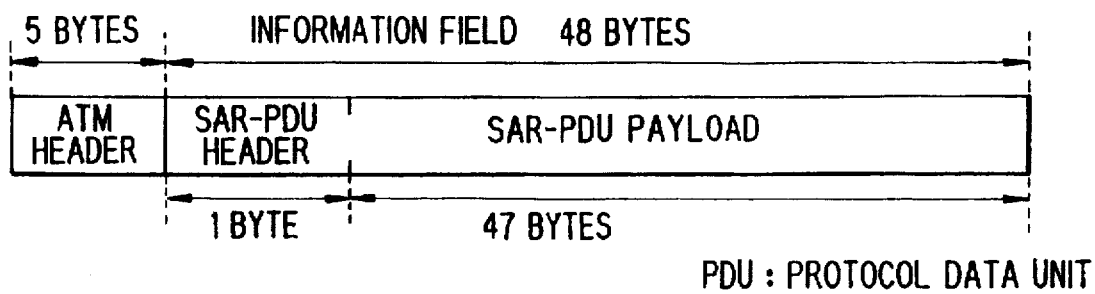
FIG. 51 is an explanatory view of the structure of an ATM cell of the AAL type (AAL-1)
Figure 52:
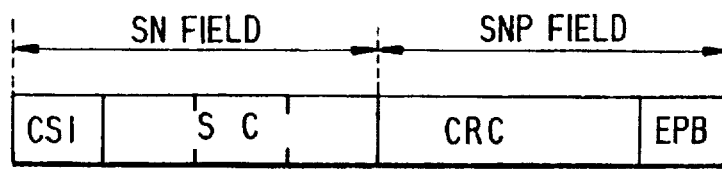
FIG. 52 is an explanatory view of the structure of an SAR-PDU header.
Figure 53:
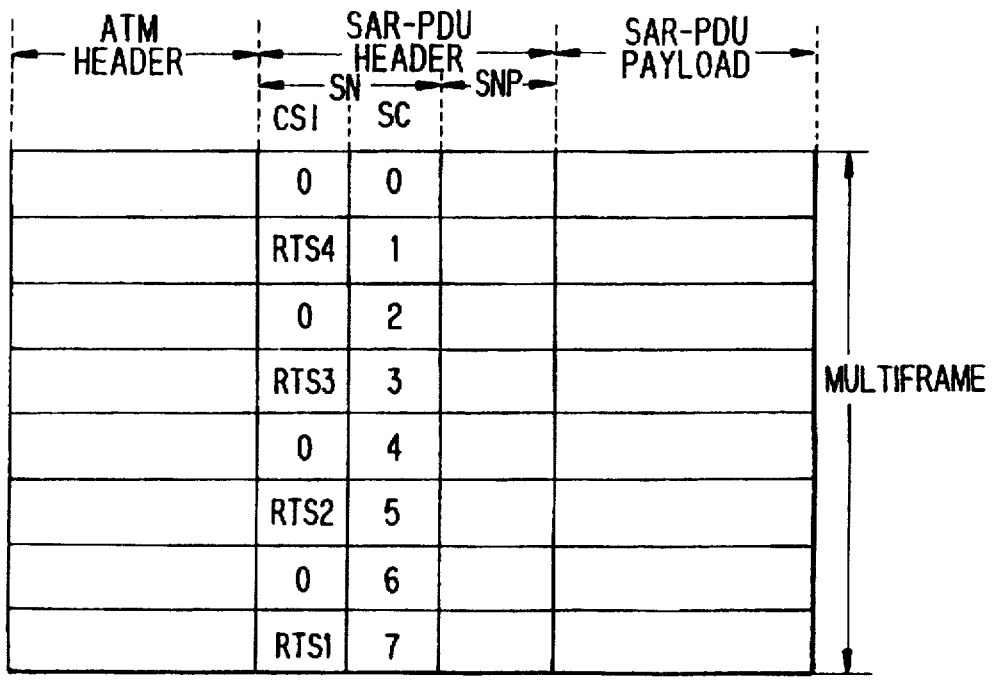
FIG. 53 is an explanatory view of the structure of the RTS information format.
Figure 54:
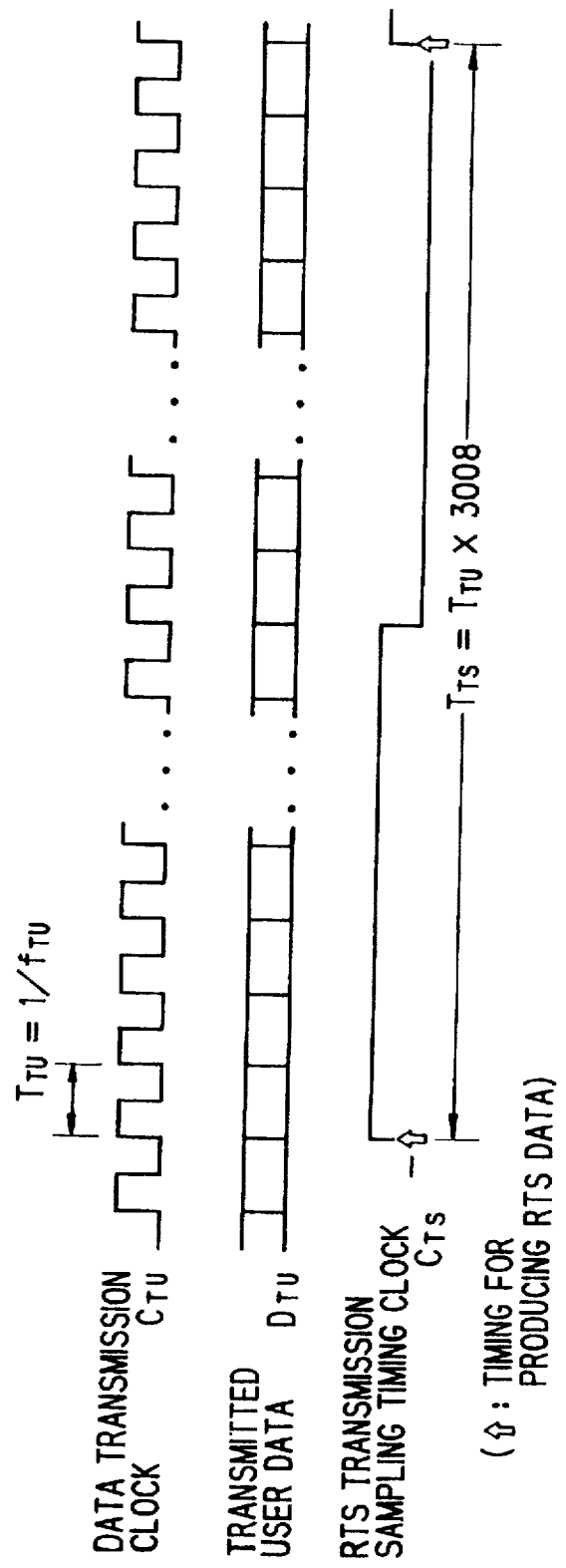
FIG. 54 is an explanatory view of the period of producing RTS information.

FIG. 47 shows the structure of an SRTS converting device.

The reference numeral 210a denotes a cell separator, 210b a cell multiplexer, and 210c an SRTS correcting portion for correcting the SRTS pointer contained in the cell.

In the SRTS correcting portion 210c, the reference numeral 251 represents a CSI discriminator/separator for judging whether the CSI bit of the SAR header is "1" or "0", and outputting the cell having the CSI of "1" from the output terminal A and the cell having the CSI of "0" from the output terminal B. The reference numeral 252 represents a frequency divider for dividing the frequency $f_1$ of the network clock $C_{N1}$ of the ATM network at the receiving side into 1/x, 253 a frequency divider for dividing the frequency $f_2$ of the second network clock $C_{N2}$ of the ATM network at the transmitting side into 1/x, 254 a P bit counter for counting the frequency-divided clock output from the frequency divider 252, 255 a P bit counter for counting the frequency-divided clock output from the frequency divider 253, 256 a difference calculator for calculating the difference in the count value between the counters 254 and 255, 257 an SRTS corrector for correcting the value of the SRTS pointer contained in the ATM cell of the AAL-1 by adding the difference in the count value of both pointers 254 and 255, and 258 a selector for selecting and outputting the ATM cell output from the output terminal B of the CSI discriminator/separator 252 when CSI=0, while selecting and outputting the ATM cell output from the SRTS corrector 257 when CSI=1.

In call processing control, if a call is for CBR service, the VCI and VPI values which are allotted to the call are set in the cell separator 210a. When a cell is input from the ATM network at the transmitting side, the cell separator 210a judges whether the cell is the AAL-1 type or another type by referring to the VCI and VPI of the cell. If the cell received is the ALL-1 type, the cell separator 210a inputs the cell to the SRTS corrector 210c, and if the cell is another type, the cell separator 210a inputs the cell to the cell multiplexer 210b.

If the SRTS pointer is contained in the input ATM cell (CSI="1"), the SRTS corrector 210c corrects the value of the SRTS pointer on the basis of the difference between the number of the network clock $C_{N1}$ of the ATM network at the transmitting side and the number of the network clock $C_{N2}$ of the ATM network at the receiving side and inputs the corrected value to the cell multiplexer 210b. On the other hand, if the SRTS pointer is not contained (CSI="0"), the SRTS corrector 210c inputs the cell to the cell multiplexer 210b as it is.

The cell multiplexer 210b multiplexes the cell input from the cell separator 210a with the cell input from the SRTS corrector 210c and inputs the multiplexed cell to the ATM network at the receiving side.

Although the SRTS converting device is provided between the ATM networks of the transmitting side and the receiving side in this embodiment, it may be disposed in the ATM network of either the receiving side or the transmitting side.

In this way, it is possible to synchronize the data reception clock and the data transmission clock even in the case of communicating through the ATM networks having different network clocks.

As described above, according to the present invention, since the internal RTS information which is the timing information on the data reception clock is produced by the SRTS method by using the network clock $C_N$ and the data reception clock $C_{RU}$, and the timing of the data reception clock $C_{RU}$ is adjusted so that the difference between the internal RTS information and the received RTS information which is the timing information on the data reception clock is zero, it is possible to conform the timing (frequency, phase) of the data reception clock with the timing of the data transmission clock.

In addition, according to the present invention, since the timing information of the user clock and the sampling timing information on the received RTS information are separated, and user data is output in synchronism with the data reception clock and the received RTS information ST4 is also output in synchronism with the RTS reception clock $C_{RCK}$, it is possible to reduce the jitters in the data reception clock and to produce a feedback signal having the DPLL structure with good follow-up performance. That is, both the demand for a reduction in jitters and the demand for an improvement of the follow-up performance are satisfied.

According to the present invention, since an analog PLL circuit is provided within the digital PLL system so as to produce a data reception clock, when the nominal value of the frequency of the user clock is comparatively low, it is possible to make the frequency of the reference clock approximately equal to the frequency of the user clock, thereby enabling the reduction in power consumption and reduction in the jitters in the user clock and enlarging the range of the allowable deviation of the user clock from the nominal value.

Furthermore, according to the present invention, since the adjusted clock signal output from the pulse adjuster is fed back to the internal RTS information producing portion in place of the data reception clock, it is possible to make the frequency $f_{OSC}$ of the reference clock output from the reference oscillator approximately equal to the frequency of the user clock, thereby enabling the reduction in power consumption. It is also possible to enlarge the range of the allowable deviation of the user clock from the nominal value. Since the feedback delay time is reduced, the follow-up performance in a high-speed user clock improved.

According to the present invention, the number of adjusting timing positions corresponding to the difference between the internal RTS information and the received RTS information are approximately uniformly arranged in the correction period, and a pulse is added or reduced at one of the adjusting timing positions so as to control the frequency of the data reception clock, it is possible to correct the number of pulses which is proportional to the difference in the correction period and also to enlarge the range of the allowable deviation of the user clock from the nominal value.

According to the present invention, since the feedback systems are united into one so as to synchronize the data reception clock with the data transmission clock, it is possible to produce a stable data reception clock.

According to the present invention, since the test data generator for generating test data and the test data checkers for receiving the test data and checking the normality of the path are provided in the up path and the down path in the ATM interface device, a confirmation test of the operation of an ATM interface device and a confirmation test of the normality of an ATM switch path are facilitated.

In addition, according to the present invention, when communication is exchanged through the ATM networks having different network clocks, the number of network clocks are counted separately from each other in the respective networks, and the transmission RTS information contained in the ATM cell is corrected on the basis of difference in the count value and output to the ATM network of the receiving apparatus. In this manner, it is possible to establish synchronization between the data reception clock and the data transmission clock even in communication through the ATM networks having different network clocks.

As many apparently widely different embodiments of the present invention can be made without departing from the spirit and scope thereof, it ifs to be understood that the invention is not limited to the specific embodiment thereof except as defined in the appended claims.

What is claimed is:

1. A transmission timing information converting device between an ATM network in which a transmitting apparatus produces transmission timing information which is the timing information on a data transmission clock by using a first network clock and said data transmission clock and transmits said transmission timing information in an ATM cell, and an ATM network in which a receiving apparatus produces internal timing information which is the timing information on a data reception clock by using a second network clock and said data reception clock and controls the timing of said data reception clock so that the difference between said internal timing information and the transmission timing information which is contained in said ATM cell received is zero, thereby rendering said data reception clock synchronous with said data transmission clock and enabling communication through ATM networks having different network clocks, said transmission timing information converting device comprising:

a counting means for counting each of said first and second network clocks;

a calculating means for calculating the difference between the count values; and a timing information correcting portion for correcting said transmission timing information contained in said ATM cell supplied from said ATM network of said transmitting apparatus on the basis of said difference and supplying said ATM cell with the corrected transmission timing information to said ATM network of said receiving apparatus.

2. A transmission timing information converting device according to claim 1, wherein said transmission timing information converting device is provided between said ATM networks or in one of said ATM networks.

3. A transmission timing information converting device between a first network in which a transmission timing information of a data transmission clock produced from a first network clock and said data transmission clock is transmitted in a fixed length cell, and a second network in which internal timing information of a data reception clock produced from a second network clock and said data reception clock controls the timing of said data reception clock, said transmission timing information converting device comprising:

a counter for counting each of said first and second network clocks;

a calculator for calculating the difference between the count values; and a timing information correcting portion for correcting said transmission timing information contained in said fixed length cell suppled from said first network on the basis of said difference and supplying said fixed length cell with the corrected transmission timing information to said second network of said receiving apparatus.

4. A communication system for a fixed length cell, comprising:

a first network in which a transmission timing information of a data transmission clock produced from a first network clock and said data transmission clock is transmitted in a fixed length cell;

a second network in which internal timing information of a data reception clock produced from a second network clock and said data reception clock controls the timing of said data reception clock; and a transmission timing information converting device including:

a counting means for counting each of said first and second network clocks;

a calculating means for calculating the difference between the count values; and a timing information correcting portion for correcting said transmission timing information contained in said fixed length cell supplied from said first network on the basis of said difference and supplying said fixed length cell with the corrected transmission timing information to said second network.

5. A method of converting a transmission timing information of a data transmission clock produced from a first network clock and said data transmission clock for a first network into a corrected transmission timing information for a second network having a second network clock comprising the steps of:

counting each of said first and second network clocks;

calculating the difference between the count values; and correcting said transmission timing information contained in a fixed length cell supplied from said first network on the basis of said difference and supplying said fixed length cell with the corrected transmission timing information to said second network.

6. A transmission timing information converting device for converting a transmission timing information of a data transmission clock produced from a first network clock and said data transmission clock for a first network into a corrected transmission timing information for a second network having a second network clock comprising:

a counter for counting each of said first and second network clocks;

a calculator for calculating the difference between the count values; and a timing information correcting portion for correcting said transmission timing information contained in a fixed length cell supplied from said first network on the basis of said difference and supplying said fixed length cell with the corrected transmission timing information to said second network.

* * * * *

UNITED STATES PATENT AND TRADEMARK OFFICE
CERTIFICATE OF CORRECTION

PATENT NO. : 5,778,001
DATED : JULY 7, 1998
INVENTOR(S) : Mikio NAKAYAMA et al.

It is certified that error appears in the above-identified patent and that said Letters Patent is hereby corrected as shown below:

On the title page, item [54] and column 1, line 1, before "INTERFACE" insert --NETWORK--.

Signed and Sealed this

Twenty-second Day of December, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,778,001
DATED : JULY 7, 1998
INVENTOR(S) : Mikio NAKAYAMA, et al

It is certified that error appears in the above-indentified patent and that said Letters Patent is hereby corrected as shown below:

On the title page, Item [30] Foreign Application Priority Data, delete "Feb. 11, 1994 [JP] Japan 6-269298and Jul. 2, 1994 [JP] Japan 6-013776" and insert --Feb. 7, 1994 [JP] Japan 6-013776 and Nov. 2, 1994 [JP] Japan 6-269298--.

Signed and Sealed this

Eighth Day of June, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,778,001
DATED : JULY 7, 1998
INVENTOR(S) : Mikio NAKAYAMA, et al.

It is certified that error appears in the above-indentified patent and that said Letters Patent is hereby corrected as shown below:

On the title page, item 75, the fifth inventor's last name, delete "Makuma" and insert --Kakuma--.

Signed and Sealed this

Twenty-sixth Day of October, 1999

Attest:

Q. TODD DICKINSON

Attesting Officer  Acting Commissioner of Patents and Trademarks